United States Patent [19]

Nojima et al.

[11] Patent Number: 5,761,603
[45] Date of Patent: Jun. 2, 1998

[54] CATV-LAN SYSTEM HAVING SIMPLE MODEM CONFIGURATION AND PROVIDING HIGH EFFICIENCY OF TRANSMISSION

[75] Inventors: Shinji Nojima; Shugo Horikami; Masaki Sato, all of Tokyo; Hiroshi Nishikawa, Kawasaki, all of Japan

[73] Assignee: Matsushita Electric Industrial Co., Ltd., Japan

[21] Appl. No.: 535,675

[22] Filed: Sep. 28, 1995

[30] Foreign Application Priority Data

Sep. 30, 1994 [JP] Japan ................................... 6-259768
Mar. 23, 1995 [JP] Japan ................................... 7-088669

[51] Int. Cl.$^6$ ............................ H04N 1/00; H04N 7/14
[52] U.S. Cl. ........................ 455/3.1; 455/5.1; 348/12; 348/6
[58] Field of Search ............................. 348/6, 7, 12, 13; 455/3.1, 5.1, 6.1, 6.2; H04N 7/14

[56] References Cited

U.S. PATENT DOCUMENTS

| | | |
|---|---|---|
| 4,792,849 | 12/1988 | McCalley et al. |
| 5,446,918 | 8/1995 | Lamy .................................... 348/12 |
| 5,534,913 | 7/1996 | Majeti .................................... 348/12 |

FOREIGN PATENT DOCUMENTS

| | | |
|---|---|---|
| 8705763 | 9/1987 | WIPO. |
| 9416534 | 7/1994 | WIPO. |

OTHER PUBLICATIONS

IEEE Transactions on Consumer Electronics, vol. 39, No. 4, 1 Nov. 1993, New York, NY, US, pp. 887–894, XP000423078, Tomohiro Hase: "Transmission for Digital Video Signals Coded by CCITT H.261 on a Private Broadband LAN Using Co-Axial Cable".

IBM Technical Disclosure Bulletin, vol. 35, No. 1B, 1 Jun. 1992, pp. 383–385, XP000309104, "Packet Networking Scheme for Radio Frequences".

"Data, Video Integrated Broadband LAN System" by Hirata et al. as a Technical Report IN88–4 No. 12, 1988, of the Electronic Data Communication Institute (Japan).

Primary Examiner—Sherrie Hsia
Attorney, Agent, or Firm—Rossi & Associates

[57] ABSTRACT

In a CATV-LAN in which a plurality of modems transmit messages asynchronously from respective terminal apparatuses to an upstream transmission path and receives messages from a downstream transmission path, when a modem is transmitting a message, the resultant data which are received by that modem are compared with data of that message which have already been transmitted, and transmission is interrupted if the received data do not correctly match the transmitted data, due to conflict with data transmitted by some other modem. Each message contains information specifying its length, and when a non-transmitting modem receives a set of data whose actual length does not match a length value which is specified within the data, the data are discarded. It thereby becomes unnecessary to provide beat detection circuits in the modems, for detecting data conflict, so that system cost can be reduced.

25 Claims, 52 Drawing Sheets

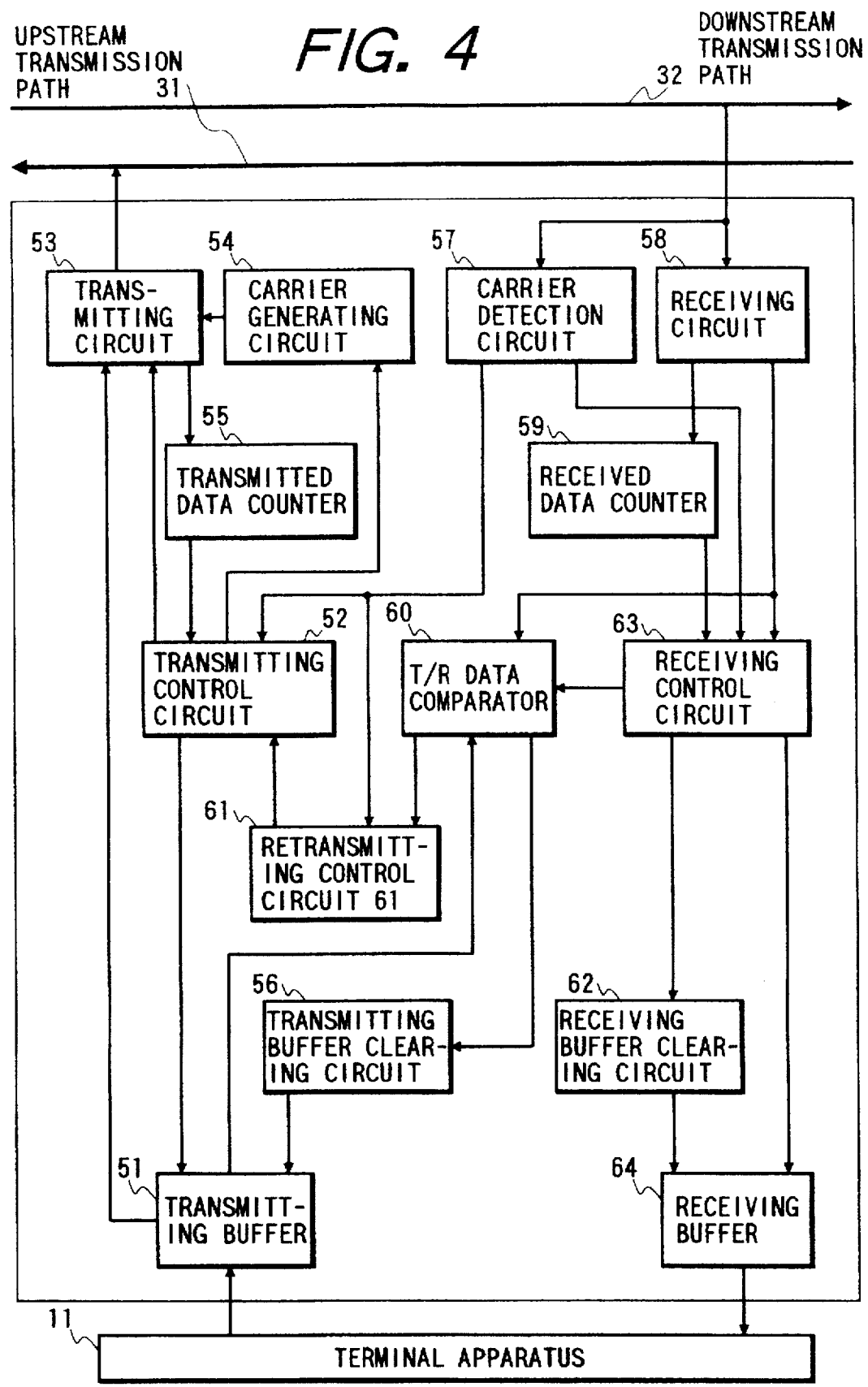

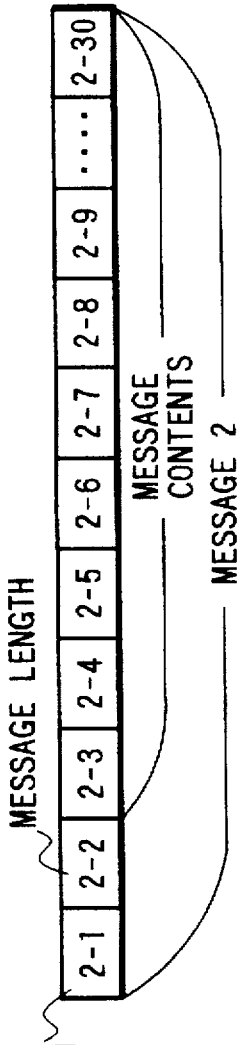
FIG. 6A
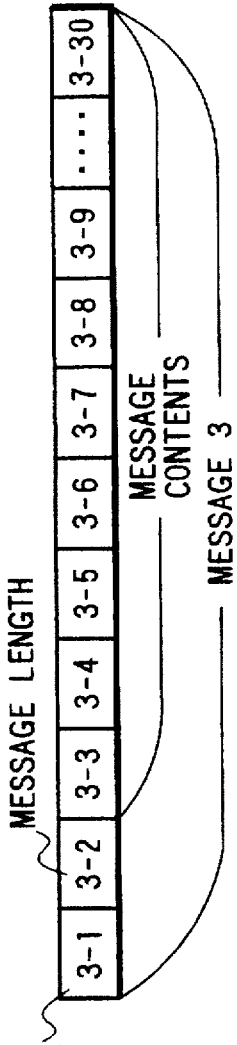
FIG. 6B
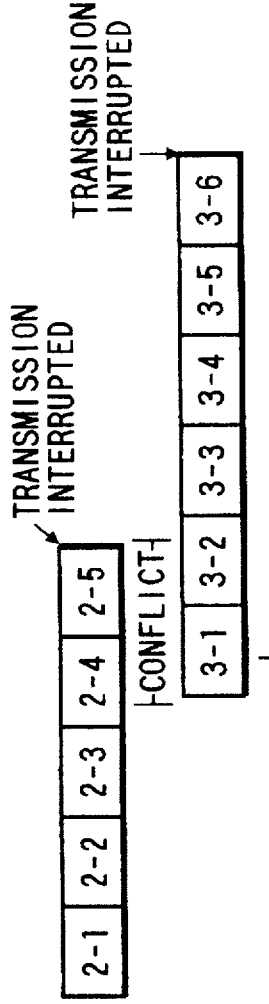
FIG. 6C

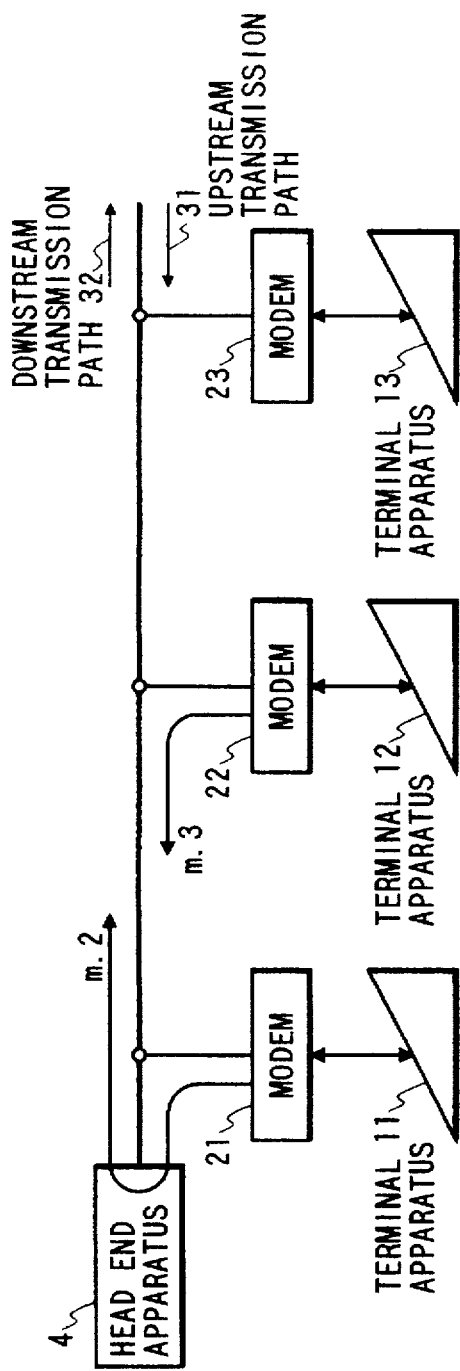
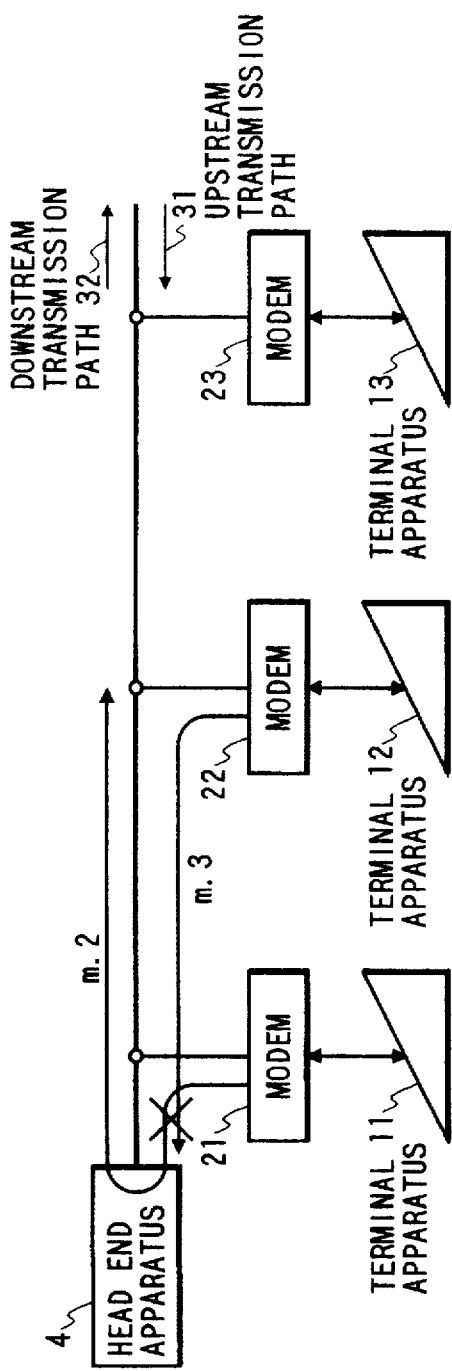
FIG. 7A
FIG. 7B

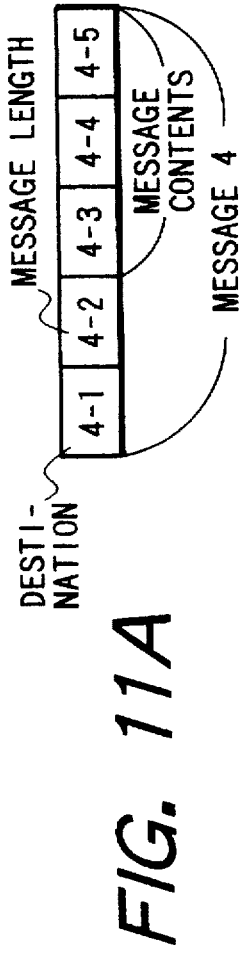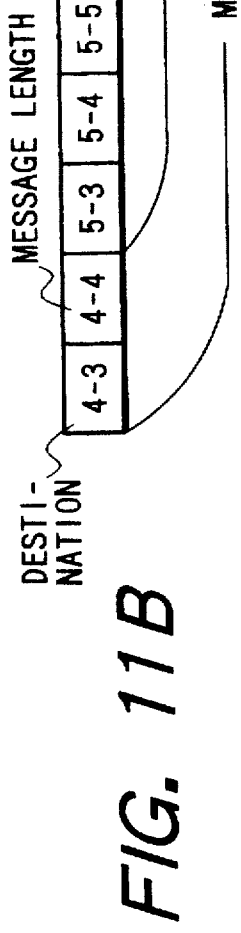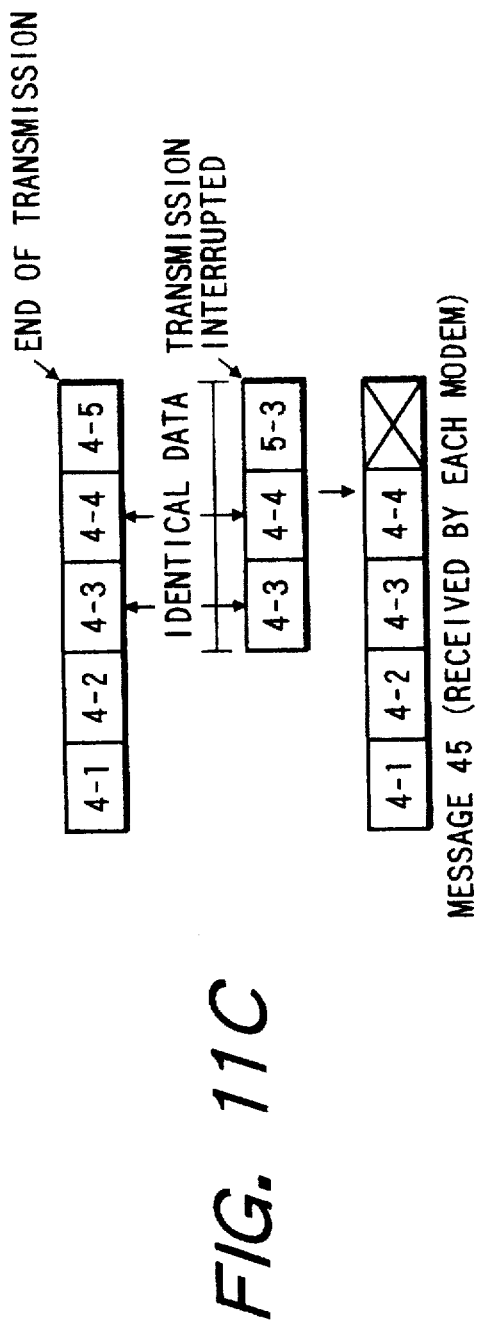

FIG. 18A

| NUMBER OF TRANSMISSIONS | RETRANSMISSION INTERVAL (NUMBER OF SLOT TIME INTERVALS) |
| --- | --- |
| 1 | 1 |
| 2 | 2 |
| 3 | 3 |

FIG. 18B

| NUMBER OF TRANSMISSIONS | RETRANSMISSION INTERVAL (NUMBER OF SLOT TIME INTERVALS) |
| --- | --- |
| 1 | 2 |
| 2 | 3 |
| 3 | 1 |

FIG. 18C

| NUMBER OF TRANSMISSIONS | RETRANSMISSION INTERVAL (NUMBER OF SLOT TIME INTERVALS) |
| --- | --- |
| 1 | 3 |
| 2 | 1 |
| 3 | 2 |

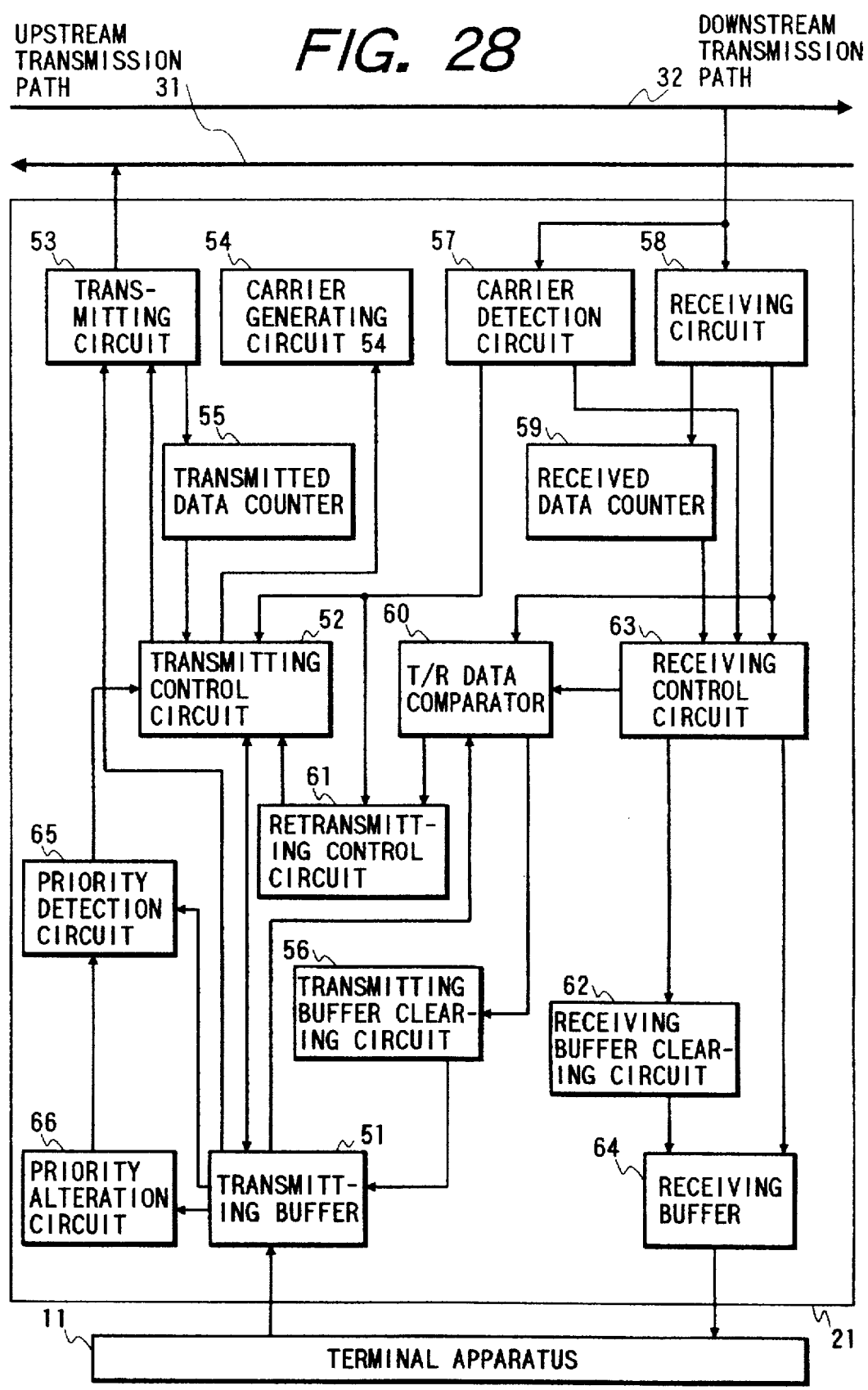

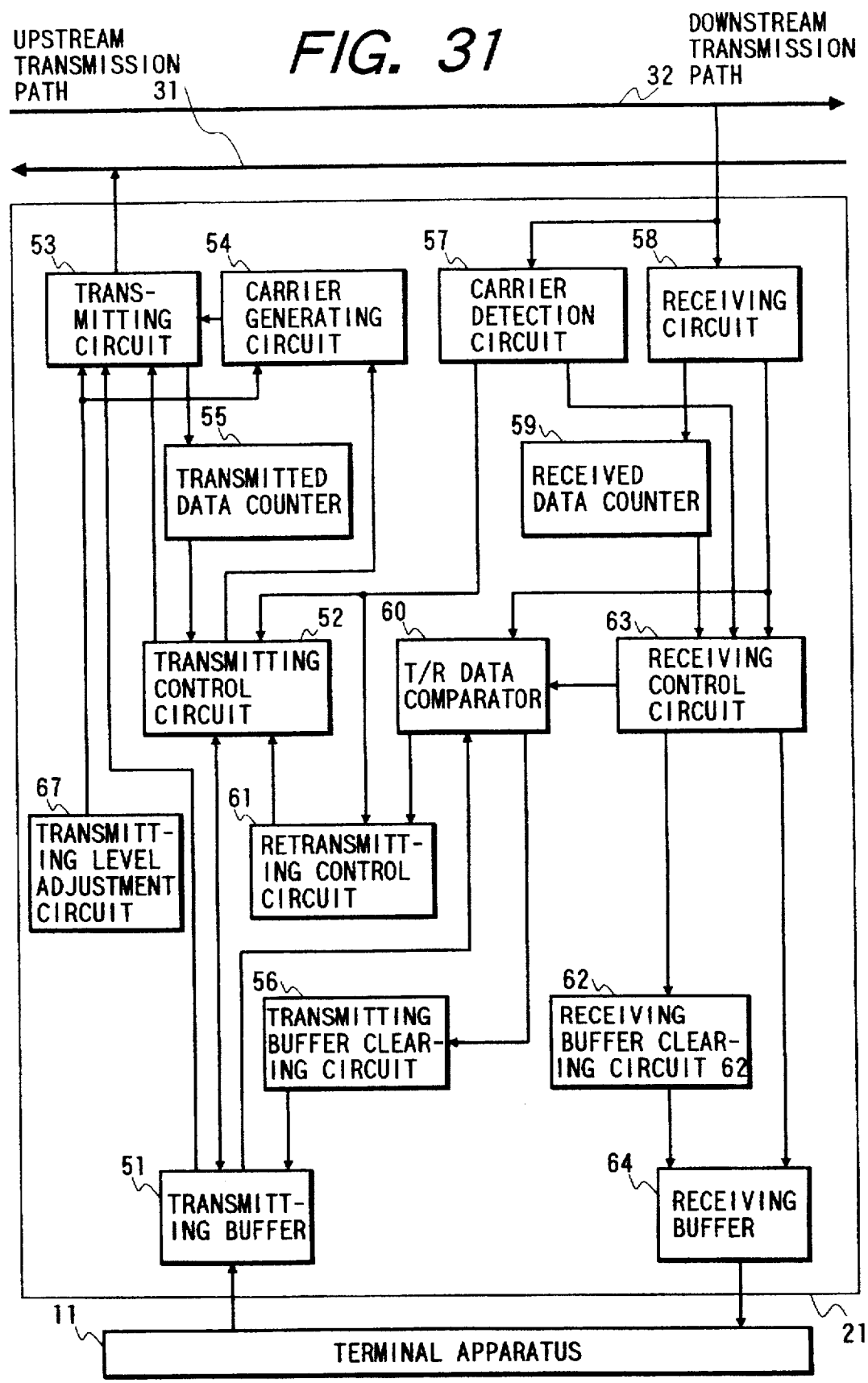

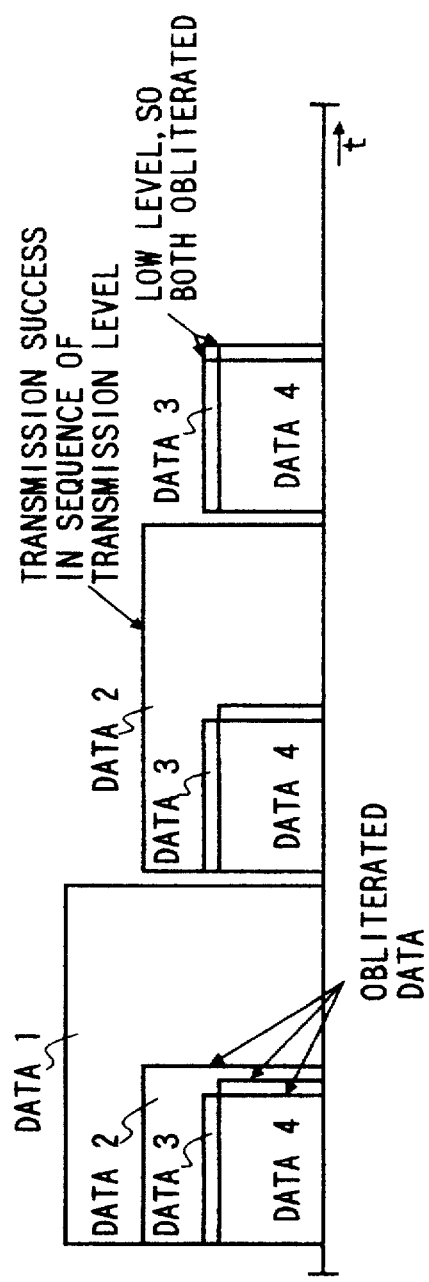
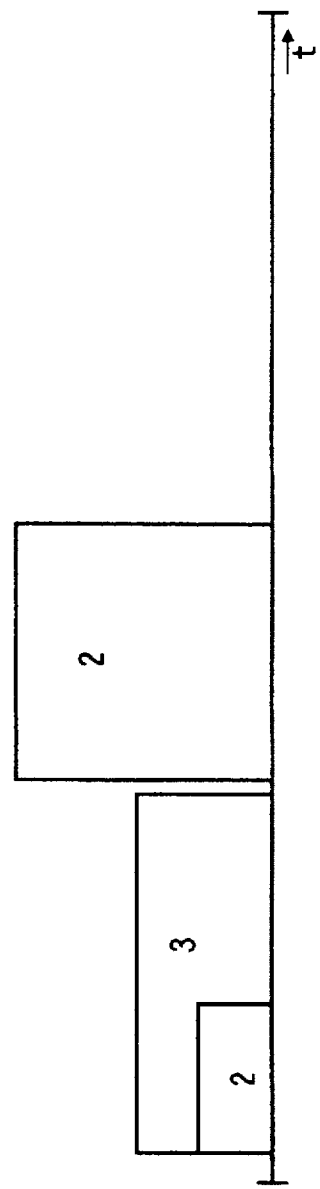
FIG. 32A
FIG. 32B

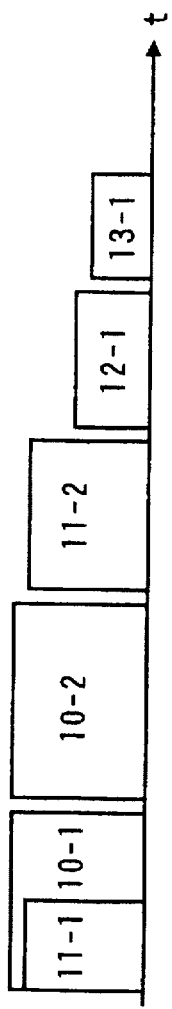
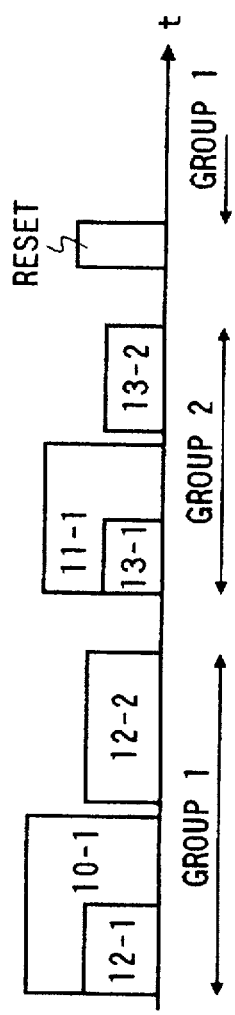
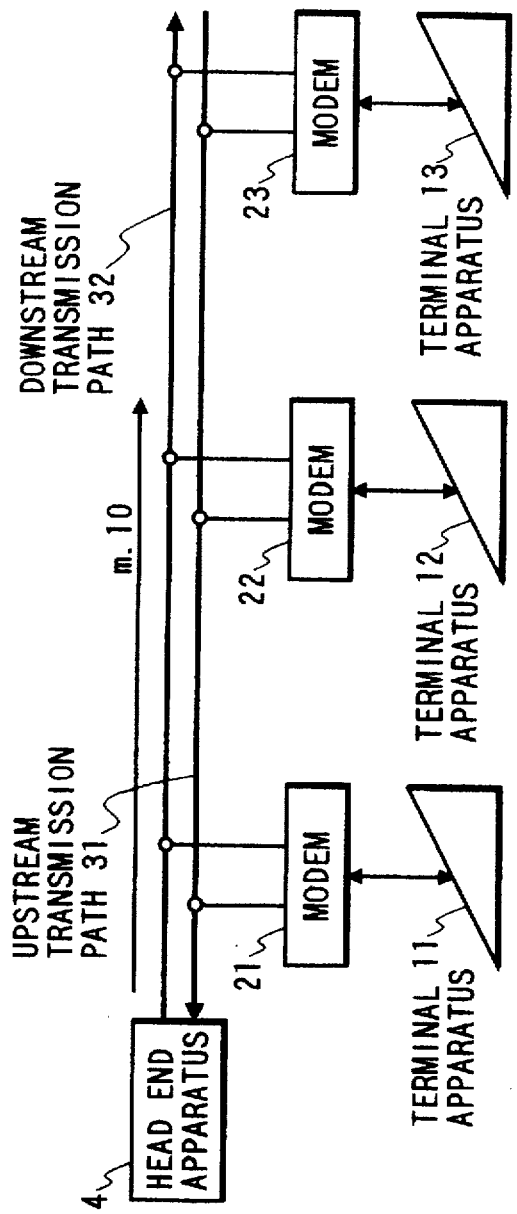
FIG. 43A
FIG. 43B
FIG. 46

FIG. 50
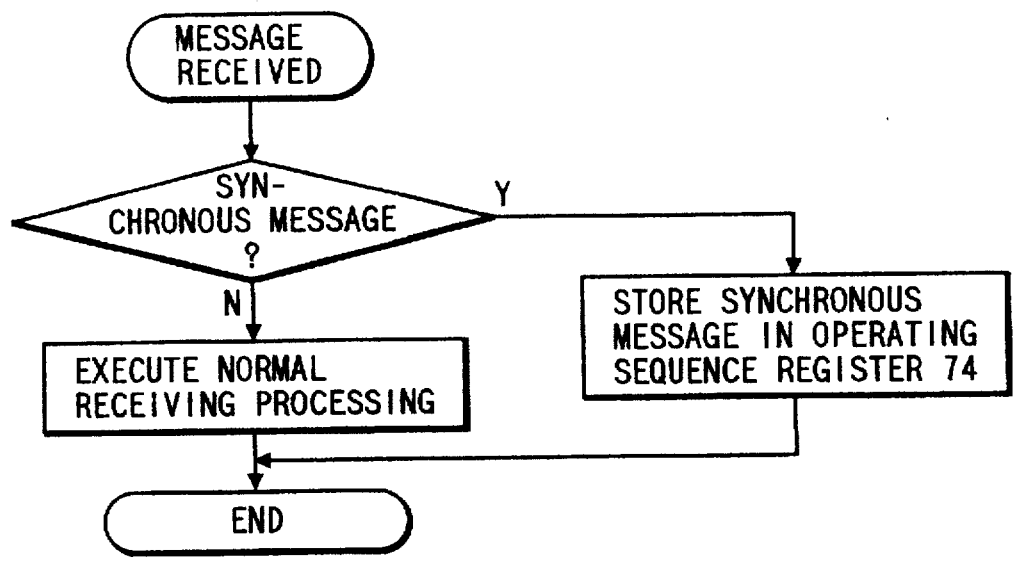
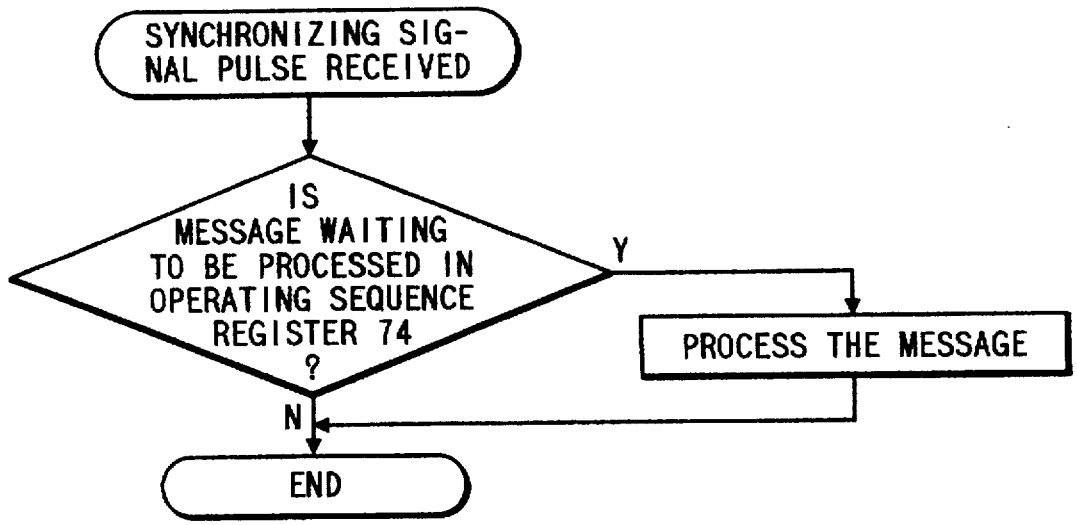

CATV-LAN SYSTEM HAVING SIMPLE MODEM CONFIGURATION AND PROVIDING HIGH EFFICIENCY OF TRANSMISSION

BACKGROUND OF THE INVENTION

1. Field of the Invention

The present invention relates to a data communication system which is suitable for implementing a cable television local area network (referred to in the following as a CATV-LAN system), for such applications as on-demand video, tele-shopping, monitor camera systems, etc. In particular, the invention relates to a system which achieves efficient transmission of data in such applications while enabling the overall system, and in particular the modems, to be simple in design and inexpensive to manufacture.

2. Description of the Prior Art

Prior art types of data transfer methods for large-scale applications include wide-band transmission methods, whereby encoded data are modulated by a carrier, using a method such as FSK or PSK modulation, and the modulated data are transferred to a transmission medium such as a cable. A description of such a data transfer system, in which the nodes of the system are interconnected by a bus type of network, is given in "Integrated Data and Video Broadband LAN System" by Hirata et al, as a technical report IN88-4 No. 12, 1988, of the Electronic Data Communication Institute (Japan).

An example of such a CATV-LAN, as shown in FIG. 3, is made up of terminal apparatuses 11 to 13 for transmitting and receiving data, modems 21 to 23 (connected to respective ones of the terminal apparatuses 11 to 13) for executing modulation and demodulation of the data, a transmission path 3 which is connected between the modems, and a head end apparatus 4 which is positioned at one end of the transmission path 3.

The transmission path 3 consists of an upstream transmission path 31 which transfers data from the modems 21 to 23 to a head end apparatus 4, and a downstream transmission path 32 which transfers the data back from the head end apparatus 4 to each of the modems 21 to 23. The function of the head end apparatus 4 is to transmit back, to all of the modems 21 to 23 via the downstream transmission path 32, data which have been transmitted from any one of these modems via the upstream transmission path 31. In principle, it is possible to implement the downstream transmission path and upstream transmission path by a single cable, if the head end apparatus 4 remodulates the data (received from the cable, sent along the upstream direction) at different values of modulation frequency before transferring the resultant modulated data to the cable, to be sent in the downstream direction. Alternatively of course, the upstream transmission path and downstream transmission path can be implemented by respective cables.

Data which are to be transmitted by any of the terminal apparatuses 11 to 13 are transferred through the corresponding one of the modems 21 to 23 onto the upstream transmission path 31, and after being sent back onto the downstream transmission path 32 by the head end apparatus 4, are received from the downstream transmission path 32 by the modem of the destination terminal apparatus. While data are being transmitted continuously by a specific modem via the upstream transmission path 31, if data transmission is commenced by any other modem, then signal conflict will arise on the upstream transmission path 31. To avoid that situation, when a modem is to transmit data, it is first confirmed by that modem that no data are currently being transferred over the downstream transmission path 32. If a modem finds that data conflict occurs while it is transmitting, then the modem halts its transmission, and subsequently retransmits the data.

As shown in FIG. 1, each modem consists of an input/output interface 81 between the modem and the corresponding terminal apparatus), a transmitting buffer 82 which temporarily holds data that are to be transmitted, and a transmitting circuit 83 which executes modulation of the data which are to be transmitted (generally by frequency modulation) and then transmits the resultant signal at a specific transmission level, via the upstream transmission path 31. The modem further includes a receiving circuit 84 which receives modulated data from the downstream transmission path 32 and demodulates the data, a receiving buffer 85 which temporarily holds received data, and a transmission control circuit 86 which controls the timings of data transmissions.

FIG. 2 shows the configuration of the transmission control circuit 86. As shown, this is made up of a CSMA control circuit 87 which executes control whereby transmission is only started after it has been confirmed that data are not currently being transmitted via the downstream transmission path 32, while transmission data are being held in the transmitting buffer 82. The transmission control circuit 86 further includes a bit detection circuit 89 which detects the level of the signal that is received by the receiving circuit 84, and judges whether the received signal level is higher than the normal level. If it is detected that the received signal level is higher than the normal level, then this is taken as indicating that data are currently being transmitted by two or more modems, i.e. that data conflict is occurring. A receiving buffer clearing circuit 90 erases the data which are currently being held in the receiving buffer 85 if such a conflict condition is detected. A transmitting control circuit 88 executes control whereby data are retransmitted after a fixed time interval has elapsed, following detection of a data conflict.

The operation of such a CATV-LAN, when data are transmitted from the terminal apparatus 11 to terminal apparatus 12, is as follows. Firstly, the terminal apparatus 11 outputs the data to the input/output interface 81 of the modem 21. The input/output interface 81 temporarily stores the data within the transmitting buffer 82. The CSMA control circuit 87 of the transmission control circuit 86, when data have been set into the transmitting buffer 82, checks whether any data are currently being transferred via the downstream transmission path 32. If it is found that data are being transferred, then transmission of the data via the transmitting circuit 83 to the upstream transmission path 31 is inhibited, until is is detected that the transfer of data via the downstream transmission path 32 has ended. However if the CSMA control circuit 87 finds that data are not currently being transferred via the downstream transmission path 32, then transmission of data via the transmitting circuit 83 to the upstream transmission path 31 is immediately started.

If no data conflict occurs, i.e. if no other modem attempts to transmit data at the same time, then the transmitted data are returned by the head end apparatus 4, along the downstream transmission path 32, to each of the modems. If a modem detects that its own terminal apparatus is the destination for the data which are being transferred via the downstream transmission path 32, then the received data are set into the receiving buffer 85 of that modem, and after all of the data have been received, the data held in the receiving buffer 85 are transferred through the input/output interface 81 to the corresponding terminal apparatus (i.e. in this example, to the terminal apparatus 12).

If while data are being transmitted continuously by the modem 21, some other modem begins to transmit data (i.e. unaware that data are currently being transmitted by the modem 21, since these data have not yet reached that other modem after having been sent back along the downstream transmission path 32), then data conflict will occur.

For example, assuming that the modem 22 attempts to begin data transmission immediately after the modem 21 has commenced transmission, then while the leading part of the data which are being transmitted by the modem 21 has not yet reached the modem 22, modem 22 will assumed that the transmission path is vacant, and so will commence transmission. In that case, when the leading part of the data transmitted by the modem 22 reaches the location of the modem 21 (i.e. after being sent back along the downstream transmission path 32), the data which are being transmitted by the modem 21 will conflict with the leading part of the data which are transmitted by the modem 22.

In each modem, if the beat detection circuit 89 judges (based on the difference between the normal received signal and the signal which is received when there is data conflict) that conflict is occurring, and if the destination of the data is the terminal apparatus which corresponds to that modem, then the beat detection circuit 89 causes the receiving buffer clearing circuit 90 to command the receiving buffer 85 to delete the data which have been stored therein up to that point.

If at that time the modem itself is in the process of transmitting data when the conflict occurs, then the transmitting control circuit 88 of the modem is caused (by the beat detection circuit 89) to execute operations for retransmitting the data. In the present example, assuming that both of the modems 21 and 22 were transmitting data when a conflict occurred, then each of these will subsequently retransmit their respective data, from the beginning of the data. It is important to note here that if the modems 21 and 22 were both to begin retransmitting data after an identical time interval had elapsed, then of course a data conflict would again occur. For that reason, respective randomly determined values are assigned to that time interval which elapses before retransmission begins, for the various modems. It thereby becomes possible to execute retransmission without the occurrence of conflict.

However when such a prior art type of CATV-LAN is used to implement a CATV-LAN system, it is necessary to provide a dedicated circuit for beat detection within each of the modems, in order to detect the occurrence of data conflict. This has the disadvantage of increasing the system cost.

Moreover, when conflict occurs between two signals which are transmitted over the transmission path by respective modems, if it is ensured that there is a specific difference in transmission signal levels between the two signals, then it becomes possible to correctly transmit the signal which has the higher value of transmission level. That is referred to as the capture effect. However, with a prior art type of CATV-LAN, the transmission levels of the signals transmitted from respective nodes are made identical, in order to enable conflict to be detected by the beat detection circuit within each modem, based upon received signal levels. For that reason, it has not been possible to utilize the capture effect.

If it were attempted to directly use the capture effect, by simply assigning respectively different values of transmission level to the various modems, then the modems which transmit at a high signal level would always receive priority, so that there would be an imbalance between the respective rates at which opportunities provided for transmission, between the various modems.

Furthermore with a prior art CATV-LAN, when signal conflict occurs, then signal retransmission occurs after a randomly determined time interval, so that it is not possible to immediately send any signal which is urgent. In addition, it becomes impossible to guarantee the actual interval which will elapse between the time at which a signal is sent from a terminal apparatus to the corresponding modem and the time at which the signal is transmitted.

SUMMARY OF THE INVENTION

It is an objective of the present invention to overcome the above problems of the prior art by providing a CATV-LAN whereby the capture effect can be effectively utilized to achieve an increased level of signal transmission efficiency, and moreover whereby imbalance between respective opportunities for signal transmission by the various modems is prevented, and further whereby retransmission of signals can be effectively performed after the occurrence of signal conflict.

A CATV-LAN according to the present invention comprises a plurality of modems for transmitting messages to an upstream transmission path and for receiving messages from a downstream transmission path, terminal apparatuses for supplying messages to and for receiving messages from the modems, and a head end apparatus for transmitting to the downstream transmission path messages which have been transmitted over the upstream transmission path. Each of the modems comprises transmitted/received data comparison means which compares received data with transmitted data, while the modem is itself transmitting data. Each modem also includes retransmission means for retransmission means a message after a predetermined time interval has elapsed, when it is detected as a result of the comparison that the transmitted data and received data to not coincide. The modem further includes receiving control means which functions, when the each modem is not itself transmitting a message and when the length of received data does not attain a message length which is specified in a received message, to discard the received data.

Furthermore, the modem includes carrier transmitting means for transmitting a carrier to the upstream transmission path, as a transmitted data carrier. The carrier transmitting means functions, when the transmitted/received data comparison means detects that the received data and transmitted data do not coincide, to interrupt the transmitting of the carrier after having transmitted the carrier during a fixed time interval.

Moreover, when it is detected by the transmitted/received data comparison means that the received data and transmitted data do not coincide, the carrier transmitting means continues transmitting of the carrier during the fixed time interval only if the detection of non-coincidence occurs at a point in time when transmitting of all of the data of the message has been completed.

Furthermore, the retransmission means of respective ones of the modems can be configured to hold data specifying respectively different values of the redetermined time interval which elapses before retransmission is started.

In addition, the retransmission means can be configured to function such that each time a message transmission is performed, the retransmission interval specified for the modem is exchanged for the retransmission interval that has been specified for another modem.

Furthermore, the modems can be configured to execute transmission of messages using respectively different predetermined transmission levels.

Moreover each of the modems can be configured such that, upon completion of a message transmission, the modem inhibits transmission of a succeeding message until the modem detects that an idle condition of the transmission path has continued for a predetermined time interval.

The predetermined interval during which the idle condition must continue to be detected is preferably made equal to a slot time interval, where a slot time interval is maximum interval which will elapse between the time at which data are transmitted and the time which the data are received. More specifically, the slot time interval is the the interval which elapses between the point at which data begin to be transmitted by the modem which is located farthest from the head end apparatus, along the transmission path, until the point at which the leading part of the transmitted data is received by that modem from the transmission path.

Moreover, each of the modems can comprise priority detection means for detecting a degree of priority which is specified within the next message that is to be transmitted by the modem. In that case, the modem varies the duration of the time interval for which the idle condition must be detected as continuing, in accordance with the priority degree that is detected by the priority detection means.

The priority degree can take one of a plurality of stepwise-varying values, and the time interval for which the idle condition must continue to be detected is set as an integral number of slot time intervals, in accordance with the priority degree which is detected for the next message that is to be transmitted.

Moreover, each of the modems can comprise priority altering means, for altering a priority degree that has been detected by the priority detection means, with the priority altering means changes the priority degree in accordance with the amount of data which constitutes the next message that is to be transmitted by the modem.

Also, each of the modems can comprise transmission level adjustment means for randomly changing the transmission levels of respective messages.

Such a modem can further comprise priority detection means for detecting the degree of priority which is specified within a message, with the transmission level adjustment means altering the transmission level at which a message is transmitted, and with the range of variation of that alteration being determined in accordance with the degree of priority that is detected for that message.

Furthermore, each of the modems can further comprise time-guaranteed message holding means for storing a time-guaranteed message, and a guarantee interval timer. When a time-guaranteed message is received by a modem from the corresponding terminal apparatus, the guarantee interval timer begins a timing operation. If no message is currently being transmitted by that modem, then it immediately attempts to transmit the time-guaranteed message. If a normal message is currently being transmitted by that modem, then when the guarantee time interval has elapsed, transmission of that message is interrupted, and the modem immediately attempts to transmit the time-guaranteed message.

In such a modem, the guarantee interval timer can alter the value of the guarantee time interval which is measured thereby, in accordance with a guarantee request time which is specified within the time-guaranteed message.

Moreover, respective groups of modems can be defined, each group consisting of modems which have respectively different values of transmission level, with each of the modems comprising group identification registering means for registering a group number to which the modem belongs, and a group identifier counter for obtaining a count value which indicates the number of a group whose members currently have the right to transmit messages. When the group number counted by the group identifier counter coincides with the number which is held in the group identifier registering means of a modem, message transmission can be executed by that modem.

Each modem can also comprise path distance comparator means for comparing the return path distance between the modem and the head end apparatus and the downstream transmission path occupancy distance (i.e. the length of a section of the downstream transmission path which is currently occupied by data which have just been transmitted by the modem). When the path distance comparator means detects that the downstream transmission path occupancy distance is smaller than the return path length, the modem can begin transmission of a new message.

Moreover, a modem can comprise synchronizing signal receiving means for receiving a synchronizing signal which transmitted by the head end apparatus onto the downstream transmission path, multiplexed with the modulated data from the modems, and can supply the synchronizing signal to a video signal transmitting circuit which transmits to the upstream transmission path modulated data expressing a video signal from a monitor video camera.

Each modem can further include operation sequence registering means for registering an operation sequence, with the operation sequence being executed under the control of the synchronizing signal receiving means.

Each of the modems can also comprise a video receiving circuit for receiving video data, obtained as multiplexed data from the downstream transmission path.

Also, each of the modems can comprise preamble transmitting means for transmitting only the carrier during a fixed time interval, immediately prior to transmitting the data of a message in conjunction with the carrier, and preamble receiving means for initializing a receiving status when the carrier is received.

Due to the various functions which can be provided in each modem of such a system, as set out above, the following advantages are obtained.

Firstly, while a modem is in the process of transmitting a message, the modem compares the transmission data with the received data. If these do not match, then it is judged that data conflict has occurred, in which case the modem halts the transmission. Subsequently, the modem retransmits the message. However even if data conflict occurs, if the data of a message are being correctly transmitted because of the capture effect, then transmission of the message is continued. If the actually received number of data in a message which is being received by a modem is less than the number of data which are specified for that message (i.e. specified within the message itself) then the modem judges that conflict has occurred and that transmission of the message has been interrupted. In that case, the receving modem discards the part of the message which it has temporarily stored. However in that case too, if the data of a message are being correctly received because of the capture effect, then the receiving process is continued for the entirity of the message.

If only the final datum of the received message has been made indefinite, because of occurrence of conflict, then the receiving modem cannot use the above method to judge that conflict has occurred, i.e. by judging on the basis of the received message length. In that case, when the modem which transmits that message detects that conflict has occurred, that modem continues to transmit the carrier alone for a certain time interval, after transmission of the message has been completed. The receiving modem is thereby notified that conflict has occurred.

Furthermore, by ensuring each modem can only begin retransmission of a message after a specific time interval has elapsed following termination of transmission as a result of detecting data conflict, and by establishing respectively different values for that time interval, between the various modems, it is ensured that conflict will not again occur when retransmission of a message is executed. If these retransmission time intervals were to be made fixed, for each modem, then an imbalance would arise in the respective rates at which the various modems are permitted to execute message transmissions. However that problem is overcome by interchanging these time intervals between respective modems, each time that a message transmission is executed.

In addition, the capture effect is utilized, by assigning respectively different transmission levels to the various modems. The modems are configured such that each time a modem transmits a message, the modem inhibits itself from transmitting any succeeding message until it has detected that an idle condition has continued for a duration which is at least equal to a slot time interval. As defined hereinabove, the term "slot time interval" signifies the maximum time required for a modem to receive data after it has transmitted that data. The "idle condition" is a condition in which no carrier is present on the transmission path. In that way, it becomes possible to prevent the concentration of transmission opportunities in those modems which have the highest values of transmission level.

Furthermore by changing the value of the time interval during which the idle condition must continue to be detected, in accordance with a priority which is assigned to a message that is to be transmitted by a modem, it becomes possible to transmit messages in order of their priority.

Also, by randomly changing the transmission levels of the various modems, the respective numbers of transmission opportunities become balanced, among the modem. Furthermore by using a high transmission level for a message which has a high priority, messages can be transmitted on a priority basis.

Furthermore in the case of messages for which it is necessary to guarantee the maximum amount of delay which will occur before the message is transmitted (after being issued by a terminal apparatus), such messages are transmitted first, with normal messages being transmitted thereafter. If a time-guaranteed message is issued by a terminal apparatus to the corresponding modem while transmission of a normal message by that modem is still in progress, and if sending of that normal modem is not completed within the time interval which is guaranteed as the transmission delay, then transmission of the normal message is interrupted, and transmission of the time-guaranteed message is executed, to thereby satisfy the guaranteed transmission delay requirement.

Also, by dividing the modems into groups, with the modems within a group having respectively different values of transmission level, and sequenially assigning to the groups the right to transmit messages, it can be ensured that the the capture effect is effectively utilized, and the overall transmission efficiency is increased.

Furthermore by providing each modem with a path comparison means, for comparing the return path length between the modem and the head end apparatus with the length of the part of the downstream transmission path that is currently occupied by data that have been transmitted by that modem, it becomes possible to transmit a message while the upstream transmission path is in the idle condition even if the downstream transmission path has not yet reached the idle condition.

Furthermore, by arranging that the head end apparatus transmits a synchronizing signal to each of the modems, via the transmission path, and providing a synchronizing signal receiving circuit in each of the modems, it becomes possible to mutually synchronize the operations of the various modems.

In that case, by providing modems with a video signal receiving circuit and video signal transmitting circuit, a monitor camera system can be configured in which the video signals transmitted by the modems are mutually synchronized, so that switching between the respective video signals can be performed without producing disorder in the resultant display pictures.

Also, if the carrier alone is transmitted during a fixed time interval prior to transmitting a message, i.e. a preamble interval, then when data conflict occurs between two messages, and only one of the messages is successfully transmitted due to the capture effect, the exact point at which that message begins can be accurately defined, when the message is received by another modem.

BRIEF DESCRIPTION OF THE DRAWINGS

FIG. 4 is a circuit block diagram of a modem used in a first embodiment of a CATV-LAN according to the present invention;

FIG. 6 illustrates a first pattern of data conflict between messages, for the first embodiment;

FIGS. 7A, 7B illustrate the occurrence of conflict on the transmission path;

FIGS. 11A, 11B, 11C illustrate a secondpattern of data conflict between messages, for the first embodiment;

FIGS. 18A, 18B, 18C show examples of tables for use in determining retransmission time intervals for respective modems, used in the second embodiment;

FIG. 28 is a circuit block diagram of a modem used in a fourth embodiment of a CATV-LAN according to the present invention;

FIG. 31 is a circuit block diagram of a modem used in a fifth embodiment of a CATV-LAN according to the present invention;

FIGS. 32A, 32B show an example of a message transmission sequence, for the fifth embodiment;

FIG. 38 shows an example of a message transmission sequence, for the seventh embodiment;

FIG. 43 shows an example of a message transmission sequence, for the eighth embodiment;

FIG. 46 shows an example of a message transmission sequence, for the ninth embodiment;

FIGS. 50, 51 are flow diagrams of operations executed by the tenth embodiment;

DESCRIPTION OF PREFERRED EMBODIMENTS

Figure 1:
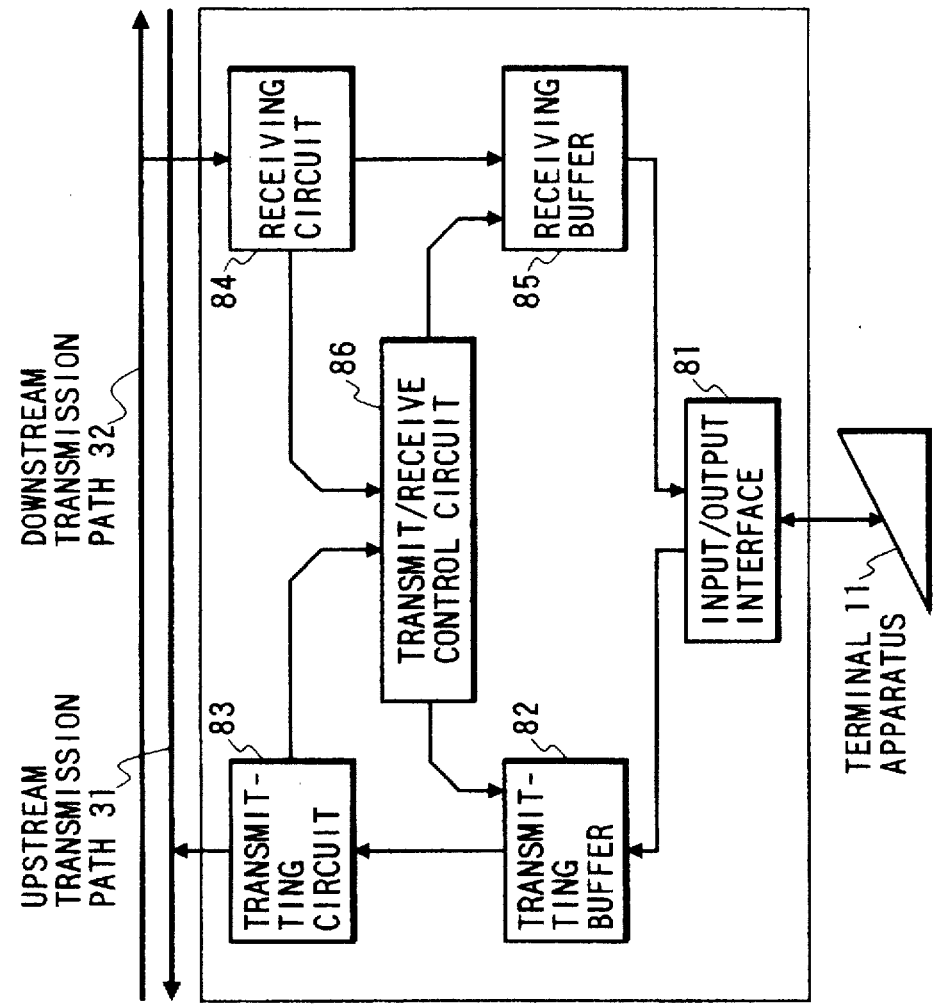
FIG. 1 is a circuit block diagram of an example of a modem in a prior art type of apparatus which can be utilized as a CATV-LAN.
Figure 2:
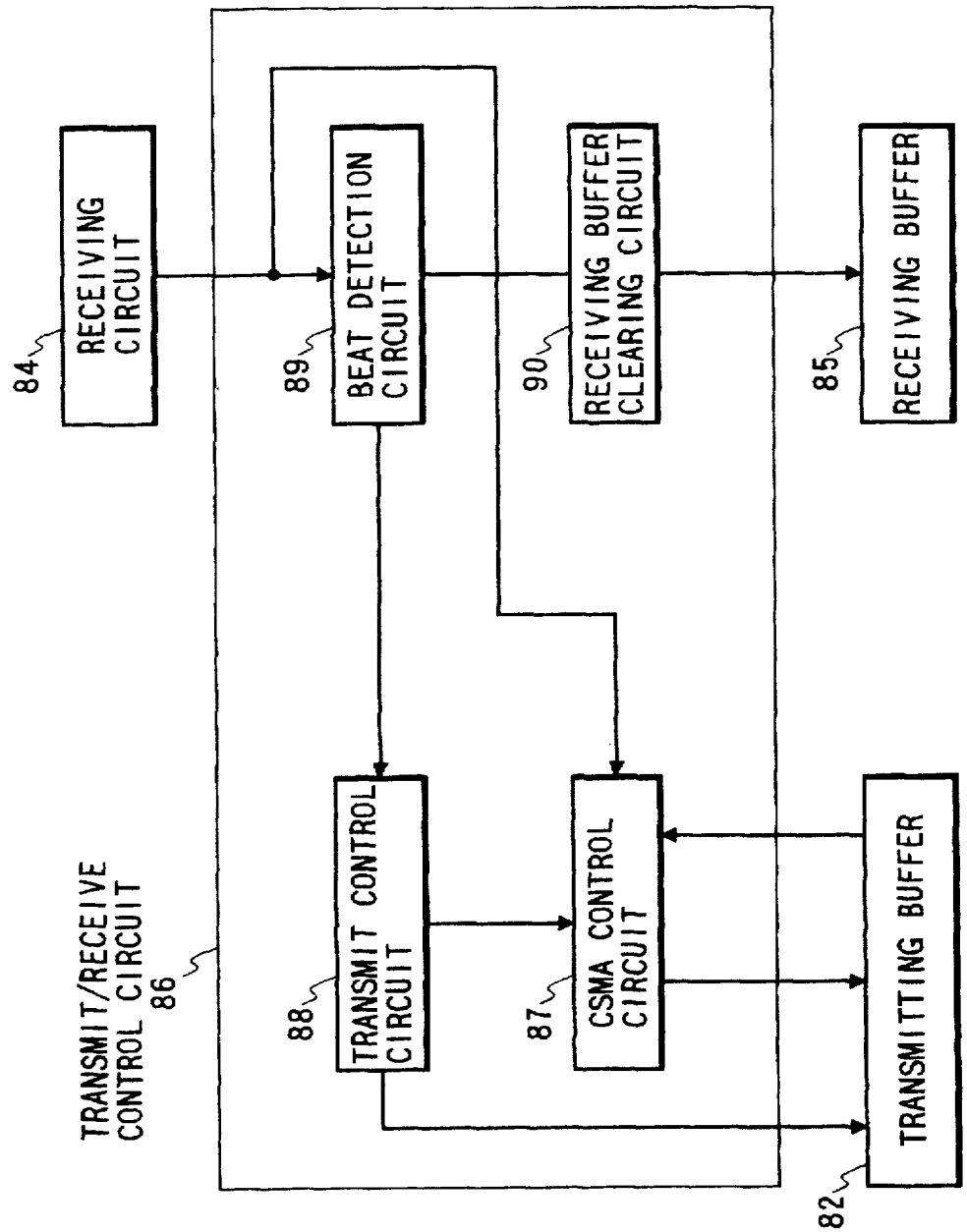
FIG. 2 is a circuit block diagram of a receiving control circuit in the example of FIG. 1.
Figure 3:
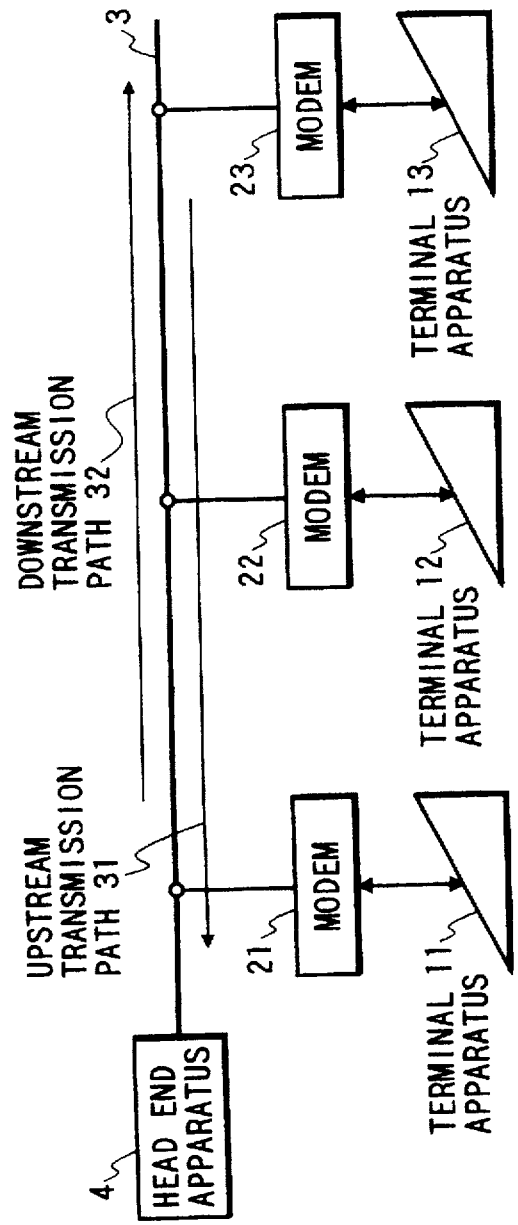
FIG. 3 illustrates the basic general configuration of a CATV-LAN.

A first embodiment of a CATV-LAN according to the present invention will be described in the following, which will be assumed to have an overall configuration that is identical to the prior art configuration shown in FIG. 3. As stated above, the transmission path 3 may consist of respective separate cables which function as the upstream transmission path 31 and downstream transmission path 32, or (if the head end apparatus 4 remodulates the data which it receives, using different modulation frequencies from those of the modems) it is possible to implement both the upstream transmission path 31 and downstream transmission path 32 in a single cable.

Furthermore, although it will be assumed in the following description of embodiments that data, after being modulated (e.g. using FSK modulation) are then up-converted in frequency by being mixed with a high-frequency carrier, before being transferred to the transmission path 3, and are subsequently down-converted when received from the transmission path 3, the invention is equally applicable to a CATV-LAN in which the modulated data are directly supplied to the transmission path 3. Thus, the function of the carrier for frequency up-conversion is, in itself, not relevant to the invention. In relation to the invention, the carrier functions as a pilot signal, which is sent by a modem to the transmission path together with a signal which expresses data that are being transmitted by that modem. As will be made clear in the following, various operations of a modem can be controlled in accordance with whether or not the pilot signal is being received from the transmission path by the modem.

Hence, if the invention is applied to a CATV-LAN in which frequency up-conversion and down-conversion are not performed by the modems, then it is necessary to provide in each modem a pilot signal generating circuit, and a signal combining circuit for combining the pilot signal with the modulated (for example, FSK modulated) data that are being transmitted. However if frequency up-conversion and down-conversion are performed by each modem of the system, as in the following described embodiments, then a carrier signal generating circuit serves the function of the aforementioned pilot signal generating circuit, and a mixer circuit used for frequency up-conversion serves the function of the aforementioned signal combining circuit.

It will also be assumed that data are conveyed as asynchronous data packets which will be referred to herein as messages, with each message consisting of at least three data units, each data unit formed of a specific number of bits. Each such data unit will be referred to as a datum, and can for example consist of an integral number of bytes.

With the first embodiment of the invention, each of the modems 21 to 23 has the configuration shown in the circuit block diagram of FIG. 4. As shown in FIG. 4, such a modem includes a transmitting buffer 51 which temporarily holds a message which has been sent from the corresponding terminal apparatus 11, and a transmitting control circuit 52 which checks whether any carrier is currently being transmitted over the downstream transmission path 32. If no carrier is present on the downstream transmission path 32, the transmission control circuit 52 sequentially transfers the data of the message from the transmitting buffer 51 to the transmitting circuit 53. The modem further includes a carrier generating circuit 54 which generates a carrier, for frequency up-conversion of modulated data, a transmitting circuit 53 for modulating, preferably by frequency shift keying (FSK) modulation, the data which are transferred by the transmission control circuit 52, mixing a resultant modulated data signal with the carrier that is produced from the carrier generating circuit 54, and transferring the resultant signal onto the upstream transmission path 31. While a message is being transmitted by the modem, a transmitted data counter circuit 55 counts the number of data which have been transmitted. A receiving circuit 58 is coupled to receive data signals from the downstream transmission path 32 and performs frequency down-conversion and demodulation of the received data signals, to recover the originally transmitted data of a message. A received data counter circuit 59 counts the number of data which have been received, and a transmitted/received data comparator circuit 60 determines whether there is a match between the received data and the corresponding transmitted data, while that modem is itself transmitting a message. A retransmission control circuit 61 judges that a data conflict is occurring, when a mismatch condition is found by the transmitted/received data comparator circuit 60, sends command signals to the transmitting control circuit 52, causing that circuit to halt transmission of the message and to retransmit the data after a certain time interval has elapsed. The modem further includes a transmitting buffer clearing circuit 56 for clearing the contents of the transmission buffer 51 when comparison operations have been completed for all of the transmitted data. A carrier detection circuit 57 detects the presence of a carrier on the downstream transmission path 32 and notifies the transmission control circuit 52 and a receiving control circuit 63 of that carrier presence. The receiving control circuit 63 controls the transfer of received data to the receiving buffer 64, and may designated (in accordance with circumstances) that the contents of the receiving buffer 64 are to be cleared or are to be transferred to the terminal 11. The receiving buffer 64, temporarily holds data which have been transferred by the receiving control circuit 63, before transferring the data to the terminal 11 when all of the data of a message have been received. A receiving buffer clearing circuit 62 acts to clearing the contents of the receiving buffer 64 when necessary.

It should be made clear that the word "carrier" as used herein is applied only to a high-frequency carrier which is combined with a modulated data signal in a mixer, for frequency up-conversion of the modulated data signal prior to transmission, and that the word "carrier" is never used herein in relation to direct modulation of data (such as FSK modulation). As stated above, such a carrier also performs the function of a pilot signal, which is an essential function in a CATV-LAN according to the present invention.

Figure 5:
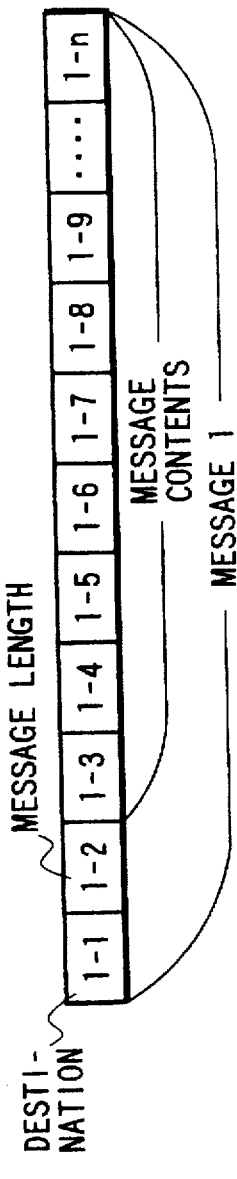
FIG. 5 shows the configuration of a message, in the first embodiment.

As shown in FIG. 5, each message which is transferred between two terminal apparatuses consists of a first datum (1-1) which expresses the destination of the message, a second datum (1-2) which expresses the total length of the message (i.e. the total number of data constituting the message) and data (1-3) to (1-n) which express the actual message contents which are to be transferred.

The transmitted data counter circuit 55 and the received data counter circuit 59 of the modem 21 sequentially count the data (1-1), (1-2) (1-3), etc. of the message. While the modem 21 is transmitting data onto the upstream transmission path 31, the transmitted/received data comparator circuit 60 successively compares the first datum (1-1) of the transmitted data (i.e. a datum which has already been transmitted, and is obtained from the transmitting buffer for the purpose of comparison) with the first datum of the received data, the second datum (1-2) of the transmitted data with the second datum of the received data, and so on. If the receiving circuit 58 of modem 21 receives data while modem 21 is not itself transmitting data, and the terminal apparatus 11 is specified as the destination of the message the receiving control circuit 63 transfers the received data to the receiving buffer 64 If the carrier (as detected by the carrier detection circuit 57) ceases to be received from the downstream transmission path 32 before the complete message has been received (i.e. before the number of data specified as the message length, by the second datum of the message, have been received), then this is judged by the receiving control circuit 63 as indicating that data conflict has occurred. In that case, the receiving control circuit 63 comands the receiving buffer clearing circuit 62 to clear the contents of the receiving buffer 64.

If the first datum of the received message does not specify terminal apparatus 11 as the destination for the message, then the receiving control circuit 63 causes the message data to be discarded.

The operation of this CATV-LAN will be described by utilizing examples of message transfer from the terminal apparatus 11 to the terminal apparatus 13.

With this first embodiment of the invention, it is assumed that all of the modems transmit data at the same transmission level, and that the length of time for which a message is transmitted is sufficiently long by comparison with the time which elapses from the point at which data conflict is detected and the point at which transmission of a message is halted in response to detection of that data conflict. The time required for data to be transmitted from the modem which is located farthest from the head end apparatus and to return to that modem will be referred to as the slot time interval.

The terminal apparatus 11 first stores the message which is to be transmitted, within the transmitting buffer 51 of the modem 21. It will be assumed that this message is message 2 which is shown in FIG. 6A. When a message has thus been set into the transmitting buffer 51, the transmitting control circuit 52 checks whether the carrier detection circuit 57 detects the presence of a carrier on the downstream transmission path 32. If at that time no carrier is being detected, then transmission of the message is immediately started. Otherwise, message transmission is delayed until the carrier is no longer detected, then message transmission is started. It can thus be understood that transmission of a message is started only under the condition that there is no carrier being transmitted on the downstream transmission path 32.

When transmission of the message is to begin, the transmitting control circuit 52 first commands the carrier generating circuit 54 to begin generating the carrier. In response, the carrier generating circuit 54 begins to supply the carrier to the transmitting circuit 53. The transmission control circuit 52 then reads out from the transmitting buffer 51 the first datum (2-1) of the message 2, and transfers that datum to the transmitting circuit 53. At the same time, the transmitted data counter circuit 55 is set to a count of 1. The transmitting circuit 53 modulates the first datum (2-1), mixes the resultant modulated data signal with the carrier, and transfers the resultant signal to the upstream transmission path 31.

When transmission of that first datum has been completed, the transmitting circuit 53 increments the transmitted data counter circuit 55 to a count of 2.

Each time the count in the transmitted data counter circuit 55 is updated, the transmitting control circuit 52 reads out from the transmitting buffer 51 the datum which has the serial number that is equal to the count value. In this case, when the count in the transmitted data counter circuit 55 is 2, the second datum of the message, i..e datum (2-2) is read out from the transmitting buffer 51 and transferred to the transmitting circuit 53.

At that time, since the datum (2-2) expresses the message length, the transmitting control circuit 52 registers (within an internal register, not shown in the drawing) the value which is expressed by the datum (2-2), as the message length. This will be assumed to be 30. If each datum is a single byte, for example, the message length would be 30 bytes in that case.

The first datum of the actual contents of the message is then transmitted, and the operations of incrementing the count value and transmitting the corresponding datum are thereafter repetitively performed until the entire message has been transmitted, i.e. until the number of data which have been transmitted becomes equal to the message length (30).

If data are transmitted from any other modem while the transmission by the modem 21 is in progress, then the data signal from that other modem (i.e. combined with the carrier) will be returned from the head end apparatus, transferred along the downstream transmission path 32, and thereby distributed to each of the modems. In that case, i.e. if a message begins to be transmitted by some other modem before the complete data of the message 2 have been distributed to all of the modems, then this will result in data conflict. The time interval which elapses from the start of transmitting a message until that message has been distributed to all of the modems is a fixed value, which depends upon the length of the transmission path. If another modem should begin to transmit data within that time interval, i.e. before the message 2 has been distributed to all of the modems, then data conflict will occur. With a system of the type which is being described, whereby each modem individually checks the transmission path to determine whether data are currently being transmitted over that path, such conflicts are inevitable.

It will be assumed that, as shown in FIG. 6B and FIG. 7A, immediately after the modem 21 has started to transmit the message 2, the modem 22 begins to transmit the data of message 3., by the same process as described above. The result is illustrated in FIG. 7B.

Immediately after the modem 21 has started to transmit the message 2, the signal carrying that message has not yet reached the modem 22, and so the modem 22 judges that the transmission path is available, and begins to transmit data. As a result, the data of message 2, transmitted by modem 21 and the data of message 3, transmitted by modem 22, will conflict, as shown in FIG. 7B.

The resultant signal which is actually transmitted is as shown in FIG. 6C. The conflict condition continues from the time at which the leading datum of message 3 (transmitted by modem 22) reaches the position of modem 21, until the time at which the modem 21 halts the transmission of message 21 after judging that conflict has occurred. The signal data which result from conflict between two messages are indefinite, as indicated in the drawings.

The head end apparatus 4 has thus, in effect, transmitted onto the downstream transmission path 32 the message 23 which is shown in FIG. 6C, and that message 23 is thus received by each of the modems.

When data conflict occurs, each modem executes the following actions. Firstly, after message 2 begins to be transmitted, the carrier detection circuit 57 of the modem begins to detect the carrier (which begins to be transmitted slightly before transmission of the modulated data actually starts). The receiving circuit 58 then receives the initial datum (2-1) of the message 23, and sets the received data counter circuit 59 to a count of 1. If the modem receiving the data is the same modem which is transmitting the message, then the transmitted/received data comparator circuit 60 of that modem judges whether conflict is occurring. In this example, the modem 21 is in the process of transmitting data, so that the transmitted received data comparator circuit 60 of that modem executes conflict judgement operations.

Thus, when the transmitted/received data comparator circuit 60 receives the first datum (2-1) of message 23 from the receiving circuit 58, it then reads out from the transmitting buffer 51 the datum having a serial number which is expressed by the count value in the received data counter circuit 59. In this example, the first datum (2-1) will be read out from the transmitting buffer 51. That datum, and the datum which has been received from the downstream transmission path 32, are then compared. If no transmission errors have occurred, these will be identical. The above operations are thereafter successively repeated until all of the data (i.e. corresponding to the specified message length) have been received, or until it is found that the received data do not match the transmitted data.

In this example, conflict occurs when the fourth datum (2-4) is transmitted by the modem 21. Specifically, at the time when the modem 21 subsequently should be receiving that fourth datum (as indicated by the count value of the received data counter 59), it is found that the received datum is indefinite, i.e. there is a mismatch between the transmitted datum (2-4) which is being read out from the transmitting buffer 51 and the actually received datum (3-1). The retransmission control circuit 61 of the modem 21 then commands the retransmission control circuit 61 to begin operations for message retransmission.

The retransmission control circuit 61 also then commands the transmitting control circuit 52 to immediately terminate the message transmission. It is assumed in FIG. 6C that when the data expressing conflict are received, the modem 21 has already started to transmit the datum (2-5), so that transmission of the message 2 is terminated immediately after the datum (2-5) has been transmitted. The retransmission control circuit 61 then determines the time interval which will elapse before message retransmission begins. In this embodiment, this time interval (referred to as the retransmission time interval) is selected randomly within a fixed range of values. When that retransmission time interval has elapsed, the retransmission control circuit 61 commands the transmitting control circuit 52 to begin to retransmit the message 2. If at that time there is no carrier present on the downstream transmission path 32, then the message 2 immediately begins to be transmitted onto the upstream transmission path 31.

The modem 22 executes similar conflict judgement operations. However the modem 22 detects conflict when that modem receives the datum (2-1) of the message 2, and finds that this does not match the datum (3-1) of message 3 which it has previously transmitted, and which it should receive at that time. As a result, transmission of the message 3 is halted immediately after the datum (3-6) has been transmitted.

After conflict has occurred, the modems 21 and 22 each begin operations for retransmission of the respective messages 2 and 3. However of course if both of these modems were to begin retransmission at the same time, then conflict would again occur. For that reason, with this embodiment, the time intervals which elapse between the point at which transmission is halted because of data conflict and the point at which retransmission begins are randomized, between the various modems, so that there is only a low probability that both of the modems 21, 22 will each begin retransmission at the same time.

It will be assumed that the modem 21 is the first to begin retransmission, and that the modem 22 does not attempt to begin retransmission until a sufficient time has elapsed after the modem 22 receives the carrier tranmitted by the modem 21. In that case, after the modem 21 begins retransmission of message 2, no conflict condition will occur, so that for all of the data from the transmitting buffer 51 of the modem 21 (i.e. the data constituting the complete message length) there is no mismatch detected between the received data and the data read out from the transmitting buffer 51

If correct data matching has occurred for all of the transmitted data, then the transmitted/received data comparator circuit 60 commands the transmitting buffer clearing circuit 56 to clear the message from the transmitting buffer 51. The received message is then transferred from the receiving buffer 64 to the terminal apparatus 11.

Thereafter, when a new message is written into the transmission buffer 51, the operations described above are repeated, to transmit that message.

It will now be assumed that the modem 23 receives the message 23 shown in FIG. 6C, i.e. the message which has resulted from conflict between the messages 2 and 3 shown in FIGS. 6A, 6B. It will further be assumed that the datum (2-1) of the message 23 specifies that the modem 23 is the destination of the message. Firstly, it can be assumed that the received data counter circuit 59 has been set at an initial value of 0. When the receiving circuit 58 of the modem 23 receives the initial datum (2-1) of message 23, the count value in the received data counter circuit 59 of that modem is set to 1. At that time, the receiving control circuit 63 of that modem judges that the destination which is specified in that datum (2-1) is the modem 23 itself, whereupon the datum (2-1) is set into the receiving buffer 64.

The receiving circuit 58 then receives the datum (2-2) of message 23, whereupon the received data counter circuit 59 is incremented by 1, to the value 2. The receiving control circuit 63 then detects the fact that the message length which is specified in datum (2-2) is 30. The above operations are then successively repeated until the entire message has been received, i.e. until the count value of the received data counter circuit 59 becomes identical to the message length.

However if as in this case it is found that the carrier is no longer being transmitted on the downstream transmission path 32 before the data of the entire message length have been received, then the receiving control circuit 63 judges that conflict has occurred in the received data. In the case of the message 23, the length of the message (i.e. 9) is shorter than the message length (30) that is specified in the datum (2-2), so that it is judged by the receiving control circuit 63 that conflict has occurred.

The receiving control circuit 63 then designates to the receiving buffer clearing circuit 62 that the contents of the receiving buffer 64 are to be cleared. Subsequently, the modem 23 receives the message 2 when that is retransmitted by the modem 21. The destination of this message is again the modem 23, and so the modem 23 repeats the operations described above. In this case, no conflict occurs, 60 that the received message length and the specified message length are identical.

When all of the data of the message 2 have thus been received, the receiving control circuit 63 of the modem 23 designates to the receiving buffer 64 that the received message which is being held in the receiving buffer 64, i.e. the message 2, can be transferred to the terminal apparatus 13.

Figure 8:
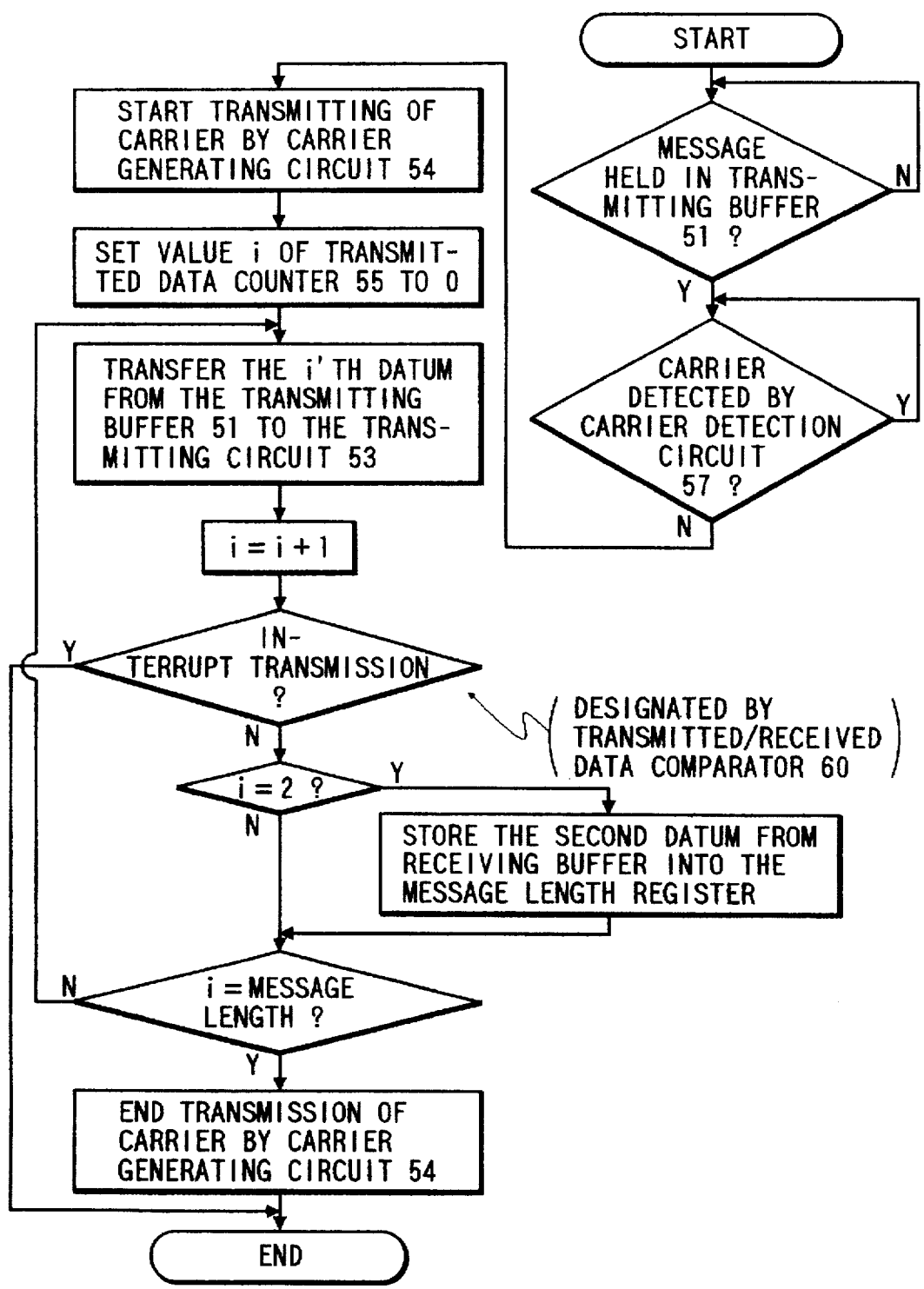
FIGS. 8, 9 and 10 are flow diagrams of operations executed by the first embodiment.
Figure 9:
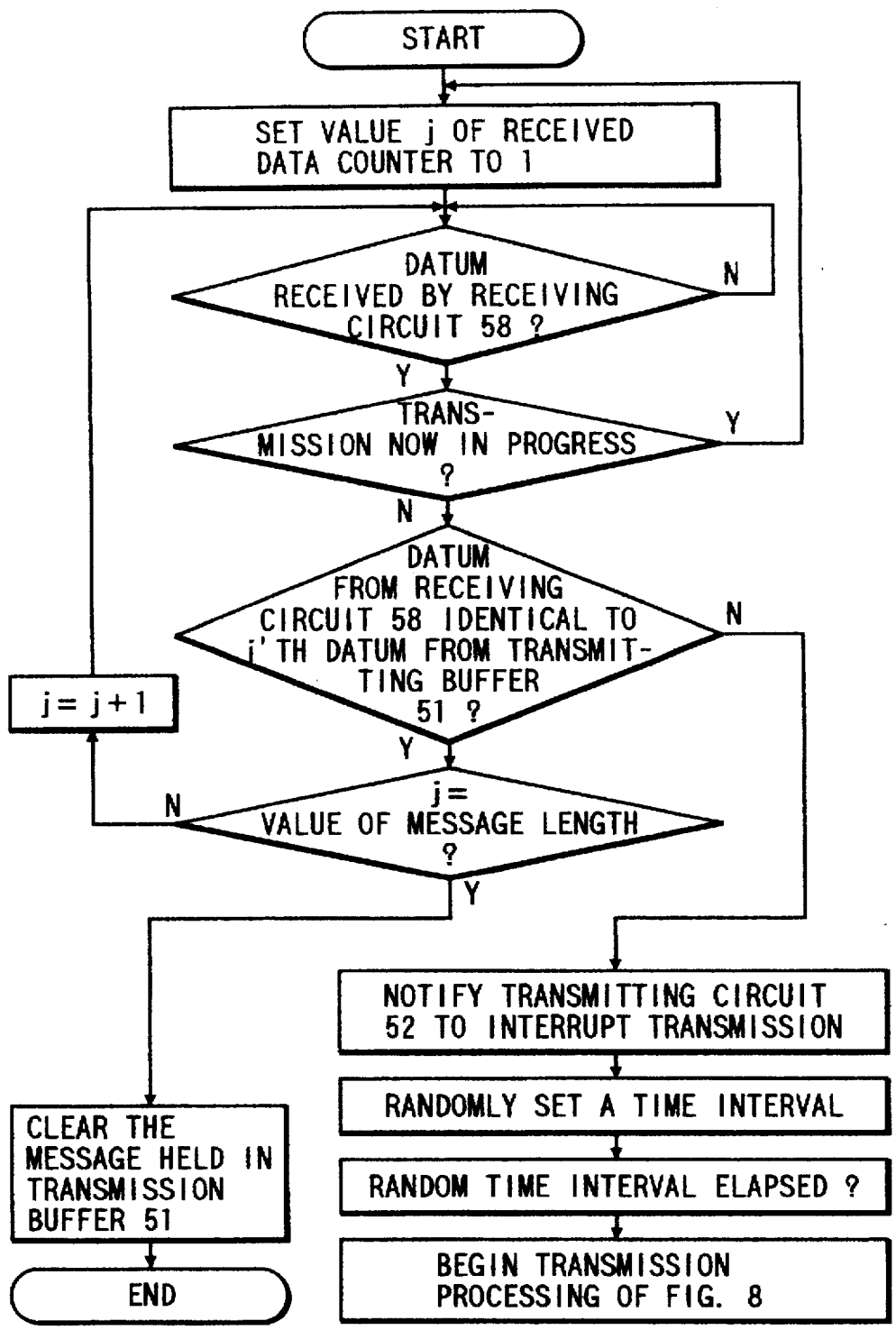
Figure 10:
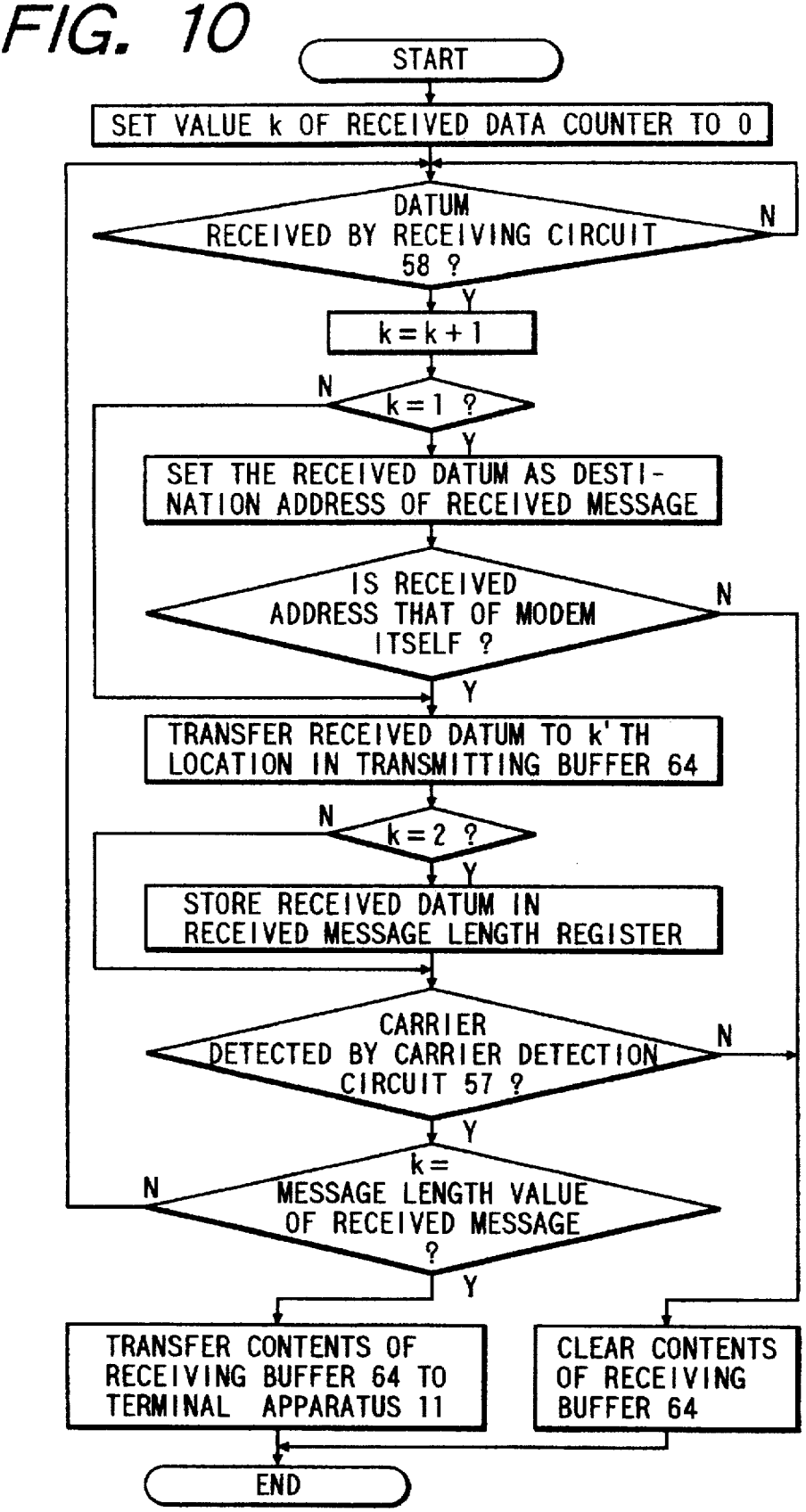

Although these are represented as respective circuits in the drawings, for simplicity of description, in a practical apparatus the functions of the transmitting control circuit 52, the receiving control circuit 63 and the transmitted/received data comparator 60 are preferably implemented by a suitably programed computer or microprocessor. The operation sequence performed by the transmitting control circuit 55 to transmit a message is shown in the flow diagram of FIG. 8. The operation sequence performed by the transmitted/received data comparator 60 in conjunction with the transmitting control circuit 52 and receiving control circuit 63, for detecting data conflict in a received message and for implementing the retransmission operations if necessary, are shown in the flow diagram of FIG. 9. The operation sequence performed by the receiving control circuit 63 when a message is received without occurrence of data conflict is shown in the flow diagram of FIG. 10.

As illustrated in FIGS. 11a, 11b, 11c, it is possible that only the final datum of a transmitted message is rendered indefinite as a result of data conflict. In such a case, the modems which receive such a message cannot judge that conflict has occurred. It will be assumed that the modem 21 transmits the message 4 shown in FIG. 11A, which consists of the data (4-1) to (4-5), while the modem 22 transmits the message 5 shown in FIG. 11B, consisting of the data (4-3), (4-4), (5-3) to (5-30). In this case, the first two data (4-3), (4-4) of the message 5 are identical to the third and fourth data of the message 4. It will also be assumed that the respective destinations of the messages 4 and 5 are the same, i.e. the modem 23.

If, as shown in FIG. 11C, conflict occurs between the messages 4 and 5, then the actual time at which the modem 21 detects that data conflict has occurred will be the time at which that modem begins to receives data which have been made indefinite as a result of the conflict. At that point, the modem 21 interrupts transmitting the data of the message. As a result, in effect, the message 45 shown in FIG. 11C is transferred onto the downstream transmission path 32. When the destination modem 23 receives that message, then since the number of data (5) constituting the message 45 is identical to the message length that is specified in the second datum (4-2) of that message, the modem 23 cannot detect that data conflict has occurred.

Figure 12:
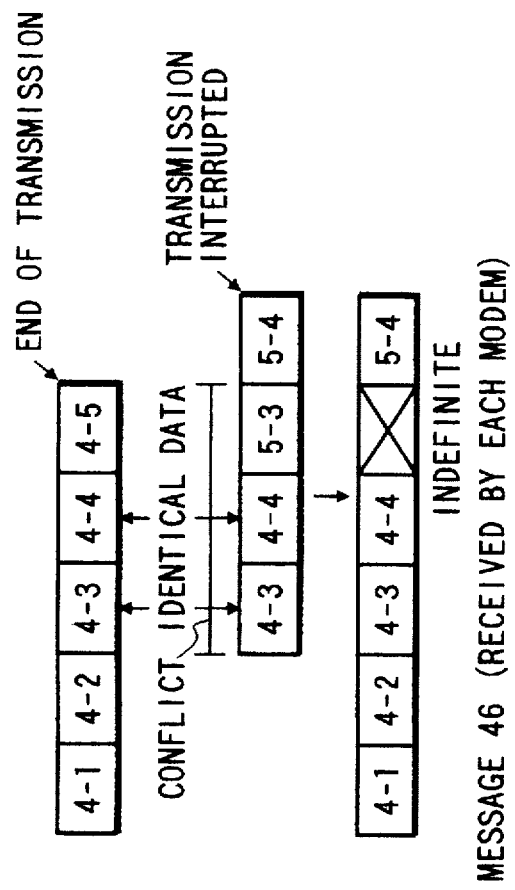
FIG. 12 illustrates a third pattern of data conflict between messages, for the first embodiment.

In FIG. 11C it is assumed that the modem 22, after detecting data conflict, terminates transmitting the message 5 after having transmitted the datum (5-3). However as shown in FIG. 12, it is possible that the transmission of message 5 would be terminated after the datum (5-4) has been transmitted. In that case, the resultant message which is received by the modem 23 is the message 46. However in that case too, the modem 23 cannot detect that data conflict has occurred. That is because the conflict judgement operation does not use the fact that the received message length is greater than the message length specified in the message, as a basis for detecting the occurrence of conflict.

Figure 13A:
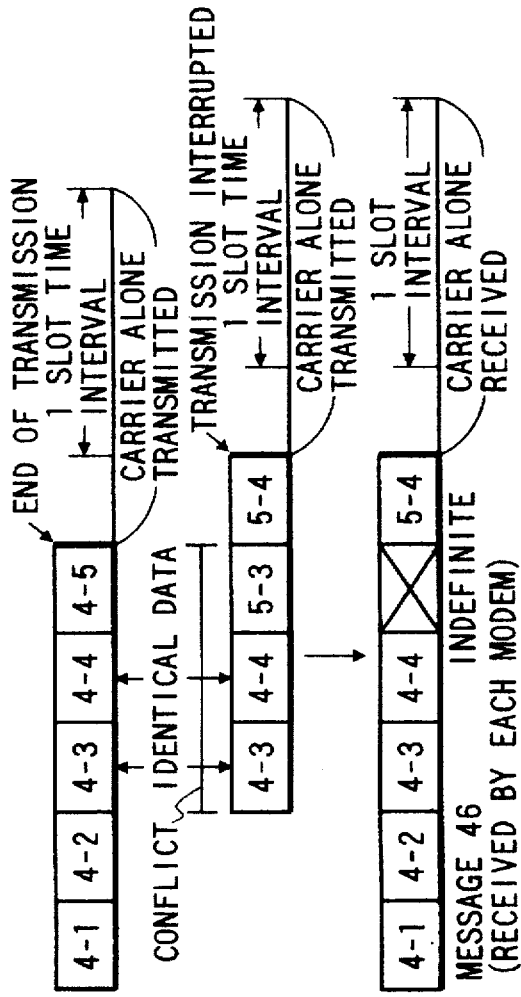
FIGS. 13A, 13B illustrate a method of providing notification of conflict between messages, with the first embodiment.

However a preferred version of the first embodiment of the invention will now be described, whereby even in the case of the occurrence of such a type of data conflict, the destination modem can be notified of the conflict occurrence. This is accomplished as follows. When the transmitting control circuit 52 of the transmitting modem detects that conflict has occurred, it controls the carrier generating circuit 54 such that, after transmitting of the message has been terminated, the carrier alone continues to be transmitted during a predetermined time interval. Each of the modems is configured to detect a condition whereby, at the end of a received message, the carrier alone continues to be received during the aforementioned predetermined time interval, and when that condition is detected, to judge that data conflict has occurred for the received message. The destination modem can thereby determine that data conflict has occurred. The operation will be described referring first to FIG. 13A, assuming that conflict has occurred as illustrated in FIG. 12.

With this method, the transmitting control circuit 52 of the transmitting modem (i.e. the modem which is transmitting a message) controls the carrier generating circuit 54 such that transmission of the carrier is not terminated until the transmitted/received data comparator circuit 60 has successfully completed the operations of sequentially comparing each received datum with each transmitted datum. In the present example, when the modem 21 receives a datum for which conflict has occurred, i.e. the fifth datum of the message 46, then the transmitted/received data comparator circuit 60 of that modem detects a mismatch between the received and transmitted data, and so judges that conflict has occurred, and commands the retransmission control circuit 61 to execute retransmission operations. As the first part of the retransmission operations, the retransmission control circuit 61 commands the transmitting control circuit 52 to halt transmitting of the message. In response, the transmitting control circuit 52 immediately halts transmitting of the data of the message (unless, as in the present example, the data of the message have already been completely transmitted) and controls the carrier generating circuit 54 such as to continue transmitting of the carrier until the aforementioned predetermined time interval has elapsed.

It is essential that this predetermined time interval must be longer than the slot time interval. The reason for that is as follows. We shall assume that the transmitting modem is the modem which is located farthest from the head end apparatus, and that data conflict occurs for the final datum of the message which that modem transmits. In that case, after the modem has transmitted the final datum of the message, the modem will thereafter transmit the carrier alone, to the transmission path. After a slot time interval has elapsed, the modem will receive the final datum of the message which it transmitted. If data conflict did not occur, the modem would then terminate transmission of the carrier. In that case, the message has been transmitted correctly, but the carrier has continued to be transmitted for one slot time interval. However if data conflict did occur for the final datum of the message, the modem will detect that the received datum does not match the final datum of the transmitted message, and so will judge that conflict has occurred. In that case, the modem continues to transmit the carrier alone, for a specific time interval. As a result, each of the other modems will receive a message which is followed by an interval in which the carrier alone is received, with that interval being longer than one slot time interval. Each modem thereby can judge that data conflict has occurred in the received message. However if the carrier alone is received, at the end of a message, during an interval which is not longer than a slot time interval, then each modem will judge that data conflict has not occurred.

For that reason, in the present example, the modem 22 continues to transmit the carrier for a time interval which is greater than the slot time interval, after judging that conflict has occurred. As a result, the modem 23 continues to receive the carrier for a time interval which is longer than the slot time, after receiving the datum (5-4) of message 46. In that case, the receiving control circuit 63 of the modem 23 judges that conflict has occurred in the received data, and commands the receiving buffer clearing circuit 62 to clear the message 46 from the receiving buffer 64.

Figure 15:
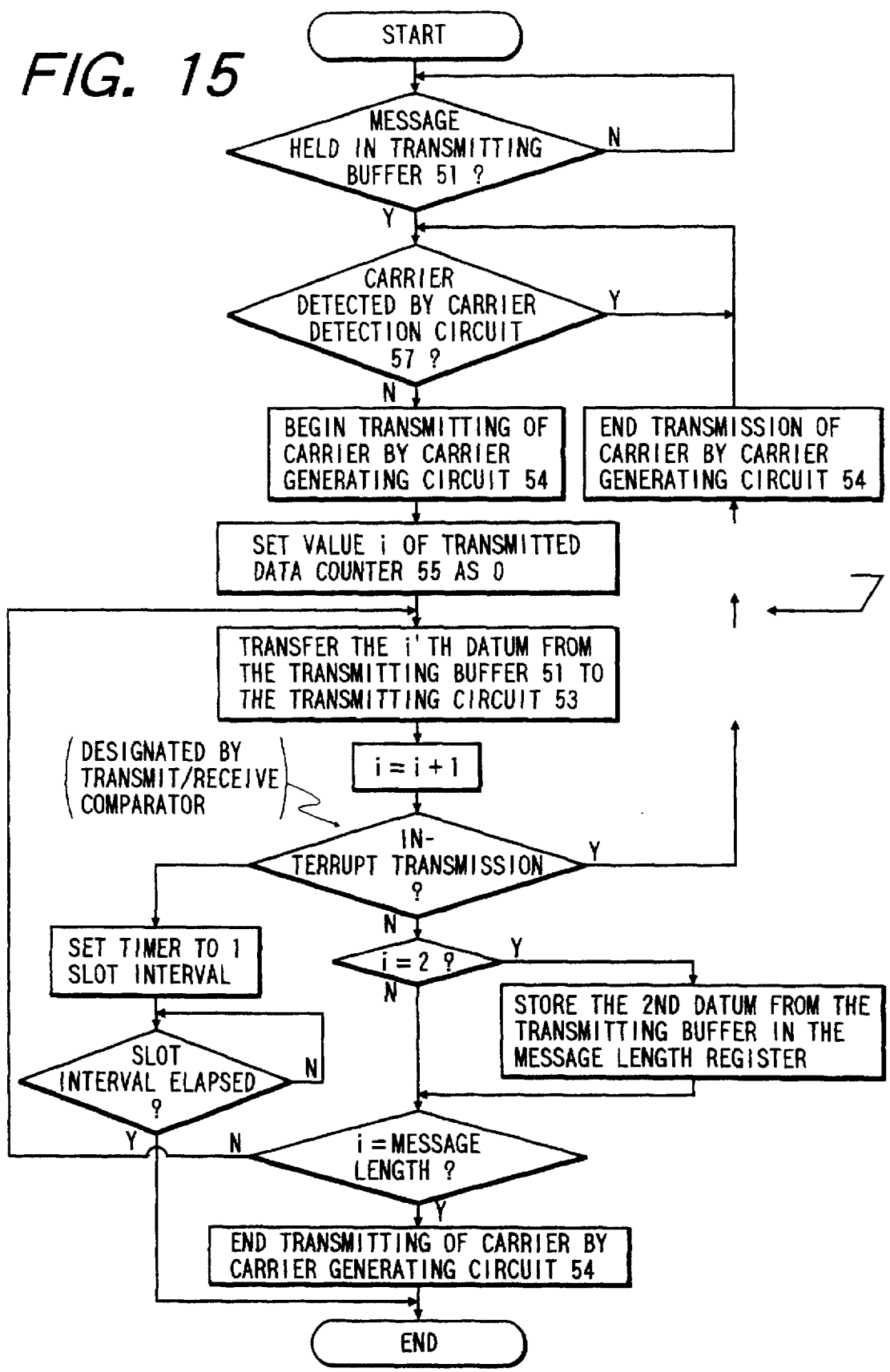
FIGS. 15, 16, 17 are flow diagrams of operations executed by the second embodiment.
Figure 16:
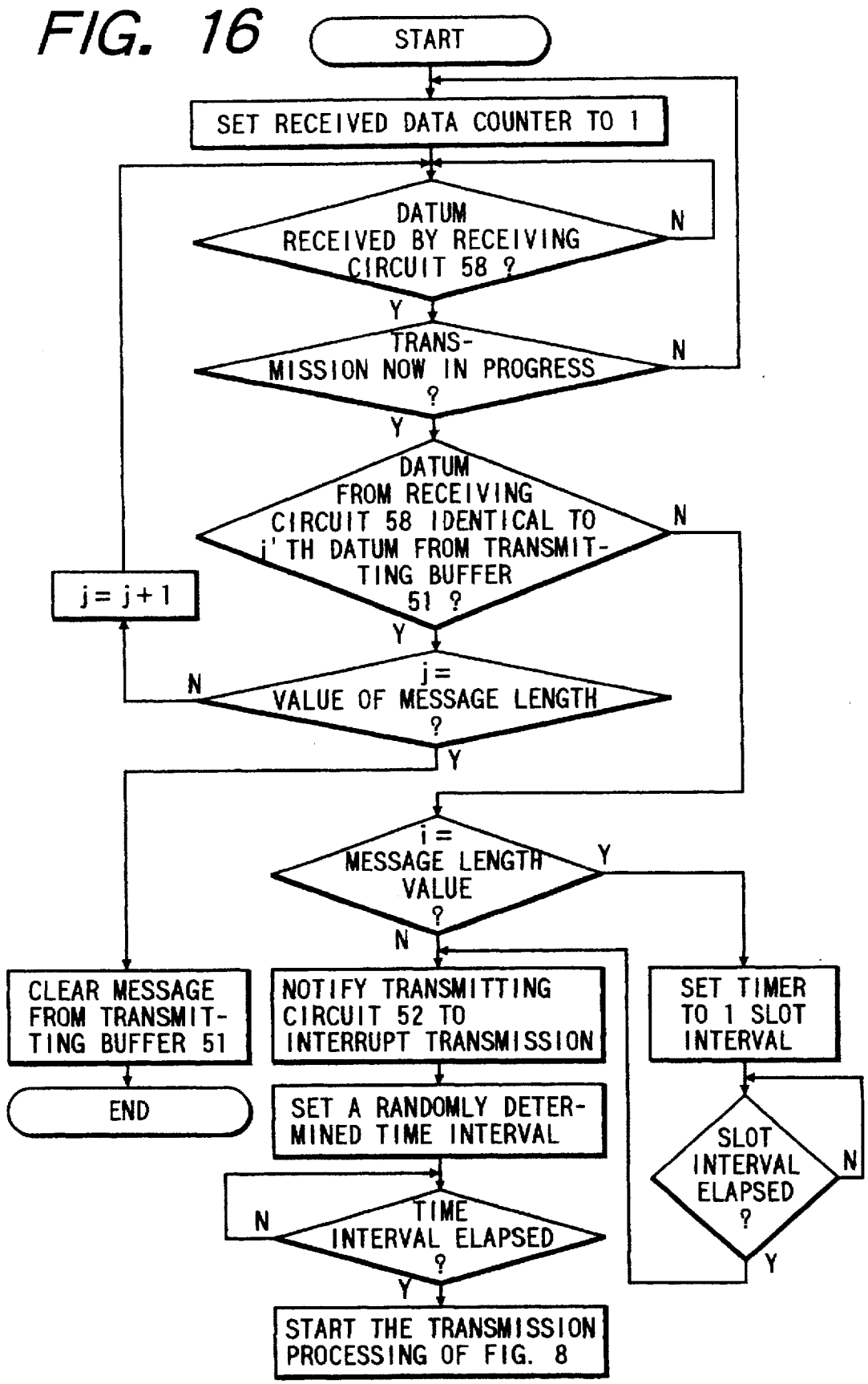

The operation sequence performed by the transmitting control circuit 55 to transmit a message, with the preferred version of the first embodiment of the invention described above, is shown in the flow diagram of FIG. 15. The operations performed by the receiving control circuit 63 with the preferred version of the first embodiment, and the transmitted/received data comparator 60 in conjunction with the transmitting control circuit 52 and receiving control circuit 63, for detecting data conflict in a received message and for implementing the retransmission operations if necessary, are shown in the flow diagram of FIG. 16.

Figure 13B:
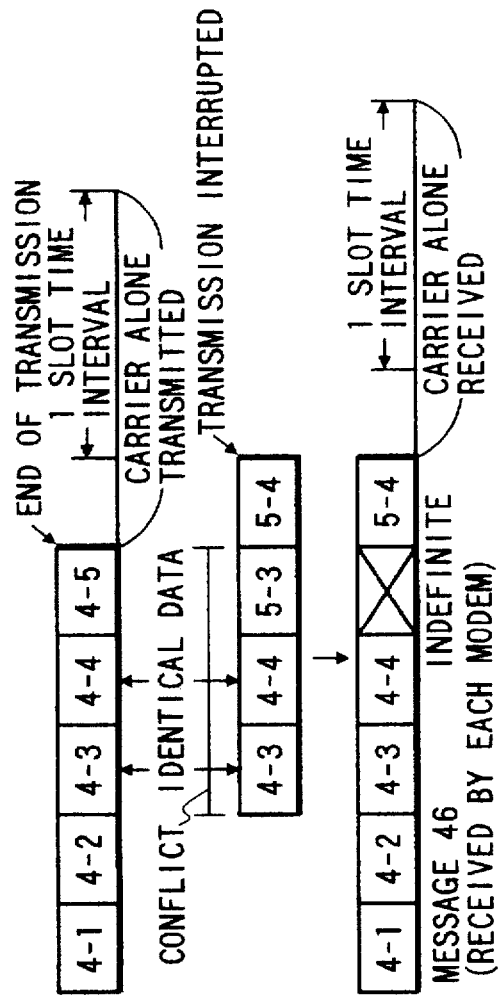

In the above, it is assumed that the transmitting control circuit 52 always causes the carrier to be transmitted for a fixed time interval after halting data transmission, whenever conflict is detected. However it would be equally possible to arrange, as illustrated in FIG. 13B that the carrier is transmitted for the fixed time interval after halting data transmission, only under the condition that data conflict has been detected but all of the data of the message have already been transmitted. That serves to prevent unnecessary transmission of the carrier.

In the above, it has been assumed that the retransmission control circuit 61 in each of the modems uses a randomly determined value for the time interval which must elapse before retransmission of a message begins after data conflict is detected. However it would be equally possible to assign to each of the modems a specific unique value for that time interval. Such a method would also reduce the possibility of conflict again occurring after retransmission is initiated.

Figure 17:
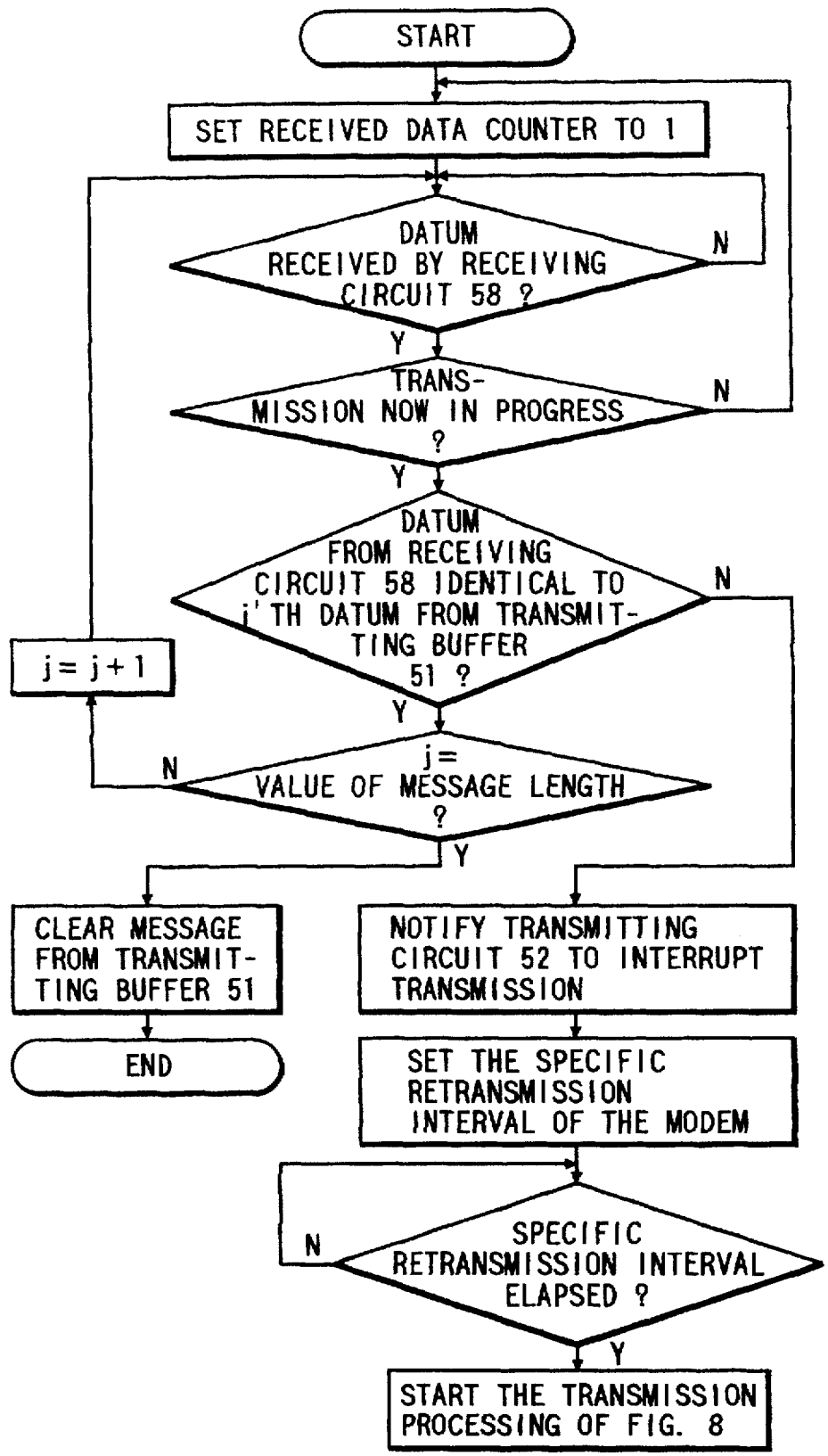

The operation sequence performed by the receiving control circuit 63 in conjunction with the transmitted/received data comparator 60, in that case, is shown in the flow diagram of FIG. 17.

Alternatively, a table of the form shown in FIGS. 18A, 18B or 18C can be stored in each modem. For example, the tables of FIGS. 18A, 18B or 18C could be respectively stored in the modems 21, 22, 23 described above. Each time any modem executes a message transmission, the next entry in the corresponding table is selected by each of the modems as the retransmission time interval which will be applied by that modem to the next message which it transmits. Thus, for each modem, the previously used retransmission time interval (i.e. which must elapse before retransmission of a message begins, after data conflict has been detected) is exchanged for the time interval that was last used by some other modem. In that way, the respective value of retransmission interval can be equalized, between the various modems.

The operation in that case is as follows. It will be assumed for example that the table of FIG. 18A is assigned to the modem 21, the table of FIG. 18B is assigned to the modem 22, and the table of FIG. 18C is assigned to the modem 23.

It is important to note that the tables specify respectively different values of retransmission interval, for the same number of transmissions. This ensures that respectively different values of retransmission interval will be used by any plurality of modems which execute retransmission after data conflict has occurred, thereby ensuring that data conflict will not occur as a result of retransmission of messages.

Thus, the size of each table (i.e. number of table entries) is determined by the total number of modems which are connected to the transmission path. Also, the retransmission time is preferably selected in units of slot time intervals.

Taking the example of messages 2 and 3, for which data conflict occurs as described above, then assuming that the retransmission intervals assigned to the modems are obtained from the first entries in table 9a and 9b, the modem 21 will begin retransmission after a time interval of one slot time interval has elapsed, as determined by the table of FIG. 18A while the modem 22 will begin retransmission after a time interval of two slot time intervals has elapsed, as determined by the table of FIG. 18B.

After retransmission has been completed, the retransmission control circuit 61 of each modem causes the transmitting control circuit 52 to halt transmission of the carrier. Thus, after the messages 2 and 3 have both been retransmitted, transmission of the carrier onto the transmission level 3 by the modem 21 and modem 22 will have ended, i.e. the transmitting control circuit 52 of each modem will cease to detect the presence of a carrier on the downstream transmission path 32.

When this condition of zero presence of a carrier is detected, the carrier detection circuit 57 of each modem commands the retransmission control circuit 61 to update the retransmission time interval, i.e. to select the next entry in the corresponding one of the tables. This updating operation is performed simultaneously by all of the modems, since all of the modems can detect the cessation of carrier on the transmission path.

With the above example, the retransmission interval which is determined for the modem 21 will thus be changed to 2 slot time intervals, while that of the modem 22 will be changed to 3 slot time intervals, and that of the modem 23 will be changed to 1 slot time interval.

When the maximum "number of transmissions" in the tables (i.e. in this example, 3 transmissions) is exceeded, then "single transmission" entry of each of the tables is returned to.

It can thus be understood that as a result of the above operations, the occurrence of data conflict when messages are retransmitted can be avoided, since the values of retransmission time interval that are assigned to the modems are always different. Further, since these values are successively changed, for each modem, the average value of retransmission time interval becomes identical for each of the modems.

Figure 19:
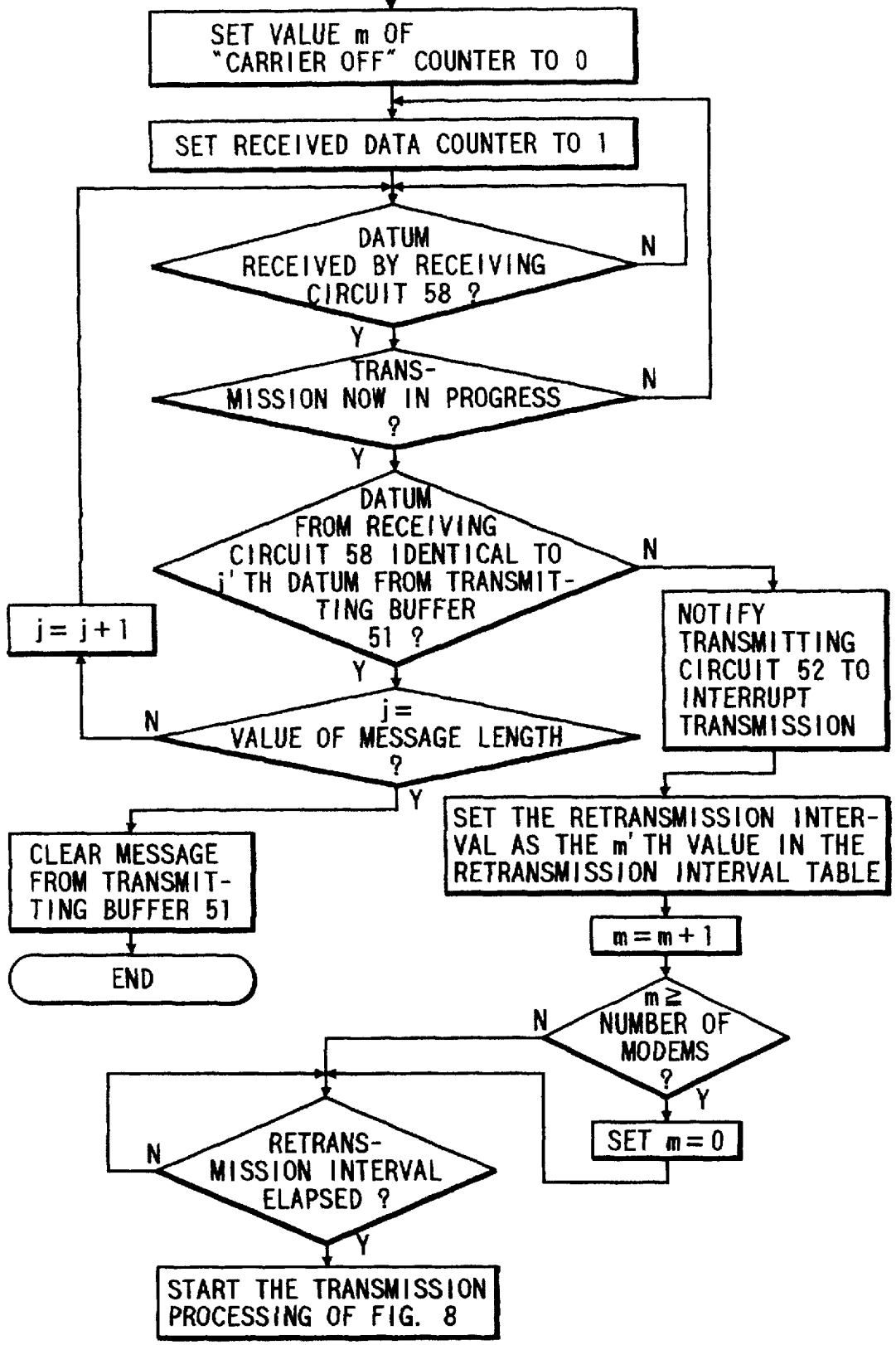
FIG. 19 is a flow diagram of operations executed by the second embodiment when the tables of FIGS. 18A to 18C are utilized.

The operation sequence performed by the transmitting control circuit 52 in conjunction with the transmitted/ received data comparator 60, for this version of the first embodiment, is shown in the flow diagram of FIG. 19.

It should be noted that, instead of detecting the condition where there is no carrier presences on the transmission path, as a condition for updating each of the tables, it would be equally possible to execute that updating each time that a data conflict is detected.

It can be understood that with each of the versions of the first embodiment described above, data conflict can be detected without using special dedicated beat detection circuits in the modems.

A second embodiment of the invention will be described, in which respectively different transmission levels are established for the various modems.

With the first embodiment described above, the transmission levels of the modems are substantially mutually identical. If the transmission levels of the transmitting circuit 53 of the various modems were to be substantially different, then the aforementioned capture effect would occur. That is to say, when modems are transmitting data simultaneously, only the data of the modem having the highest transmission level will be transferred normally, while the data transmitted by the other modems at the low transmission level would be effectively erased by the data which are transmitted at the high transmission level.

This will be described referring to an example in which it is assumed that the transmission level of the transmitting circuit 53 of the modem 21 is significantly higher than the transmission level of the transmitting circuit 53 of the modem 22. It is assumed that the same type of operation as described above for the first embodiment is used to detect conflict between transmissions.

Figures 14A, 14B:
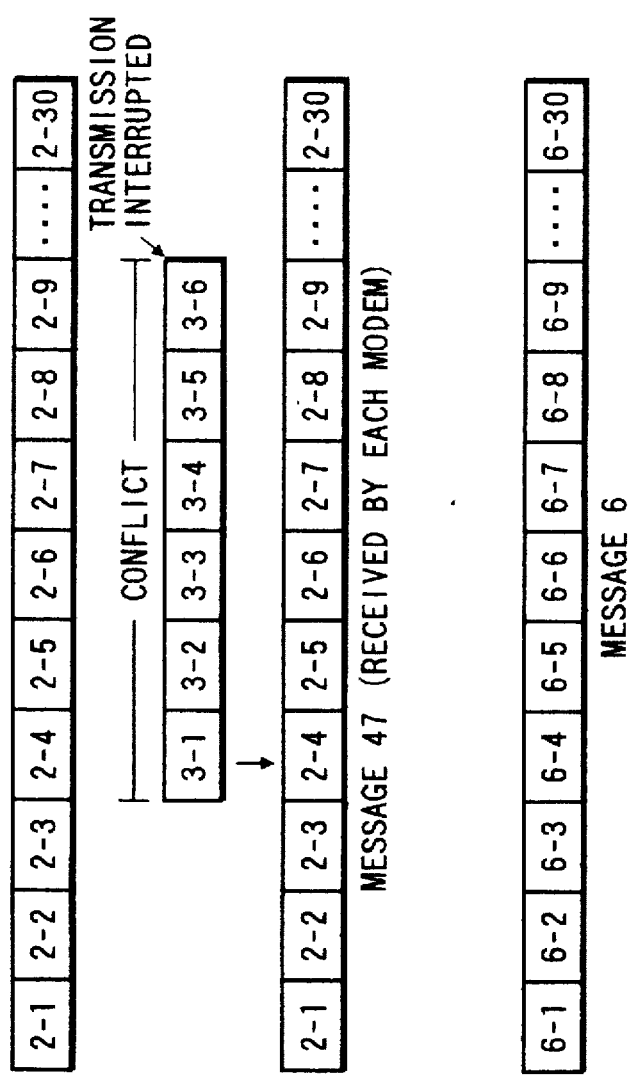
FIG. 14 illustrates a pattern of data conflict between messages, for describing a second embodiment of the invention.

In the same way as for the first embodiment, as the modem 21 begins to transmit the message 2, the modem 22 almost simultaneously begins to transmit the message 3, so that data conflict occurs. However in this case, since the transmission level of the modem 21 is the higher level, the data of message 2 (shown in FIG. 14A) which are transmitted by the modem 21 will be accurately transferred to the destination terminal apparatus, whereas the data of message 3 which are transmitted by the modem 22 will be replaced (i.e. obliterated) by the data of message 2. That is to say, the data 47 which are received by each of the modems will be identical to the data of message 2, in spite of the fact that data conflict has occurred. As a result, the modem 21 will not detect that conflict has occurred, and so will continue to to transmit the message 2 until the end of the data of that message. In addition, the modem which is the destination for the message 2 will successfully receive that message.

On the other hand, the modem 22 will detect a mismatch between the data which it is sending and the data which it is receiving, and so will terminate transmission of the message 3, in the same way as described for the first embodiment. After transmission of the message 2 has ended, modem 22 retransmits the message 3. Thus, as a result of the above sequence of operations, both the modems 21 and 22 can successfully transmit their respective data.

However if after transmitting the message 2 the modem 21 were to continue to sequentially transmit new messages, then the modem 22 would not be able to transmit data until all of the transmissions by the modem 21 have ended. Thus the problem arises that there will be differences between the respective amounts of data which the various modems are permitted to transmit.

In order to prevent such differences between the respective amounts of data which are transmitted, the transmission control circuit 52 of the second embodiment is provided with functions which are additional to those of the transmitting control circuit 52 of the first embodiment. Specifically, the transmitting control circuit 52 of a modem executes control whereby after transmission of the data of a message by that modem has been completed, further transmission by that modem is inhibited until an idle interval of at least one slot time interval has elapsed. Here,.the term "idle interval" signifies an interval in which no carrier is being transmitted over the transmission path.

Figure 20:
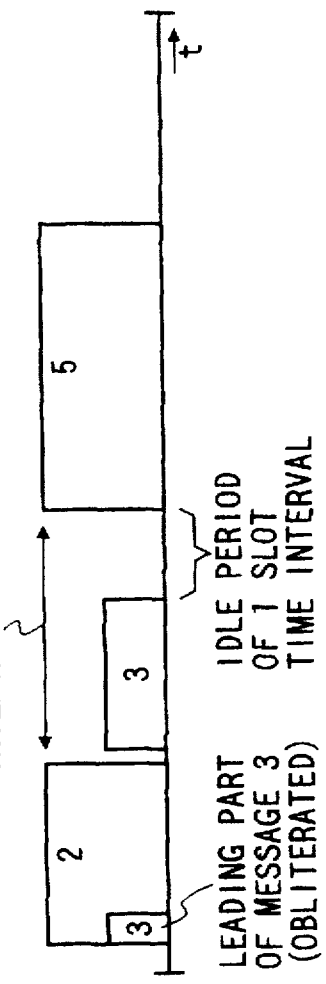
FIG. 20 shows an example of a message transmission sequence, for the second embodiment.

The operation will be described referring to FIG. 20. With the first embodiment, when the modem 21 has achieved normal termination of message transmission for the message 2, the transmitted/received data comparator circuit 60 of that modem then commands that the message which is being held in the transmitting buffer 51 is cleared. When a new message is subsequently set into the transmitting buffer 51, the transmitting control circuit 52 begins operations for transmitting that new message. 0137

However with the second embodiment, when the transmitted/received data comparator circuit 60 has detected that all of the received data match the transmitted data of the message 2, then the transmission control circuit 52 has the added function of executing a transmission inhibit operation. As a result, even if a new message is then set into the transmitting buffer 51, the transmitting control circuit 52 will not execute transmission operations until the transmission inhibit condition is released.

It will be assumed that a new message 5 is set into the transmission buffer 51, after transmission of message 2 has been completed. The transmission control circuit 52 releases the transmission inhibit condition at the point in time when the carrier detection circuit 57 detects that the idle state has continued for at least one slot time interval.

After the modem 21 has completed transmission of the message 2, if no other modem were to immediately initiate data transmission, then the idle condition would continue until one slot time interval has elapsed. However if during that time, i.e. while the modem 21 is inhibited from transmitting a new message, the modem 22 detects that transmission of the data of message 2 has ended, then the modem 22 immediately begins retransmission of the data of message 3.

If the time which elapses from the end of transmission of the message 2 until the start of retransmission of the message 3 is less than one slot time interval (i.e. the idle condition continues for less than one slot time interval), then the retransmission of data by the modem 22 begins while the transmitting control circuit 52 of the modem 21 is continuing to maintain the transmission inhibit condition.

After transmission of the message 3 has been completed successfully, if no data are then transmitted by any other modem, the idle condition will be maintained for one slot time interval. During that time, the transmitting control circuit 52 of the modem 21 releases the transmission inhibit condition, so that the data of the new message 5 which had been set into the transmitting buffer 51 is then transmitted by the modem 21.

It can thus be understood that as a result of the above operations, the same rates of data transmissions can be ensured both for the modems which have a high transmission level and the modems which have a low transmission level.

Figure 22:
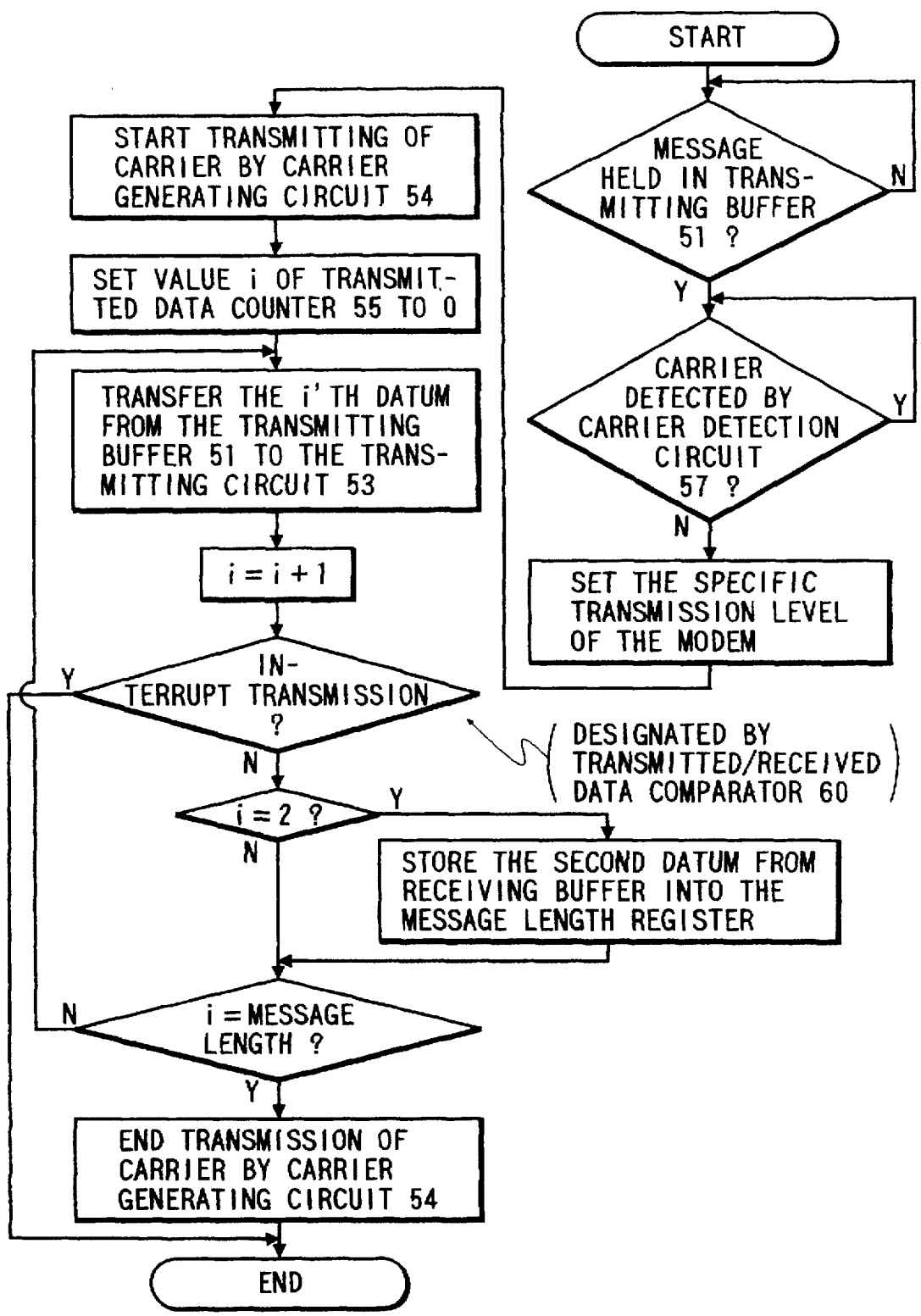
FIGS. 22 and 23 are flow diagrams of operations executed by the third embodiment.
Figure 23:
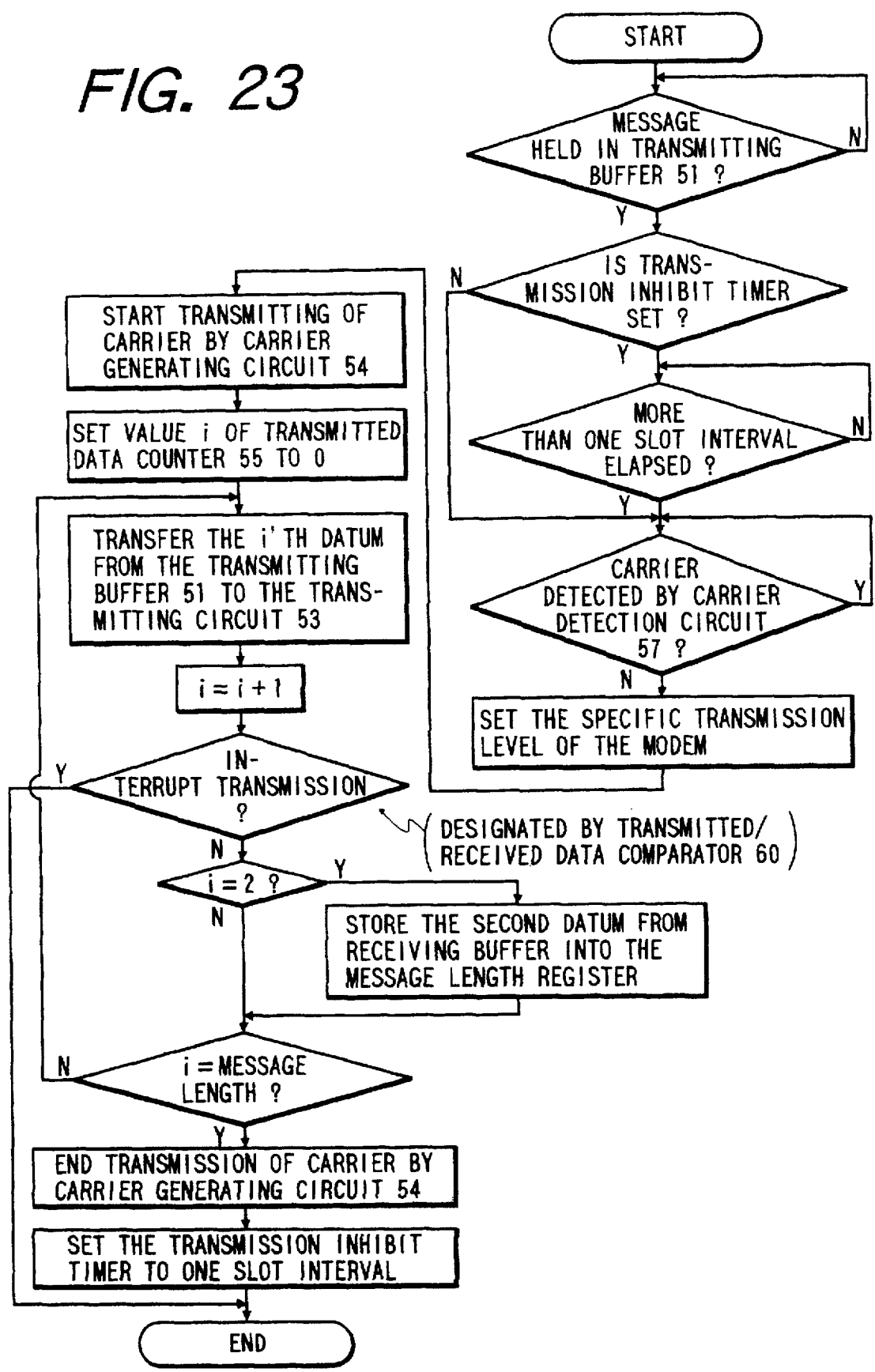

The operation sequence for transmitting a message, performed by the transmitting control circuit 52 in conjunction with the transmitted/received data comparator 60, for the second embodiment as described above, is shown in the flow diagram of FIG. 22. The corresponding operation sequence performed by the receiving control circuit 63 in conjunction with the transmitted/received data comparator 60, whereby after a message has been correctly transmitted by a modem, transmitting of a succeeding message by that modem is inhibited until a predetermined time interval has elapsed, is shown in the flow diagram of FIG. 23.

In the above, it has been assumed that the second embodiment of the invention uses the same method of communication control as that of the first embodiment. However it would be equally possible for the second embodiment to use a conventional method of communication control based on detection of a beat component. In that case, when conflict occurs so that the data transmitted by one of the modems are obliterated and replaced by the data transmitted at a high transmission level by another modem, then each modem can detect that conflict has occurred, based on a beat presence in the received signal. That can be achieved by measuring beforehand the level of beat component in the received signal when data conflict occurs (data of one transmitted message are obliterated by data of another transmitted message which is transmitted at a higher output level) and by registering that measured beat level in each of the modems. In that case, when the beat level of a received signal is outside a range which is determined by that registered value, a modem will judge that data conflict has occurred. Except for that point, the operation in that case would be identical to that described above for the second embodiment.

However in that case it would be necessary for the beat detection to be performed to a high level of accuracy, and problems would arise due to noise in the received data. For that reason it is preferable to use the communication control method of the first embodiment.

A third embodiment of a CATV-LAN according to the present invention will be described, wherein transmission is executed in accordance with the priority of a message, where "priority" signifies a value which is assigned to a message, for indicating how rapidly the message must be transmitted. The lower the priority that is assigned to a message, the greater is the amount of delay which is permissible before the message is transmitted.

Figure 24:
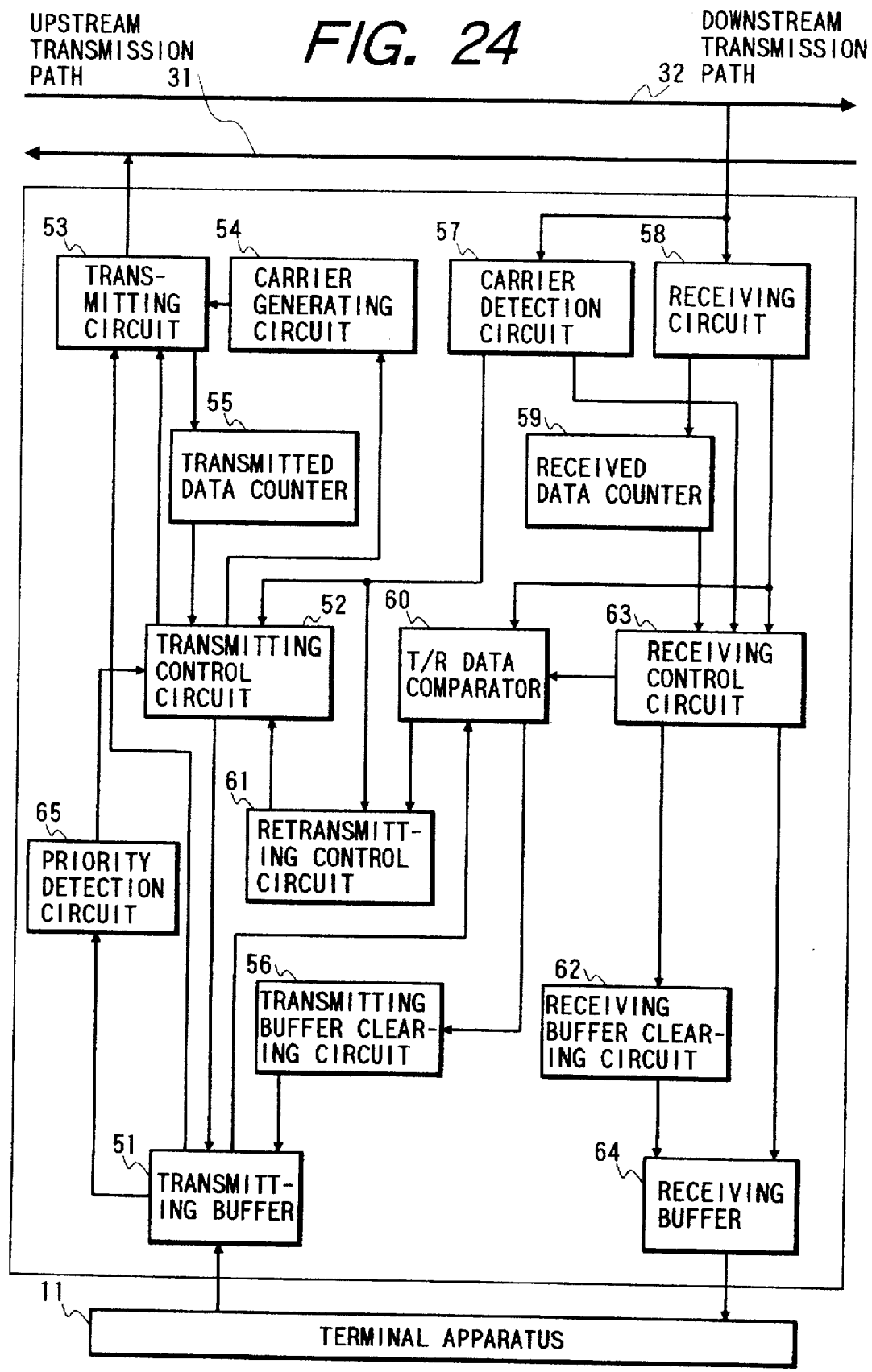
FIG. 24 is a circuit block diagram of a modem used in the third embodiment of a CATV-LAN according to the present invention.

FIG. 24 shows the configuration of a modem in such a CATV-LAN. As shown, the modem includes a priority detection circuit 65 which detects the priority that is registered within a message, and temporarily inhibits the transmission operation by the transmitting control circuit 52 in accordance with the priority. The remainder of the embodiment is identical to that of the first embodiment of FIG. 4.

When a message is detected as having a low priority, the priority detection circuit 65 inhibits operation of the transmitting control circuit 52 until it is detected that an idle time interval of the transmission path has elapsed which is equal to more than 2 slot time intervals. The operation of the remaining parts 51 to 64 of the modem of this embodiment is identical to that described for the second embodiment above.

Figure 25:
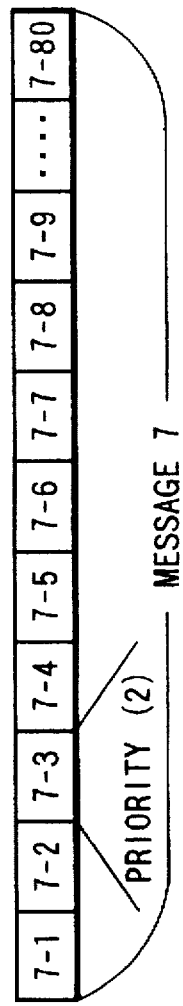
FIG. 25 shows the configuration of a message, for the third embodiment.

FIG. 25 shows a message 7 which includes a priority. It will be assumed that the priority can take either of two values, i.e. 1 and 2. If no priority is registered within a message, then the message is treated as having a priority of 1.

Figure 21:
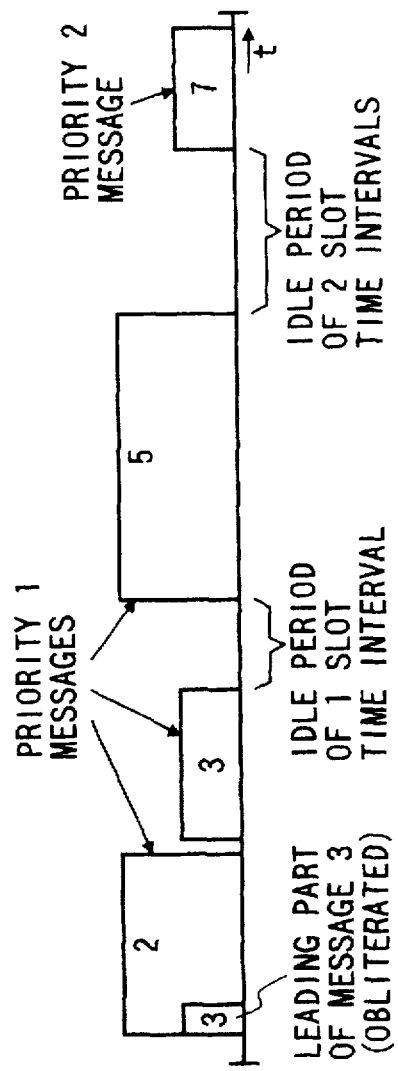
FIG. 21 shows an example of a message transmission sequence, for a third embodiment of the invention.

The operation of this CATV-LAN will be described referring to FIG. 21. It will be assumed that the message 2 and message 5 are to be transmitted by the modem 21, and that modem 22 is to transmit the message 3, and also a message 7 which has the priority 2.

Since messages 2, 3 and 5 do not have a priority registered therein, each of these is treated as having a priority of 1. Messages which have a priority of 1 are transmitted in the same way as for the second embodiment described above, in which priorities are not used.

The transmitted/received data comparator circuit 60 of modem 22, after transmitting the message 3, designates that the message contents of the transmitting buffer 51 are to be cleared. It will be assumed that immediately thereafter, the message 7 (having the priority 2) is sent from the terminal apparatus 12 and is set into the transmitting buffer 51 of the modem 22.

When a message is set into that transmitting buffer 51, the priority detection circuit 65 detects the priority of the message. If the priority is 2, then the priority detection circuit 65 inhibits transmission operations by the transmitting control circuit 52 until it detects that a time interval has elapsed which is greater than 2 slot time intervals.

In the example, after one slot time interval has elapsed, the modem 21 transmits the message 5, so that the transmitting control circuit 52 of the modem 22 does not begin transmission of the message 7.

After message 5 has been transmitted, if transmission of no other message by a modem occurs, then an idle time interval (of the transmission path) of more than 2 slot time intervals will elapse.

In that case, when the carrier detection circuit 57 of the modem 22 detects that an idle time interval of more than 2 slot time intervals has elapsed, the transmitting control circuit 52 is released from the inhibit condition, and so transmits the data of message 7, in the same way as described above for the first embodiment.

Thus with the above operations, transmission of messages having a low priority is executed after all messages having a high priority have been transmitted.

Figure 26A:
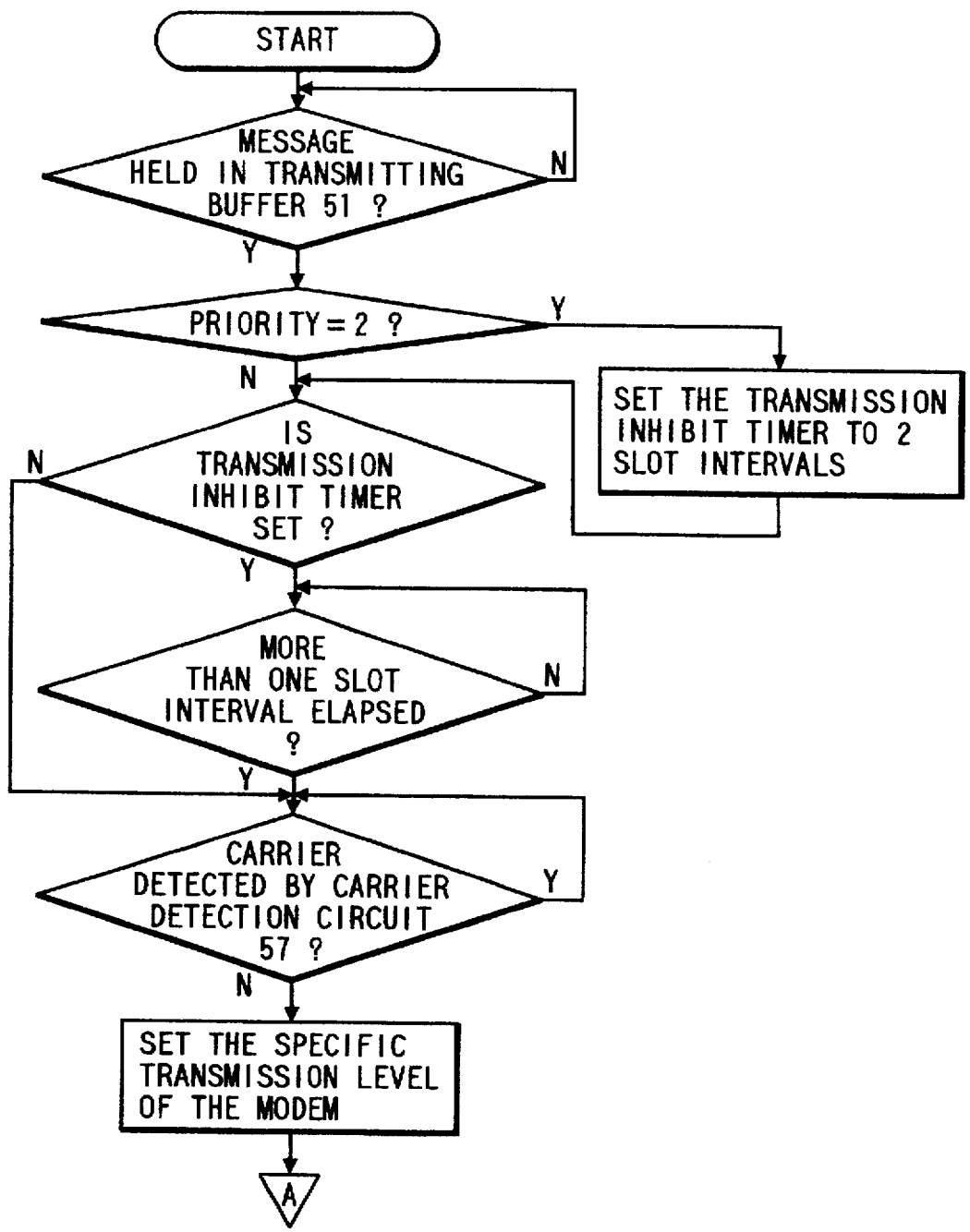
FIGS. 26, 27 are flow diagrams of operations executed by the third embodiment.
Figure 26B:
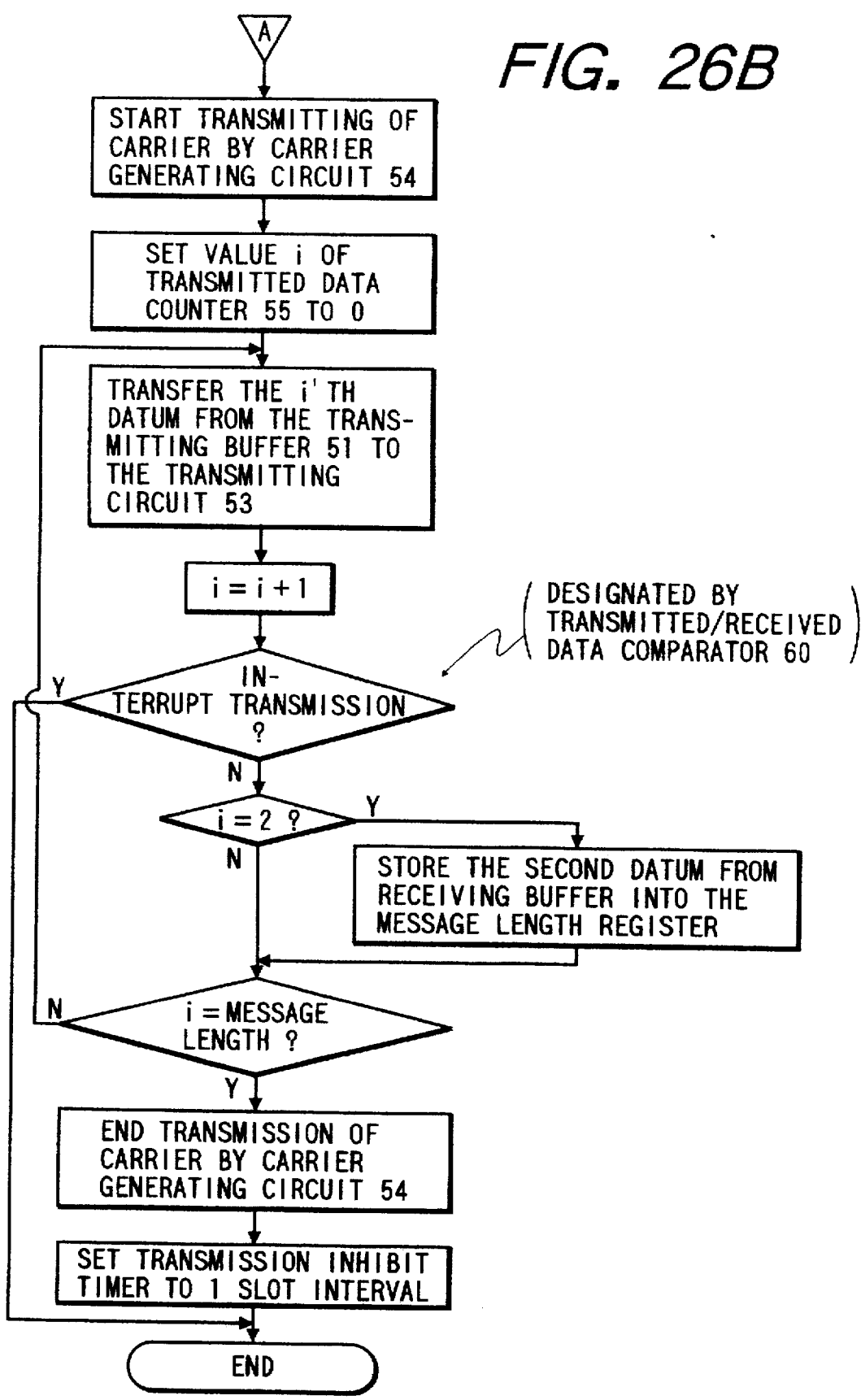

The operation sequence for transmitting a message, performed by the transmitting control circuit 52 in conjunction with the transmitted/received data comparator 60, for the third embodiment as described above, is shown in the flow diagram of FIG. 26.

If a plurality of different priority levels are used, then it becomes possible to execute control whereby the transmitting control circuit 52 of a modem is inhibited from transmission operations until it has been detected that the idle time interval has continued for an integral multiple of the slot time interval, with that integral multiple being determined in accordance with the priority of a message which is waiting to be transmitted by that modem.

In that case, for example, it would be possible to inhibit transmission of a message having a lower priority than the message 7 (for example a message having a priority of 3) until 3 slot time intervals have elapsed, and to inhibit transmission of a message having an even lower priority (for example, a priority of 4) until 4 slot time intervals have elapsed. In that way, transmission of low-priority messages is inhibited until transmission of all messages having a higher priority has been completed.

Figure 27A:
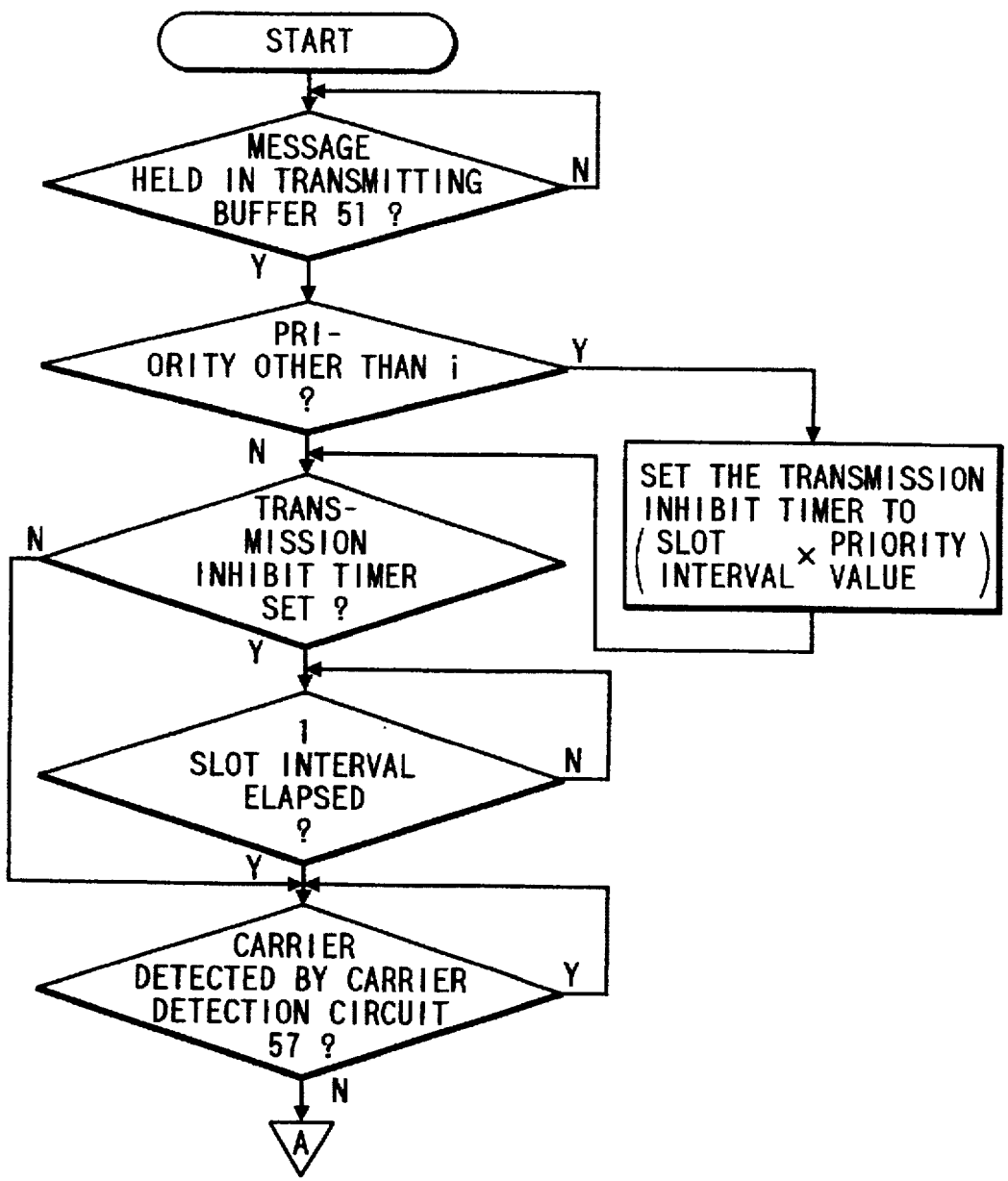
Figure 27B:
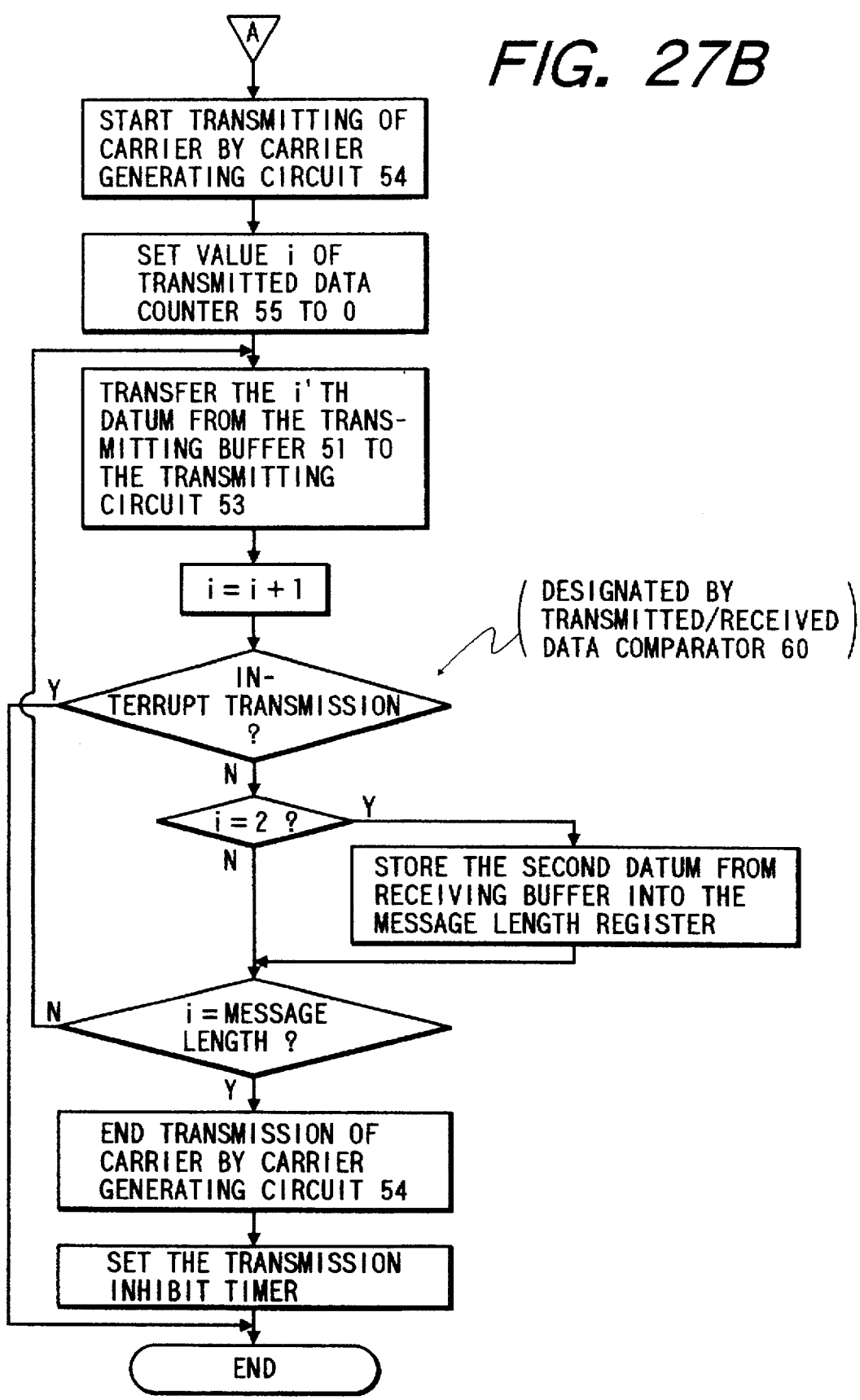

The operation sequence for transmitting a message, performed by the transmitting control circuit 52 in conjunction with the transmitted/received data comparator 60, for such a modified version of the third embodiment, is shown in the flow diagram of FIG. 27.

A fourth embodiment of a CATV-LAN according to the present invention will be described, whereby the priority which is assigned to a message is changed in accordance with the amount of data that is to be transmitted by a modem.

FIG. 28 shows the configuration of a modem of this embodiment. As shown, this includes a priority alteration circuit 66 for changing, in accordance with the length of a message that is being held in the transmitting buffer 51, the priority that is detected by the priority detection circuit 65 for that message. The remaining configuration of the modem is identical to that of the embodiment of FIG. 24.

Figure 29:
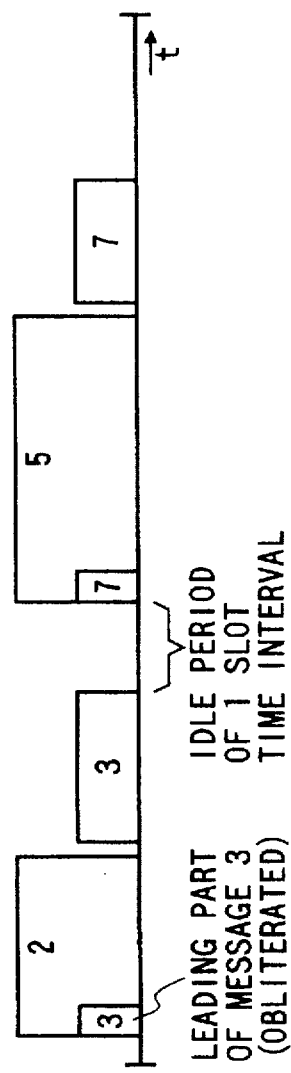
FIG. 29 shows an example of a message transmission sequence, for the fourth embodiment.

The operation of this CATV-LAN will be described referring to FIG. 29. It will be assumed that the modem 21 transmits messages 2 and 5, the modem 22 transmits the message 3, and also transmits a message 7 which has a priority of 2.

It will further be assumed that when the message length exceeds 50, the priority alteration circuit 66 executes operations to set the priority of the message as 1.

After the message 3 is transmitted by the modem 22, the transmitted/received data comparator circuit 60 of that modem clears the message from the transmitting buffer 51. It will be assumed that the message 7 is then immediately sent from the terminal apparatus 12 to be set into the transmission buffer 51 of the modem 22.

The priority alteration circuit 66 then detects the priority and the message length of the message which is being held in the transmitting buffer 51. In this case, the message 7 has the priority 2, however since the message length is 80, the priority alteration circuit 66 controls the priority detection circuit 65 such as to assign the priority 1 to that message.

The transmitting control circuit 52 of the modem 22 in that case does not receive a transmission inhibit command from the priority detection circuit 65, so that after one slot time interval has elapsed following the end of transmission of the message 3 (in the same way as for the second embodiment) the transmitting control circuit 52 of the modem 22 implements transmission of the message 7. With the example of FIG. 29, the modem 21 simultaneously transmits the message 5, so that data conflict occurs. Hence, after transmission of the message 5 has been completed, the message 7 is retransmitted.

Figure 30A:
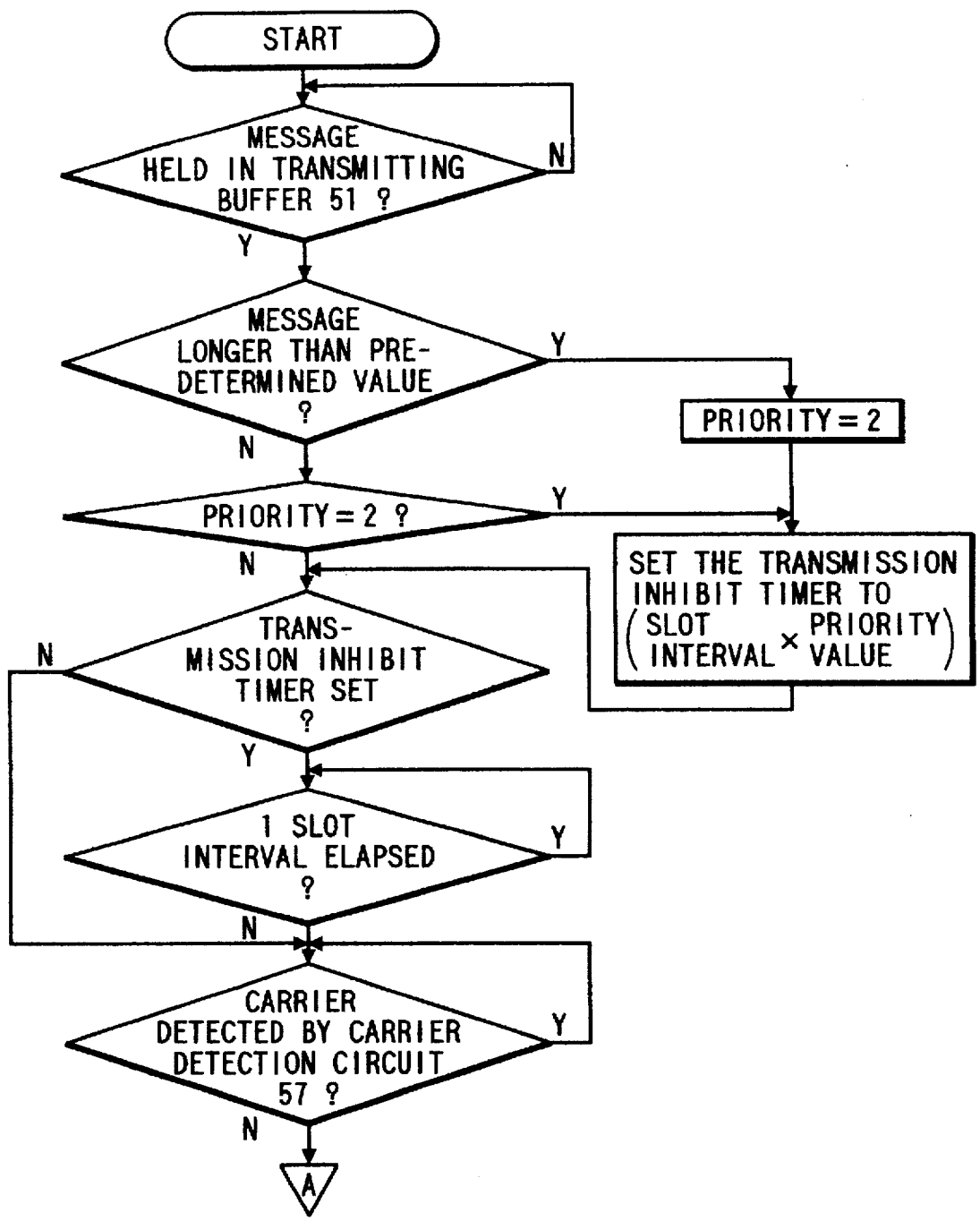
FIG. 30 is a flow diagram of operations executed by the fourth embodiment.
Figure 30B:
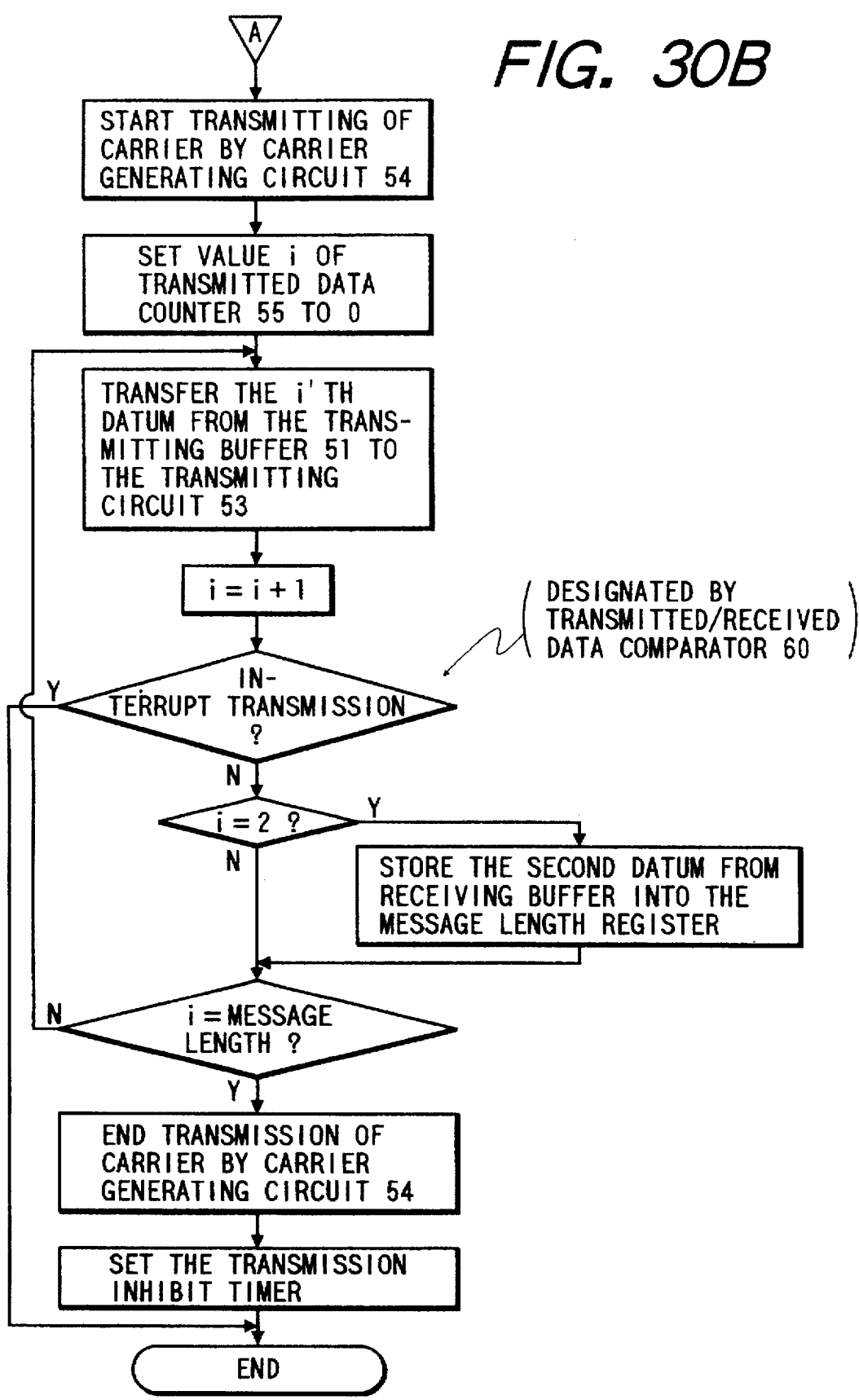

The operation sequence for transmitting a message, performed by the transmitting control circuit 52 in conjunction with the transmitted/received data comparator 60, for the fourth embodiment of the invention described above, is shown in the flow diagram of FIG. 30.

In the above it has been assumed that the priority assigned to a single message is altered in accordance with the message length. However it would also be possible that a plurality of messages are simultaneously present in the transmitting buffer. In such a case, it would be possible to change the priority assigned to each of these messages in accordance with the total number of messages, or in accordance with the total length of the messages.

Thus, by the above operations, data can be transmitted on a priority basis, in a system having a plurality of modems which transmit and receive data.

A fifth embodiment of a CATV-LAN according to the present invention will be described, whereby in order to effectively use the capture effect, the transmission levels of the respective modems are randomly varied.

FIG. 31 shows the configuration of a modem in this embodiment. As shown, the modem includes a transmission level adjustment circuit 67, for randomly varying the transmission levels at which messages are transmitted by the transmitting circuit 53 and the carrier is transmitted by the carrier generating circuit 54. The remainder of the configuration is identical to that of the modem of the first embodiment, shown in FIG. 4.

With the transmission method used in the second embodiment of the invention, whereby the transmission levels of the respective modems are fixed, then as shown in FIG. 32A, message transmissions will always occur in order of magnitude of transmission level. As a result, modems with low values of transmission level must wait until completion of message transmissions by those modems which have higher transmission levels, before executing message transmissions themselves. If the modems which have low values of transmission level also have transmission level values which are not substantially different. then these modems will also attempt to execute respective retransmissions at times which are close together, so that there is a high possibility of data conflict occurring at these retransmissions. However since the transmission levels of these modems are close to one another, the capture effect will not occur, and hence when conflict occurs, the data transmitted by each of these modems will be destroyed.

With the fifth embodiment. in order to prevent such a condition, the transmission levels of the transmitting circuit 53 and carrier generating circuit 54 of each modem are randomly varied, thereby enabling the capture effect to be effectively utilized. The operation of this CATV-LAN will be described referring to FIGS. 32A, 32B. Apart from the changes made in the transmission levels, the operation is otherwise identical to that of the first embodiment.

Firstly, it will be assumed that the modem 21 is to transmit the message 2 and the modem 22 is to transmit the message 3. In each of the modems 21 and 22, the transmission level adjustment circuit 67 randomly changes the transmission levels of the transmitting circuit 53 and carrier generating circuit 54 within a fixed range of variation. It will be assumed for example that the transmission levels of the transmitting circuit 53 and the carrier generating circuit 54 of the modem 21 are each set at 50 dB, while the transmission levels of the transmitting circuit 53 and the carrier generating circuit 54 of the modem 22 are each set at 60 dB.

In that case, if both of the modems 21 and 22 begin to transmit simultaneously, then due to the capture effect, only the data of message 3 (transmitted by the modem 22) will be successfully conveyed, while the data of message 2 (transmitted by the modem 21) will be destroyed, and will be subsequently retransmitted. When retransmission is executed, the transmission level adjustment circuit 67 of the modem 21 again performs a random change in the transmission level of that modem. It will be assumed that the new transmission level is 70 dB. Hence, the data of message 2 will be transmitted by the modem 21 at a level of 70 dB.

The above operations are thereafter successively repeated by each of the modems, with the transmission level adjustment circuit 67 of each modem executing a random change in the transmission level, each time that the modem has executed a message transmission.

With the CATV-LAN according to the fifth embodiment, there is only a low probability that the modems whose transmission levels are close together will execute transmissions at time points which are close together. Thus, the capture effect can be effectively utilized in that case.

With this embodiment, since the respective transmission levels of the various modems are not fixedly determined, it becomes possible to eliminate any imbalance between the respective rates of message transmission opportunities which are provided to the various modems, without the need for a modem which has executed a message transmission to then inhibit further transmissions until it has detected that a predetermined idle time interval has elapsed.

Figure 33:
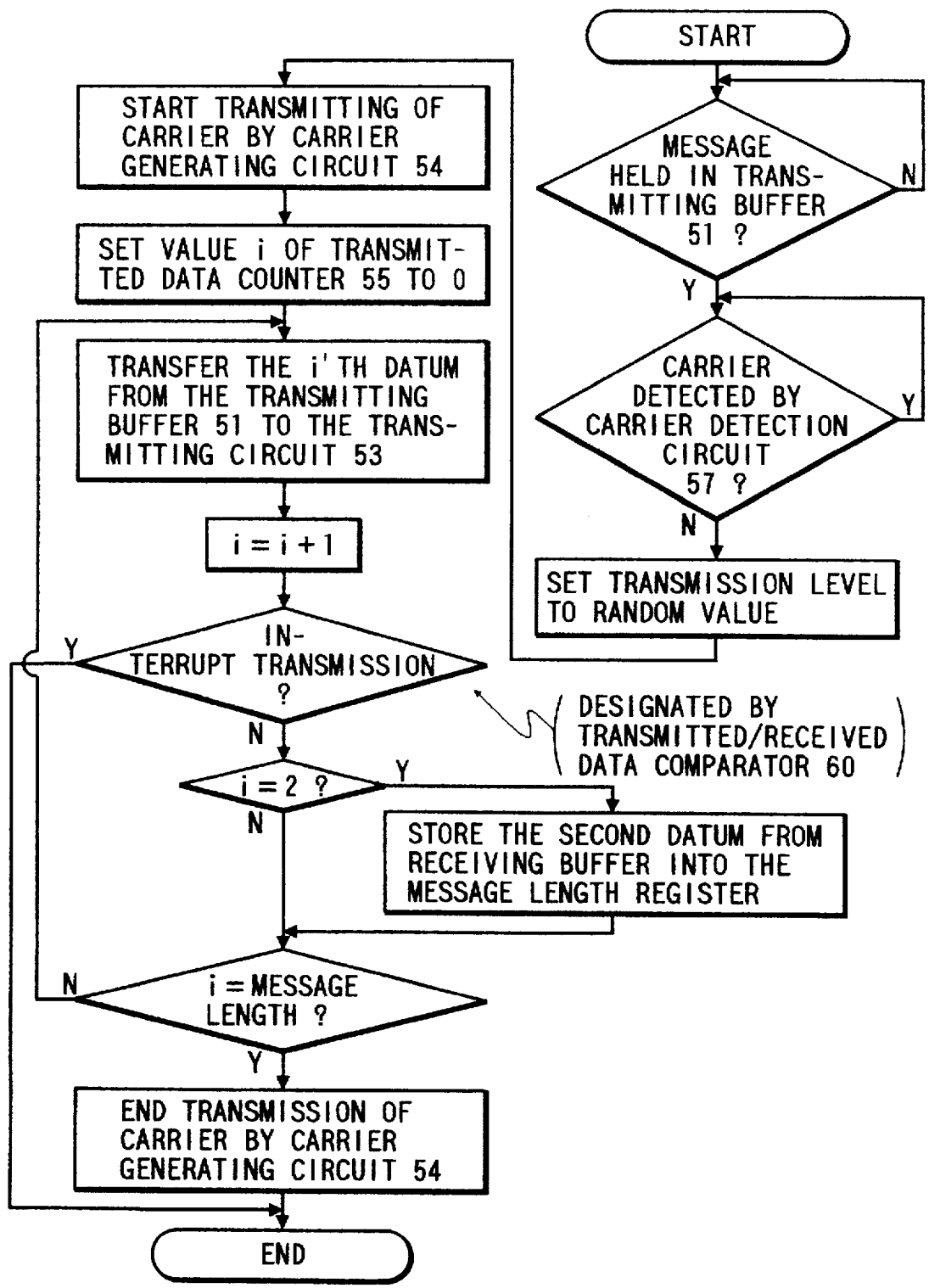
FIG. 33 is a flow diagram of operations executed by the fifth embodiment.

The operation sequence for transmitting a message, performed by the transmitting control circuit 52 in conjunction with the transmitted/received data comparator 60, for the fifth embodiment of the invention described above, is shown in the flow diagram of FIG. 33.

A sixth embodiment of a CATV-LAN according to the present invention will be described, whereby the transmission level of a modem is varied in accordance with the priority of a message which is to be transmitted, so that messages which have a high priority will be given precedence in being transmitted.

Figure 34:
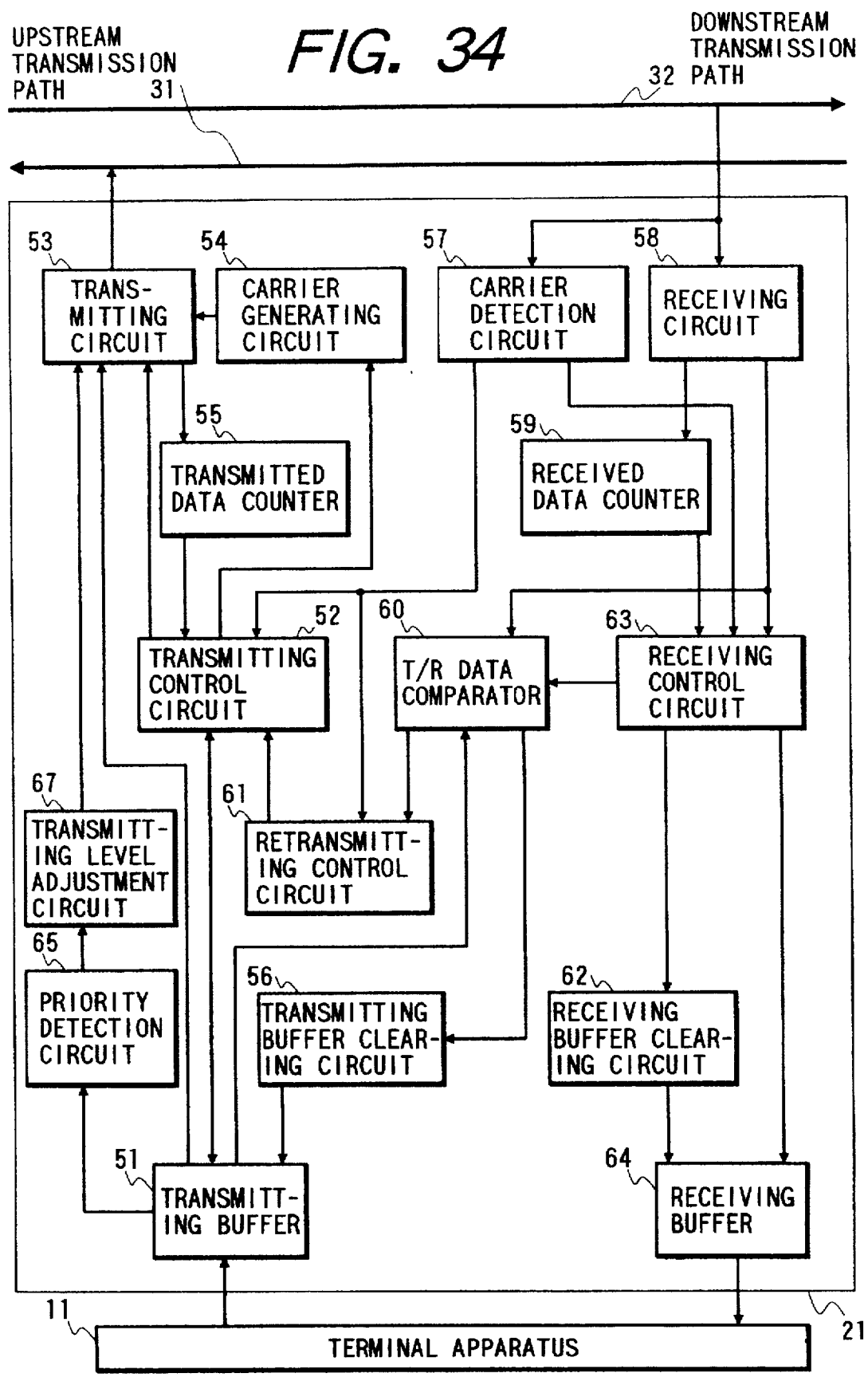
FIG. 34 is a circuit block diagram of a modem used in a sixth embodiment of a CATV-LAN according to the present invention.

FIG. 34 shows the configuration of a modem in this embodiment. As shown, the modem is provided with a priority detection circuit 65, for detecting the priority that has been assigned to a message, and for determining, in accordance with the priority, a range of values within which the transmission level at which that message will be transmitted is randomly determined. The modem further includes a transmission level adjustment circuit 67 which randomly sets the transmission levels of the transmitting circuit 53 and the carrier generating circuit 54 within the range that is set by the priority detection circuit 65. The remaining parts of the configuration are identical to those of the first embodiment shown in FIG. 4.

Figure 35:
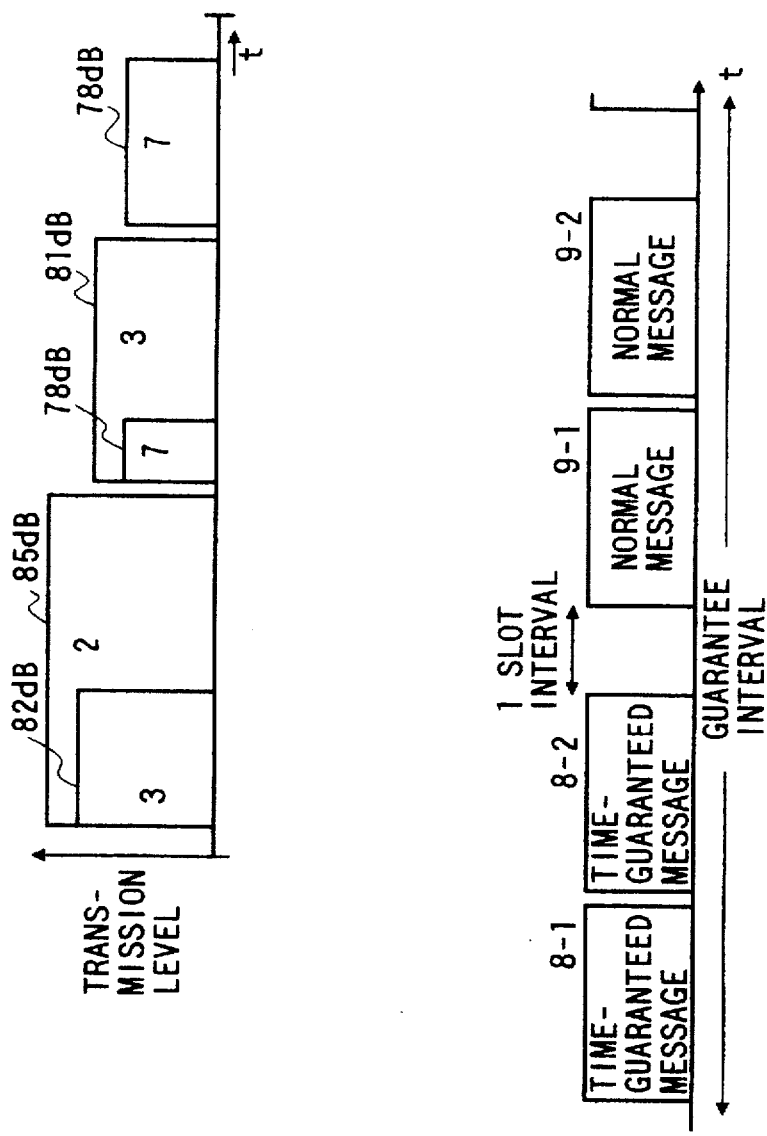
FIGS. 35A, 35B respectively show a table used in a modem of the sixth embodiment, and an example of a message transmission sequence.

The priority detection circuit 65 of the modem 21 stores a table, of the form shown in FIG. 35A. As shown, this table specifies relationships between the priorities and respective transmission level ranges. When the priority detection circuit 65 detects the priority of a message which is to be transmitted, it obtains from the table the range of transmission levels which correspond to that priority, and notifies the transmission level adjustment circuit 67 of that range. The transmission level adjustment circuit 67 then randomly selects a transmission level value for the transmitting circuit 53 and carrier generating circuit 54, within that range.

The operation of this CATV-LAN will be described referring to FIG. 35B. It will be assumed that the modem 21 sends message 2, having the priority 1, and the message 7 which has the priority 2, while the modem 22 sends the message 3 which has the priority 1.

When the message 2 is set into the transmitting buffer 51 of the modem 21, the priority detection circuit 65 of that modem detects that the priority of the message is 2. Next, the priority detection circuit 65 obtains the transmission level range which corresponds to that priority (i.e. in this case, 1) from the table shown in FIG. 35A. and so notifies the transmission level adjustment circuit 67 that the transmission level range is 90 dB to 80 dB.

The transmission level adjustment circuit 67 then randomly determines a transmission level within that range. It will be assumed that the transmission level thus obtained for message 2 is 85 dB.

In addition, the transmission level adjustment circuit 67 of the modem 22 similarly is notified of a transmission level range by the priority detection circuit 65 of that modem, and will be assumed to set a transmission level of 82 dB for the message 3.

If the modems 21 and 22 respectively transmit the messages 2 and 3 simultaneously, then the data of message 3 will be destroyed by the data of message 2, and will be subsequently retransmitted. When that retransmission is performed, the transmission level adjustment circuit 67 of the modem 22 will select a transmission level for retransmitting the message 3 that is within the range 90 dB to 80 dB, for example 81 dB.

On the other hand, after the modem 21 has transmitted the message 2, the message 7 will be set into the transmitting buffer 51 of that modem. Since the priority of message 7 is 2, the priority detection circuit 65 of the modem 21 will designate to the transmission level adjustment circuit 67 that the transmission level range is 80 dB to 70 dB. The transmission level adjustment circuit 67 then randomly determines the transmission level for message 7 as, for example, 78 dB.

If that message 7 is transmitted by the modem 21 at the same time that the message 3 is transmitted by the modem 22, then since the message 3 has the higher transmission level, the message 7 will be destroyed. Hence, after the message 3 has been transmitted, the modem 21 will retransmit the message 7.

In that way, with the sixth embodiment of a CATV-LAN, messages which have a high priority are transmitted at a high transmission level, so that messages are transmitted successively in order of their priority.

This embodiment differs from the fifth embodiment in that it is not necessary to designate that message transmissions will be inhibited during time intervals which are determined in accordance with priority values. Hence, an overall high efficiency of message transmission can be achieved.

Figure 36:
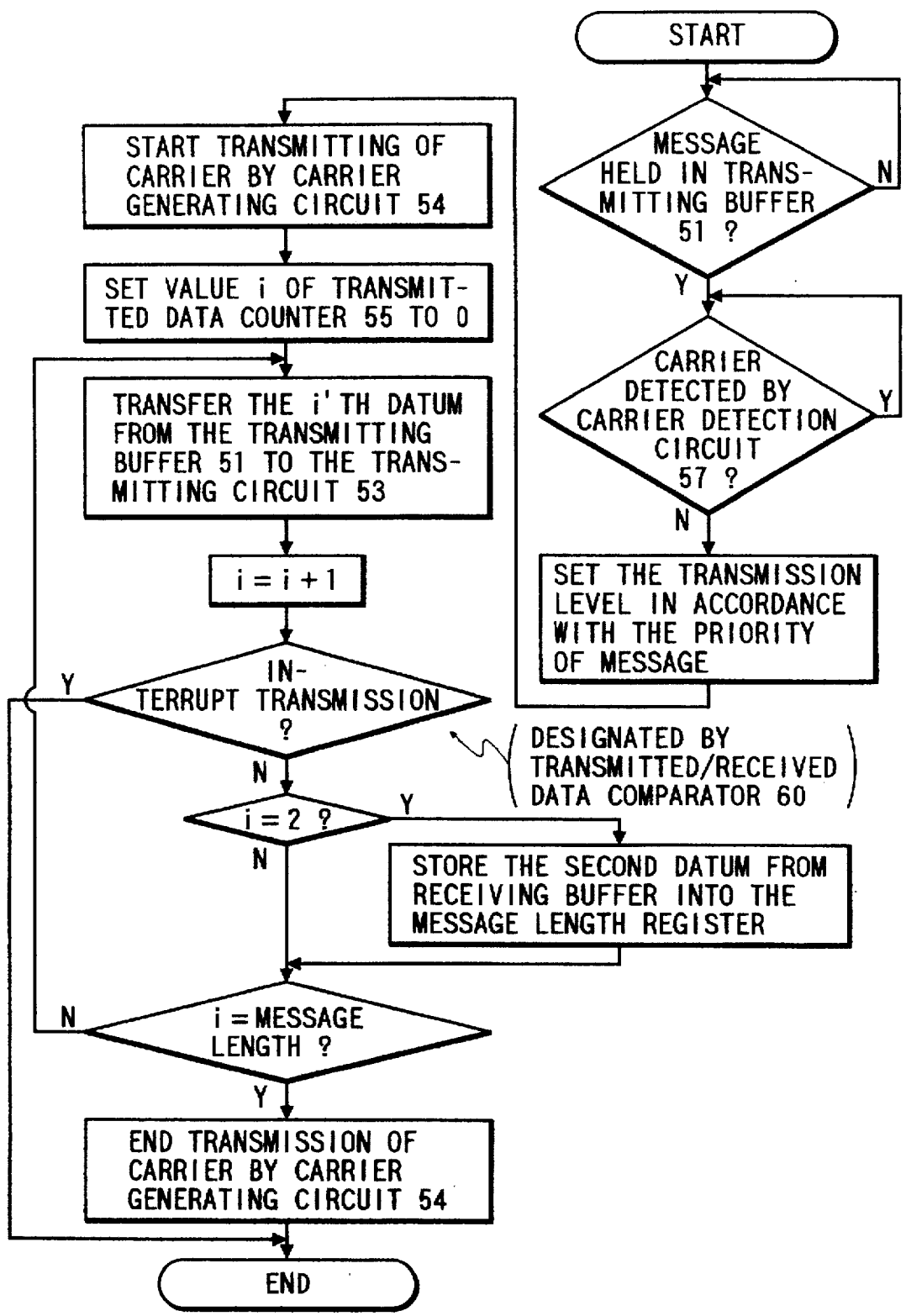
FIG. 36 is a flow diagram of operations executed by the sixth embodiment.

The operation sequence for transmitting a message, performed by the transmitting control circuit 52 in conjunction with the transmitted/received data comparator 60, for the sixth embodiment of the invention described above, is shown in the flow diagram of FIG. 36.

A seventh embodiment of a CATV-LAN will be described, whereby message transmission times can be guaranteed. More precisely, it can be guaranteed for certain specific messages that the message will be transferred to the destination within a predetermined time interval. Hence such messages (referred to in the following as time-guaranteed messages are distinguished from other messages by containing an identifier. The predetermined time interval within which a time-guaranteed message must be transferred will be referred to as the guarantee time interval.

Figure 37:
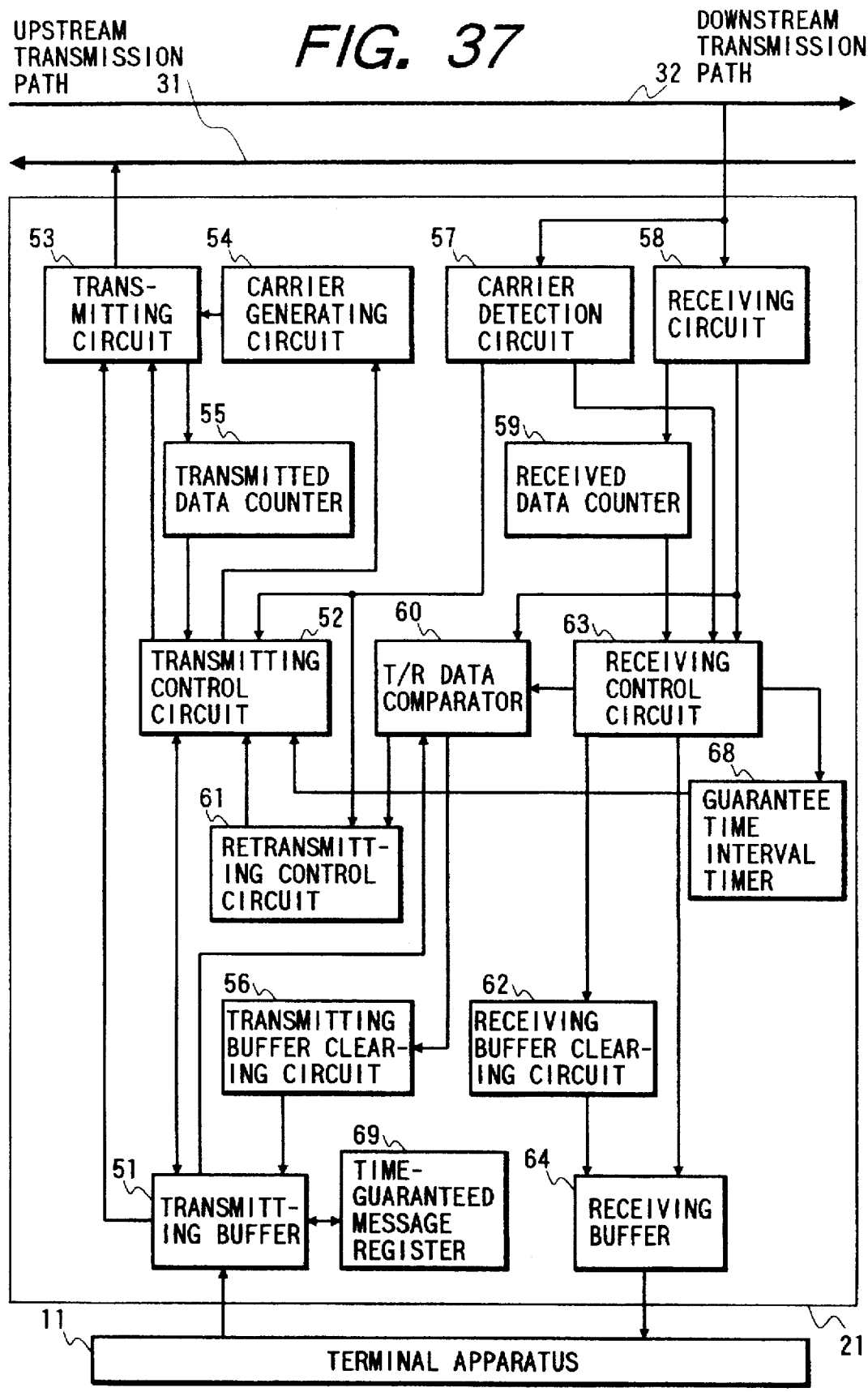
FIG. 37 is a circuit block diagram of a modem used in a seventh embodiment of a CATV-LAN according to the present invention.

FIG. 37 shows the configuration of a modem in this embodiment. As shown, the modem includes a guaranteed time interval timer circuit 68, which performs timing operations under the control of the receiving control circuit 63. The modem also includes a time-guaranteed message register 69, for holding a time-guaranteed message. The remaining parts of this embodiment are identical to those of the first embodiment (FIG. 4).

The operation of this embodiment will be described referring to FIG. 38. After a message has been transferred from the terminal apparatus 11 and set into the transmitting buffer 51 of the modem 21, the message is examined to find whether it contains an identifier which specifies that the message is a time-guaranteed message. If the message is found to be a time-guaranteed message, then it is set into the time-guaranteed message register 69. It will be assumed that a time-guaranteed message 8-1 is being held in the time-guaranteed message register 69 of the modem 21, while a normal message 9-1 is being held in the transmitting buffer 51 of the modem 21.

Similarly, it will be assumed that a time-guaranteed message 8-2 is being held in the time-guaranteed message register 69 of the modem 22, and a normal message 9-2 is being held in the transmitting buffer 51 of the modem 22.

A value for the guarantee time interval has been predetermined, and that value is held stored within the guaranteed time interval timer circuit 68 of each of the modems.

It will be assumed that when the transmission path is in the idle state, the modems 21 and 22 compete to transmit a message. If there is a message held in the time-guaranteed message register 69 of a modem, then the modem will first attempt to execute operations for transmitting that message. As a result, in this example, the modem 21 will attempt to transmit the message 8-1, while the modem 22 will attempt to transmit the message 8-2. It will be assumed that the modem 22 is the winner, i.e. that it succeeds in transmitting the message 8-1. In that case, the receiving circuit 58 of each modem will receive the message 8-1, and the receiving control circuit 63 will recognize this as being a time-guaranteed message, since it contains the identifier. After the time-guaranteed message 8-1 has been transmitted, the transmission path returns to the idle condition.

After the time-guaranteed message has been transferred over the transmission path, if the transmission control circuit 52 of any modem is waiting to transmit a normal message, then after confirming that the idle state of the transmission path has continued for one slot time interval, the modem begins transmission of that message. On the other hand, after the transmission of the time-guaranteed message has been completed, if another time-guaranteed message is transmitted, then transmission of that message will begin as soon as the idle condition of the transmission path is detected.

In accordance with the above rules, before the modem 21 transmits the next message (which is a normal message 9-1) after having transmitted the time-guaranteed message 8-1, the modem checks to confirm that the idle time interval of one slot time interval has elapsed. However at that time the modem 22 is waiting to transmit the time-guaranteed message 8-2, and so that modem begins to transmit the time-guaranteed message as soon as the transmission of the time-guaranteed message 8-1 has been completed. Thus, while the modem 21 is in the process of confirming that the specified idle time interval has elapsed, the modem 22 takes the opportunity to transmit the time-guaranteed message. After that time-guaranteed message 8-2 has been transmitted by the modem 22, the transmission path returns to the idle state.

At that time, none of the modems has a time-guaranteed message waiting to be transmitted, whereas the normal messages 9-1 and 9-2 are respectively waiting to be transmitted by the modems 21 and 22. Each of the modems 21 and 22 then waits until one slot time interval of idle time interval has elapsed, and then these modems compete to try to transmit the respective messages 9-1 and 9-2.

After transmission of a normal message has been started by a modem, if the modem then is placed in a condition of having to transmit a time-guaranteed message, then the guaranteed time interval timer circuit 68 of that modem begins a timing operation under the control of the receiving control circuit 63. When the guarantee time interval has elapsed, the guaranteed time interval timer circuit 68 sends a "time up" indication signal to the transmitting control circuit 52 of the modem.

In response to that "time up" indication signal, even if the normal message is still in the process of being transmitted, the transmitting control circuit 52 halts transmission of that message.

As a result of that interruption, the transmission path enters the idle state, whereupon all modems which are waiting to transmit time-guaranteed messages begin to compete to transmit their respective messages. The time-guaranteed message held by the modem which wins that competition is the transmitted, and thereafter (in accordance with the rules described above) the time-guaranteed messages held by the other modems are sequentially transmitted.

In that way, with the 7th embodiment, by ensuring that the time-guaranteed messages which are held in respective modems will each be given an opportunity to be transmitted within the guarantee time interval, transmission of each of such messages within the guarantee time interval is achieved, as far as possible.

Figure 39:
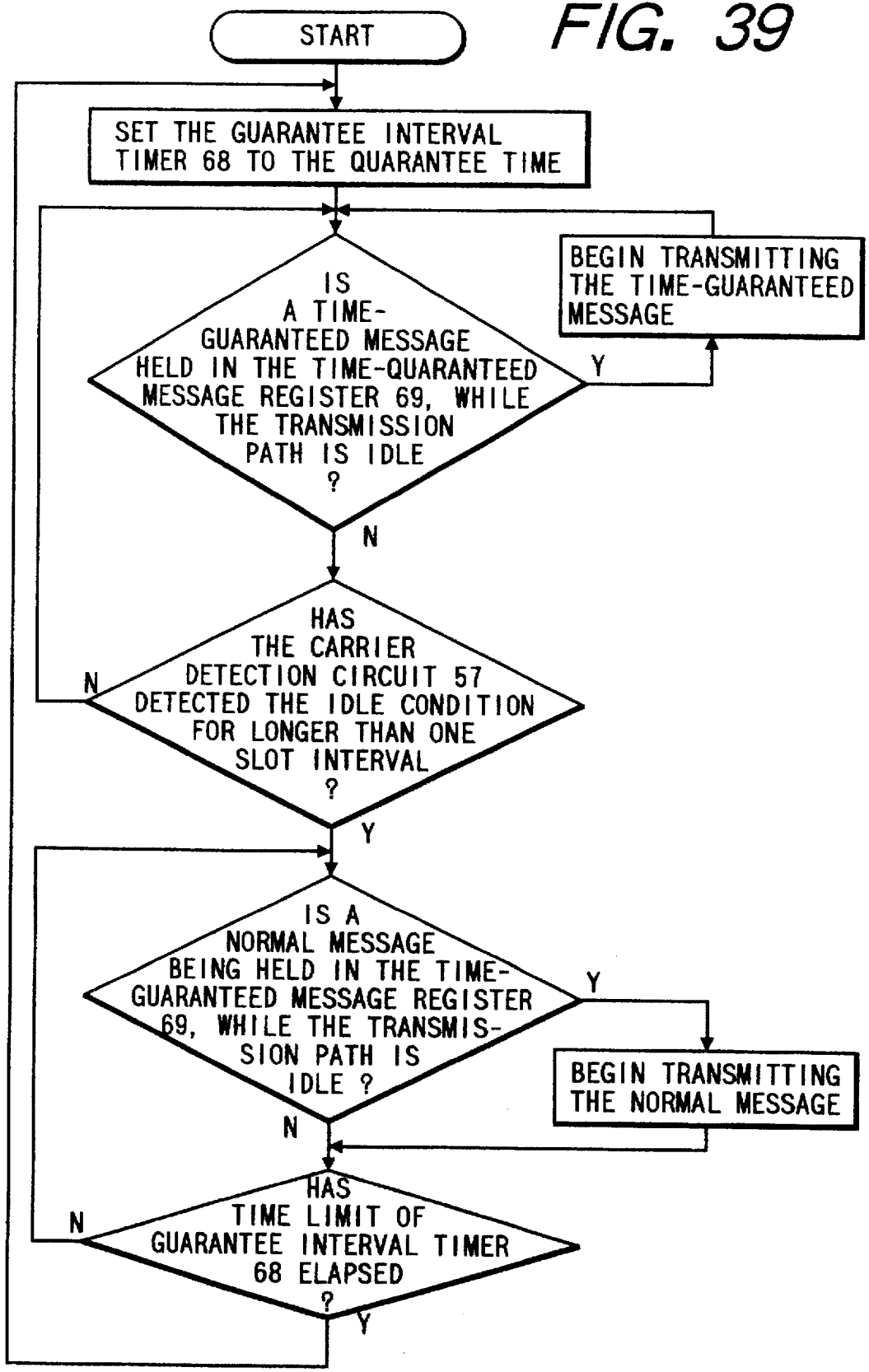
FIGS. 39, 40, 41 are flow diagrams of operations executed by the seventh embodiment.

The operation sequence for transmitting a message, performed by the transmitting control circuit 52 for the seventh embodiment of the invention described above, is shown in the flow diagram of FIG. 39.

Instead of using an identifier in each time-guaranteed message, it would be possible to register a requested guarantee time interval within each time-guaranteed message. In that case, the guaranteed time interval timer circuit 68 would determine the guarantee time interval in accordance with the requested guarantee time interval. For example, it will be assumed that the time-guaranteed message 8-1 is assigned the requested guarantee time interval of 10 milliseconds, whereas the guaranteed time interval timer circuit 68 of the corresponding modem operates with a nominal predetermined guarantee time interval of 5 milliseconds. That is, the minimum value of guarantee time interval is 5 milliseconds. In that case the current value of predetermined guarantee time interval, in the modem 21, is excessively short, by 5 seconds. The excess amount (5 milliseconds) is therefore added to the time interval which is to be measured by the guaranteed time interval timer circuit 68 of the modem 21, so that the next time-guaranteed message will be transmitted by that modem under the condition of a guarantee time interval of 10 milliseconds. In that way, the guarantee time interval can be extended as required. If the requested guarantee time interval is less than the minimum value, then the actually used guarantee time interval is set as the minimum value, i.e. the nominal value for the timer.

Figure 41:
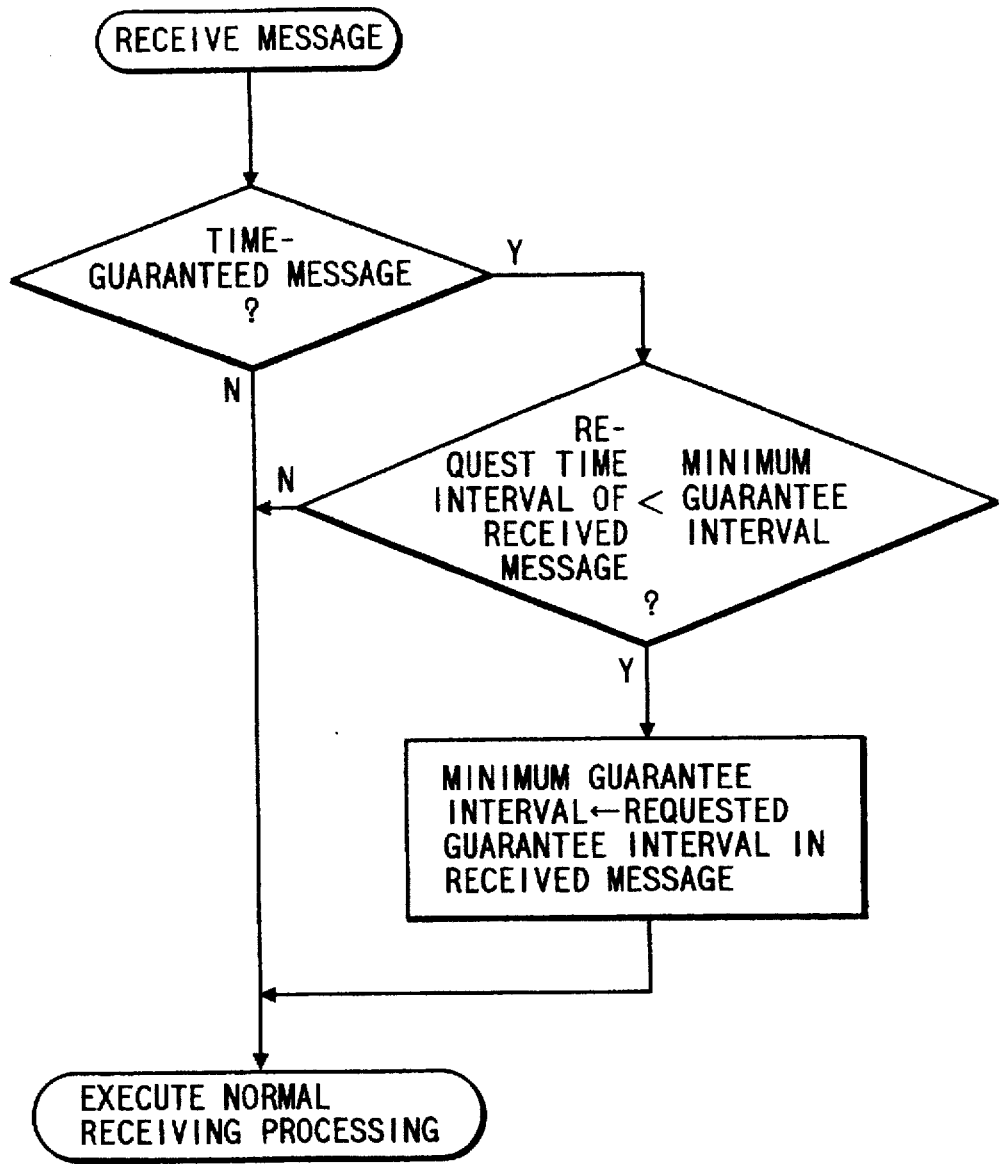

That operation is illustrated in the flow diagram of FIG. 41.

Conversely, if the nominal predetermined guarantee time interval is 30 milliseconds, then if the requested guarantee time interval of a time-guaranteed message that is to be transmitted by that modem is 10 milliseconds for example, the time interval which must be measured by the guaranteed time interval timer circuit 68 is reduced by 20 milliseconds. Thus, the actually used guarantee time interval is obtained by subtracting the predetermined guarantee time interval from the requested guarantee time interval. If the result is positive, it is added to the predetermined guarantee time interval value, and the resultant value is used as the actual guarantee time interval which must be measured by the guaranteed time interval timer circuit 68. If the result is negative, then then the time interval which must be measured by the guaranteed time interval timer circuit 68 is set as the requested guarantee time interval of the message. Transmission of the time-guaranteed message is thereafter executed, using the updated value of guarantee time interval. In that way, it is possible to either lengthen or shorten the guarantee time interval, if necessary.

Figure 40:
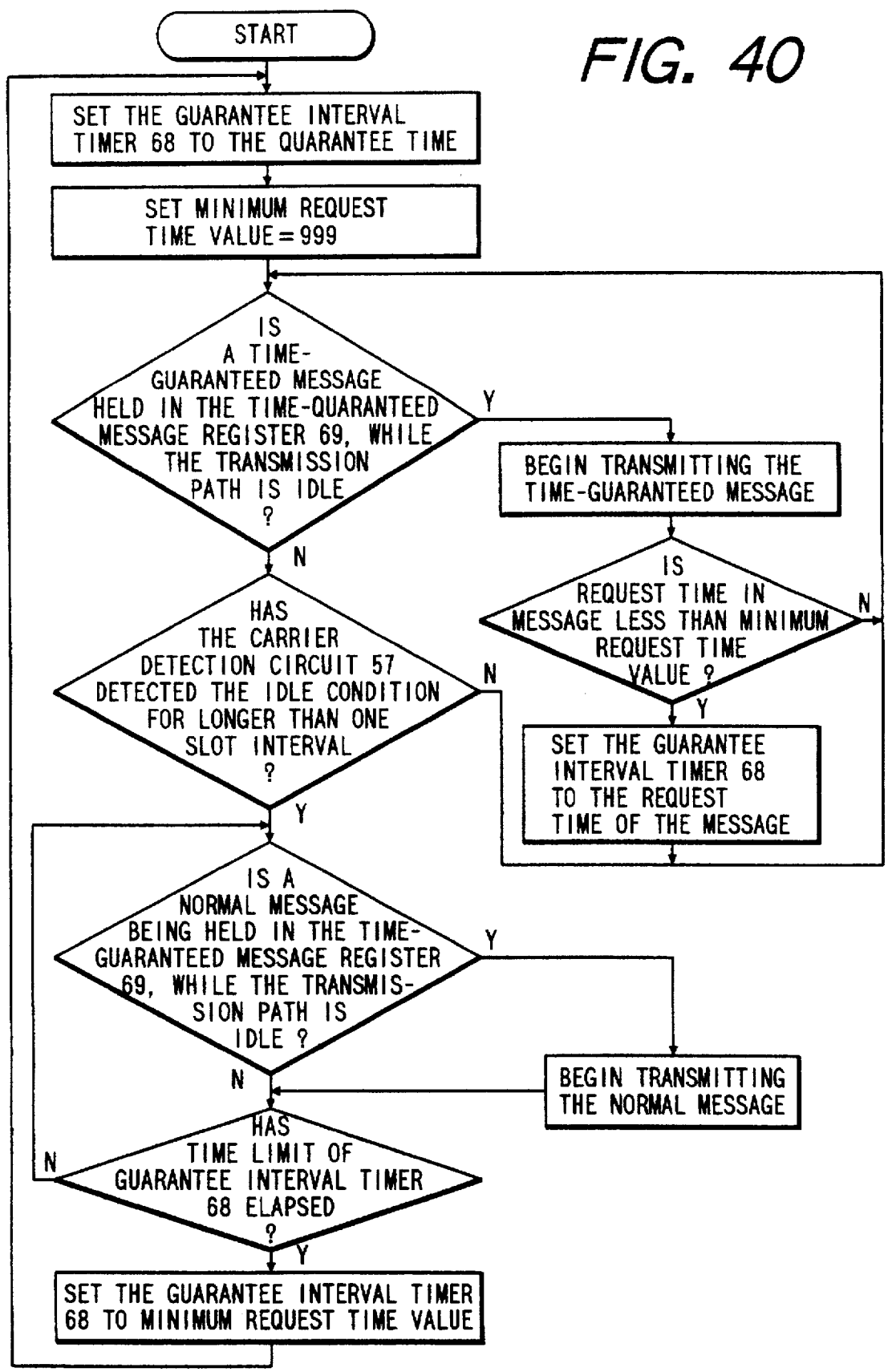

The above operations are illustrated in the flow diagram of FIG. 40.

In that way, the actual guarantee time interval which is used in transmitting a message can be determined as the value of guarantee time interval that is strictly necessary for that message, since it becomes possible to transmit messages by using respectively different values of guarantee time interval.

An eighth embodiment of a CATV-LAN will be described, in which the modems are divided into groups, and messages are transmitted sequentially by the groups. The transmission efficiency can thereby be increased.

Figure 42:
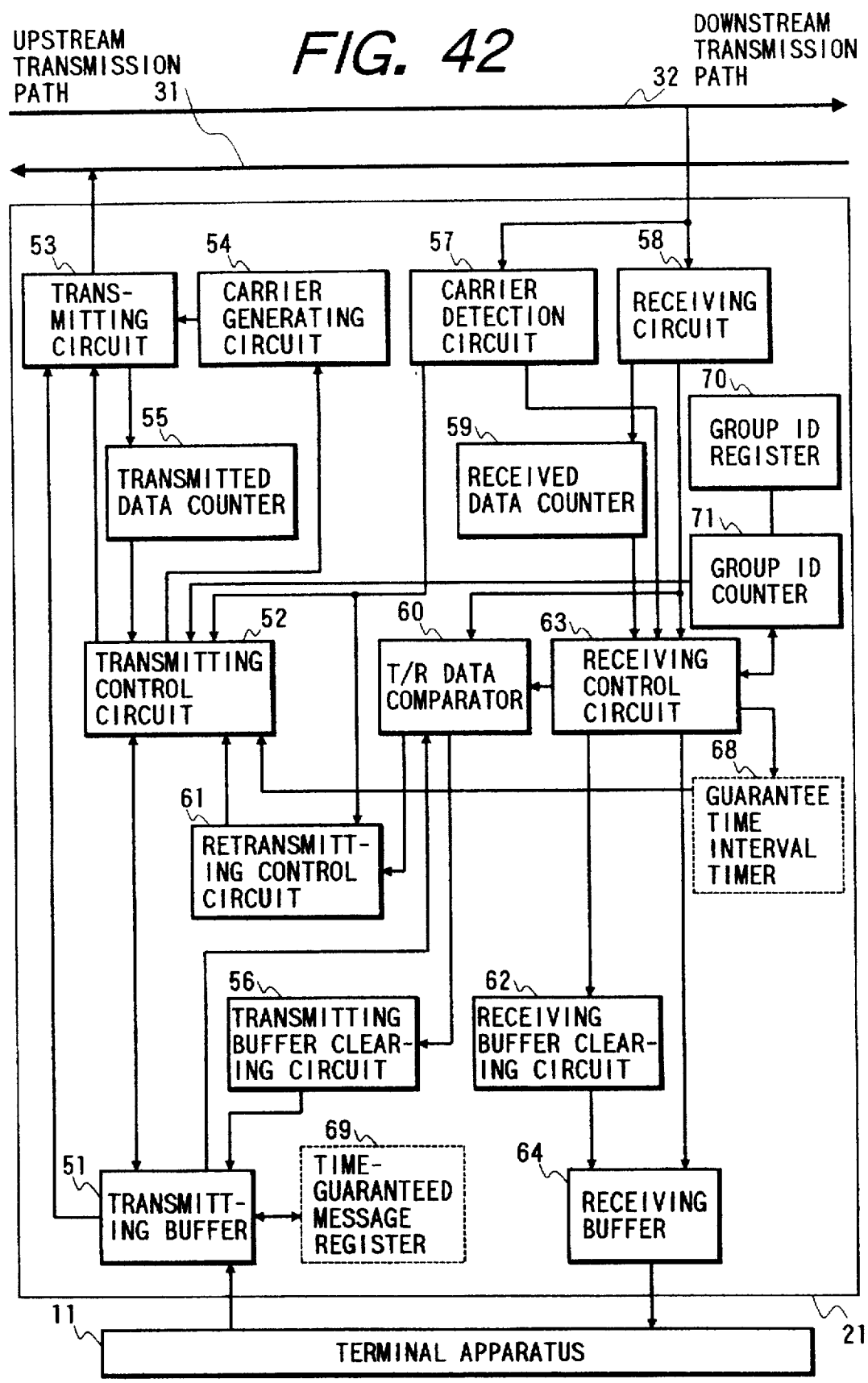
FIG. 42 is a circuit block diagram of a modem used in an eighth embodiment of a CATV-LAN according to the present invention.

As shown in FIG. 42, a modem of such a CATV-LAN includes a group ID register 70 for storing a group ID (i.e. a group identifier number), which specifies the group to which that modem belongs, and a group ID counter 71 which holds a count value specifying the ID number of the group which is currently in the process of transmitting under the control of the receiving control circuit 63. the remaining configuration is identical to that of the first embodiment (FIG. 4).

The modems are divided into the groups in such a way that each group contains modems which have a high transmission level and modems which have a low transmission level. This serves to ensure that even if modems within the same group attempt to transmit at the same time, so that data conflict occurs, the capture effect will ensure that the message transmitted by the modem having a high transmission level will be correctly transmitted.

It will be assumed that the modems 21, 22, 23 and 24 have respective transmission levels whose magnitudes relationship can be expressed as:

modem 21>modem 22>modem 23>modem 24.

It will also be assumed that the modem 21 is to transmit the message 10, the modem 22 is to transmit the message 11, the modem 23 is to transmit the message 12, and the modem 24 is to transmit the message 13. In that case, if the modems were not divided into groups, then transmission of the messages might occur as illustrated in FIG. 43A.

As shown in FIG. 43A, the modems 21 and 22 are assumed to attempt to transmit their respective messages 10 (10-1) and 11 (11-1) at the same time. Due to the fact that the transmission levels of the messages are similar, the capture effect will not occur, so that the data of both of the messages will be destroyed. As a result, the message 10 (10-2) will be retransmitted by the modem 21, and then (after waiting for completion of transmission of message 10), the modem 22 will retransmit the message 11 (11-2). Thereafter, the modems which have the lowest transmission levels will transmit, i.e. the modem 23 will transmit the message 12 and the modem 24 will transmit the message 13.

The case will now be considered, referring to FIG. 43B, in which the four modems 21 to 24 are divided into two groups, with the modems within a group having substantially different transmission levels, i.e. group 1 which is made up of the modems 21 and 23, and group 2 which is made up of the modems 22 and 24.

First, the group ID counter circuit 71 in each of the modems 21 to 24 is set to a value of 1, and in that case, only the modems which hold that ID number 1 of group 1 within the group ID register 70 (i.e. the modems 21 and 23) will be enabled to transmit. Even if the modems 21 and 23 transmit the messages 10 (10-1) and 12 (12-1) respectively at the same time, there is a sufficiently great amount of difference between the transmission levels of these modems that the capture effect will occur, and so the message 10 will be successfully transmitted. Next, the modem 23 succeeds in retransmitting the message 12 (12-2). When the idle condition is found to have continued for one slot time interval, while the group 1 modems are enabled to transmit, then this is taken to indicate the transmissions of the group 1 modems have been completed. Specifically, when that occurs, the receiving control circuit 63 in each modem increments the value held in the group ID counter by 1.

As a result, the modems of group 2 are now enabled to execute message transmissions in the same way as described above for group 1. If none of the modems within the group are waiting to transmit a message, then after one slot time interval of the idle state of the transmission level has elapsed, the group ID counter in each modem is again incremented by 1. After all of the modems in the group which has the highest group number have completed transmission of their messages, and all of these messages have been received, the group ID counter circuit 71 in each modem is reset to a value of 1.

As can be understood from the above, this embodiment ensures that conflict will occur only between signals which differ as much as possible in level, thereby ensuring that the capture effect will occur. The amount of time overhead that is required to execute retransmissions is thereby reduced.

Figure 44:
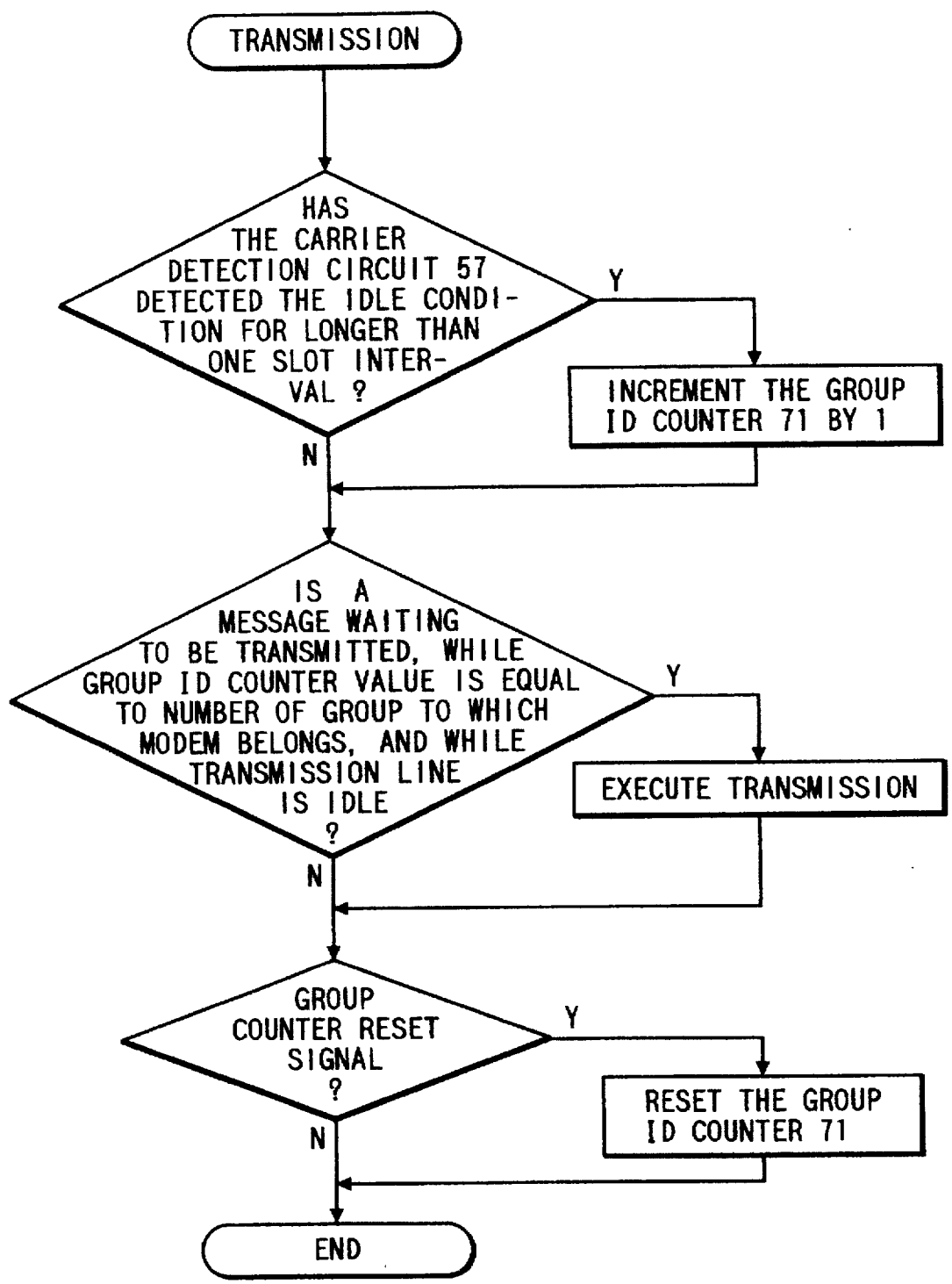
FIG. 44 is a circuit block diagram of a modem used in the eighth embodiment of a CATV-LAN according to the present invention.

The basic operations performed by the group ID counter and register of this embodiment, in conjunction with the transmitting control circuit 52, are shown in the flow diagram of FIG. 44.

Division of the modems into groups as described above can also be applied to a system in which time-guaranteed messages are transmitted. In that case, since the retransmission time overhead is reduced, because of the effective use of the capture effect, it becomes possible to more reliably satisfy the time guarantee requirements.

A ninth embodiment of a CATV-LAN will be described, in which even if the upstream transmission path is not yet in the idle state, transmission of a message can begin if the downstream transmission path has reached the idle state.

Figure 45:
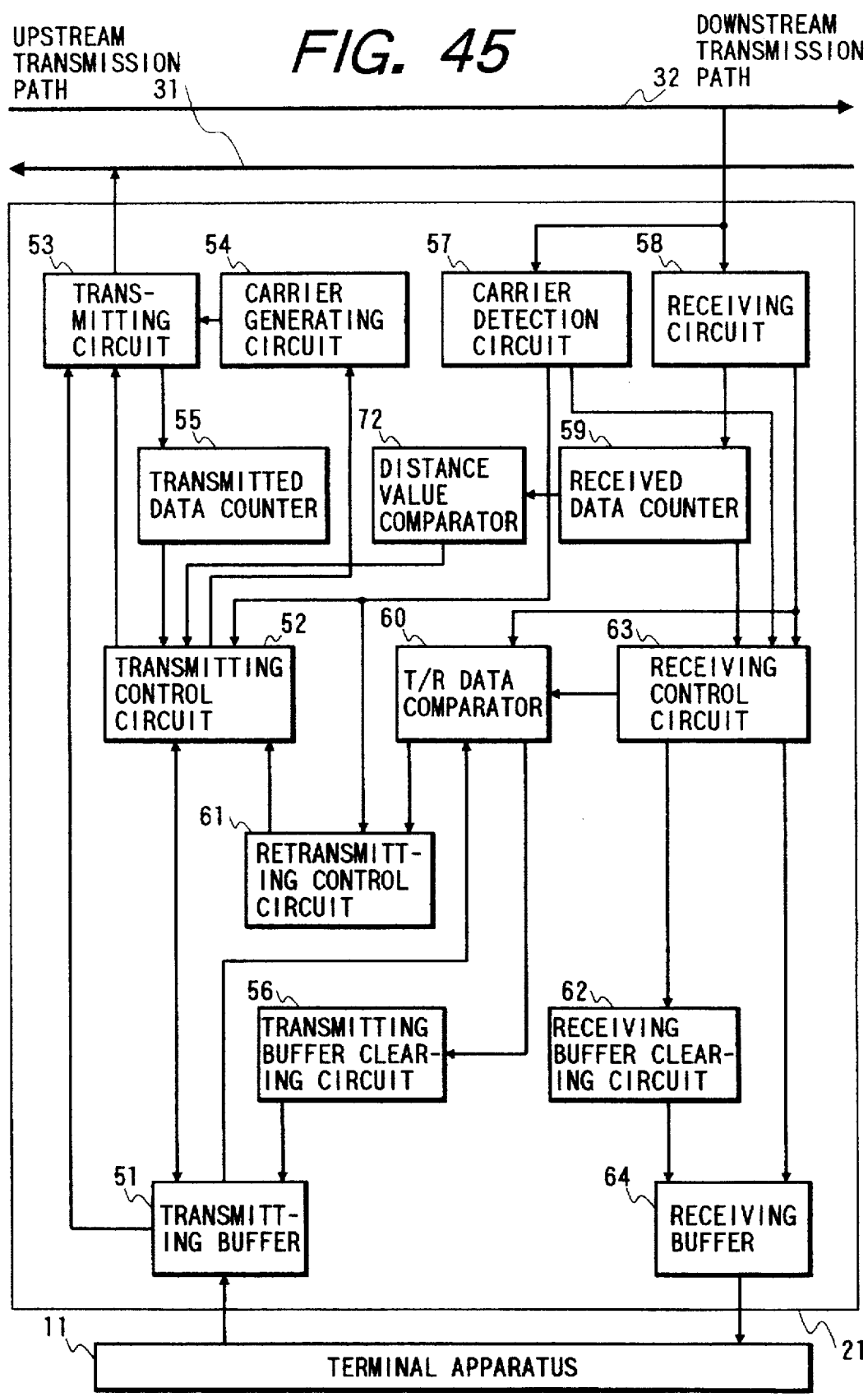
FIG. 45 is a circuit block diagram of a modem used in a ninth embodiment of a CATV-LAN according to the present invention.

As shown in FIG. 45, a modem in such a CATV-LAN includes a path length comparator circuit 72 for comparing the path length between that modem and the head end apparatus 4 and the length of transmission path that is currently occupied by data which are being received by that modem. The remaining parts of the configuration are identical to those of the embodiment of FIG. 4.

The operation of the CATV-LAN will be described referring to FIG. 46. It will be assumed that the modem 21 has transmitted the message 10. As that message travels over the transmission path, then at any particular instant, a specific section of the transmission path is occupied by the data of that message. If the message is short, i.e. is formed of only a small number of data, if the transmission bit rate is high, or if the rate of data transmission is low, (i.e. in relation to the time required for data to traverse the transmission path from a modem to the head end apparatus and back to that same modem) then only a part of the total transmission path will be occupied by the message, at any one time, as the message travels along that path. In FIG. 46, "m.10" denotes a section of the transmission path which is occupied by the message 10, at some instant while that message is travelling over the transmission path. In the following description it will be assumed that the modem 22 is waiting to transmit a message.

With each of the embodiments of the invention which have been described hitherto, the modem 21 would wait until the downstream transmission path 32 reaches the idle state, before beginning transmission of its message. However with this embodiment, under the condition shown in FIG. 46, it is possible for the modem 21 to begin transmission, and achieve successful transmission, without waiting for the modem 22 to end transmission so that the transmission path reaches the idle state. The operation will be described in the following.

When the modem 22 receives a message from the downstream transmission path 32, the length of that message is stored in the received data counter circuit 59, and thereafter, as each successive byte of the message is received, the value held in the received data counter circuit 59 is decremented. Hence, the received data counter circuit 59 always holds a value which expresses the length of the part of the message which has not yet been received.

The path length comparator circuit 72 compares the value that is held in the received data counter circuit 59 (after converting that value to an equivalent value of transmission path occupancy length) with the return path distance between the modem 22 and the head end apparatus 4 (which has been fixedly stored beforehand in the modem). Based on that comparison, if it is found that the occupied path length is shorter than the return path distance, then this indicates that the upstream transmission path 31 must be in the idle state, and so path length comparator circuit 72 permist the transmitting control circuit 52 to begin message transmission without waiting for the downstream transmission path 32 to attain the idle state.

Since it becomes unnecessary for the modem 22 to wait until the downstream transmission path 32 has reached the idle state, the reduction in waiting time of the modems serves to increase the transmission efficiency of the system.

Figure 47:
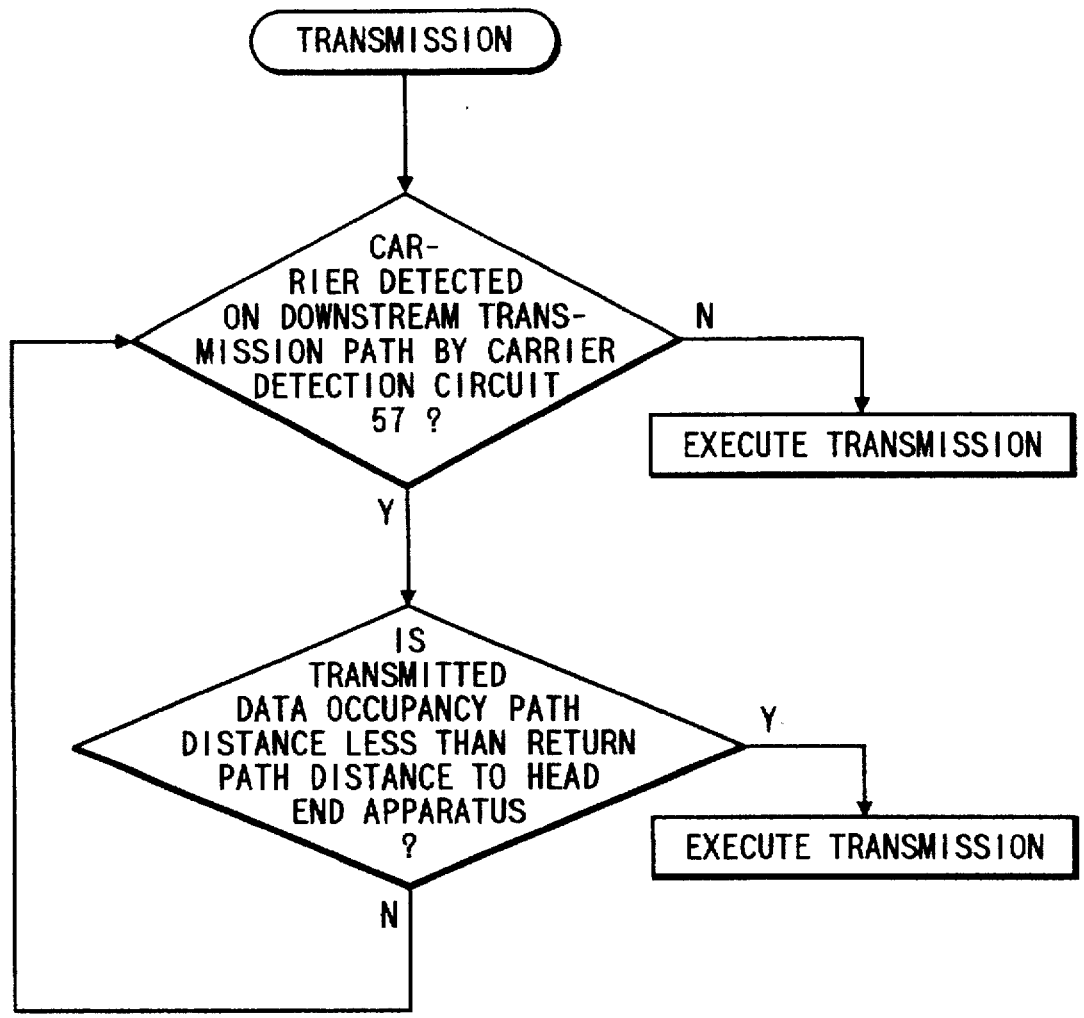
FIG. 47 is a flow diagram of operations executed by the ninth embodiment.

The basic operations performed by the transmitting control circuit 52 of this embodiment in conjunction with the distance value comparator 72, are shown in the flow diagram of FIG. 47.

Figure 48:
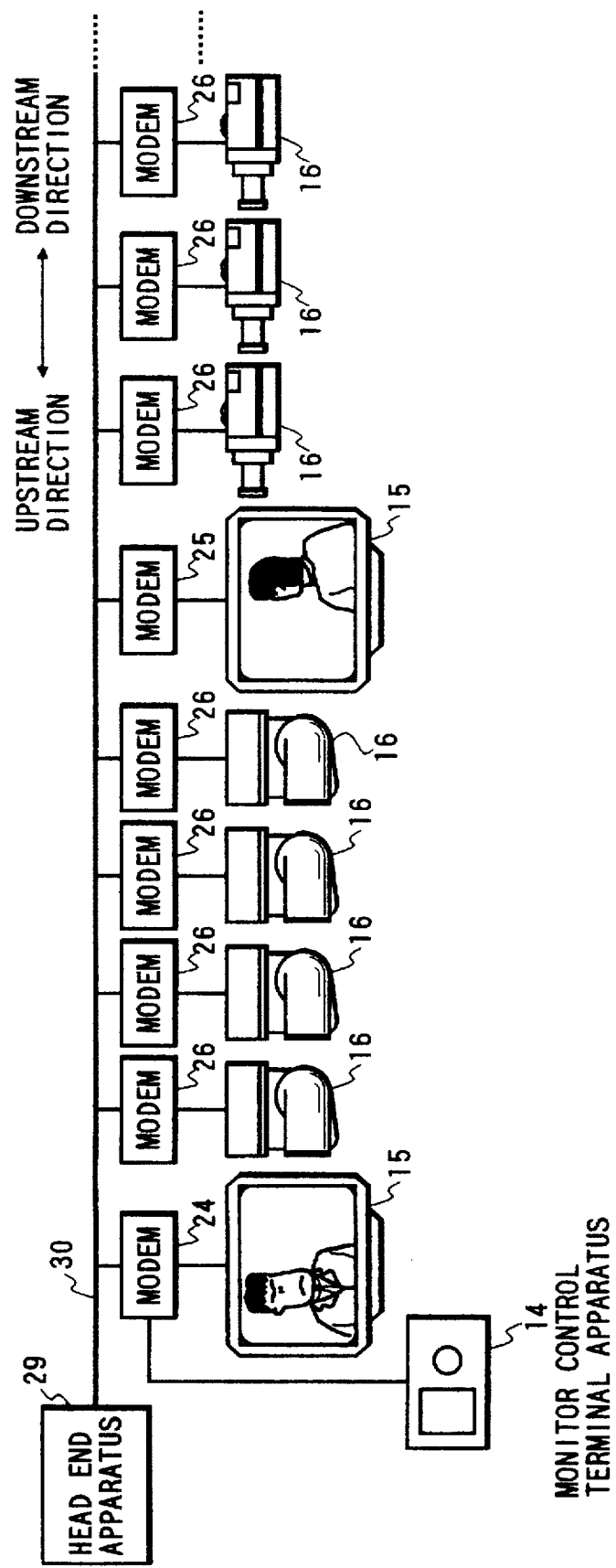
FIG. 48 shows the overall configuration of a tenth embodiment of a CATV-LAN according to the present invention.

A tenth embodiment will be described, which constitutes a video camera monitoring system. As shown in FIG. 48, this CATV-LAN consists of a plurality of monitor video cameras 16, monitor display units 15, a control terminal apparatus 14 which controls the operation of the cameras 16 and the selection of video signals to be supplied to the monitor display apparatus 15, in addition to the head end apparatus 29 and the transmission path 30. The transmission path 30 can consist of a single cable, as indicated. Techniques for enabling this are well known, so that description will be omitted. Each of the monitor video camera 16, monitor display apparatus 15 and control terminal apparatus 14 is connected via modems 24 to a transmission path.

It is an essential feature of this embodiment that the head end apparatus 29 continuously generates a synchronizing signal, which it modulates and transmits along the downstream transmission path together with the signals from the modems, for example by frequency-multiplexing the synchronizing signal with the other signals which are conveyed over the transmission path 30.

Figure 49:
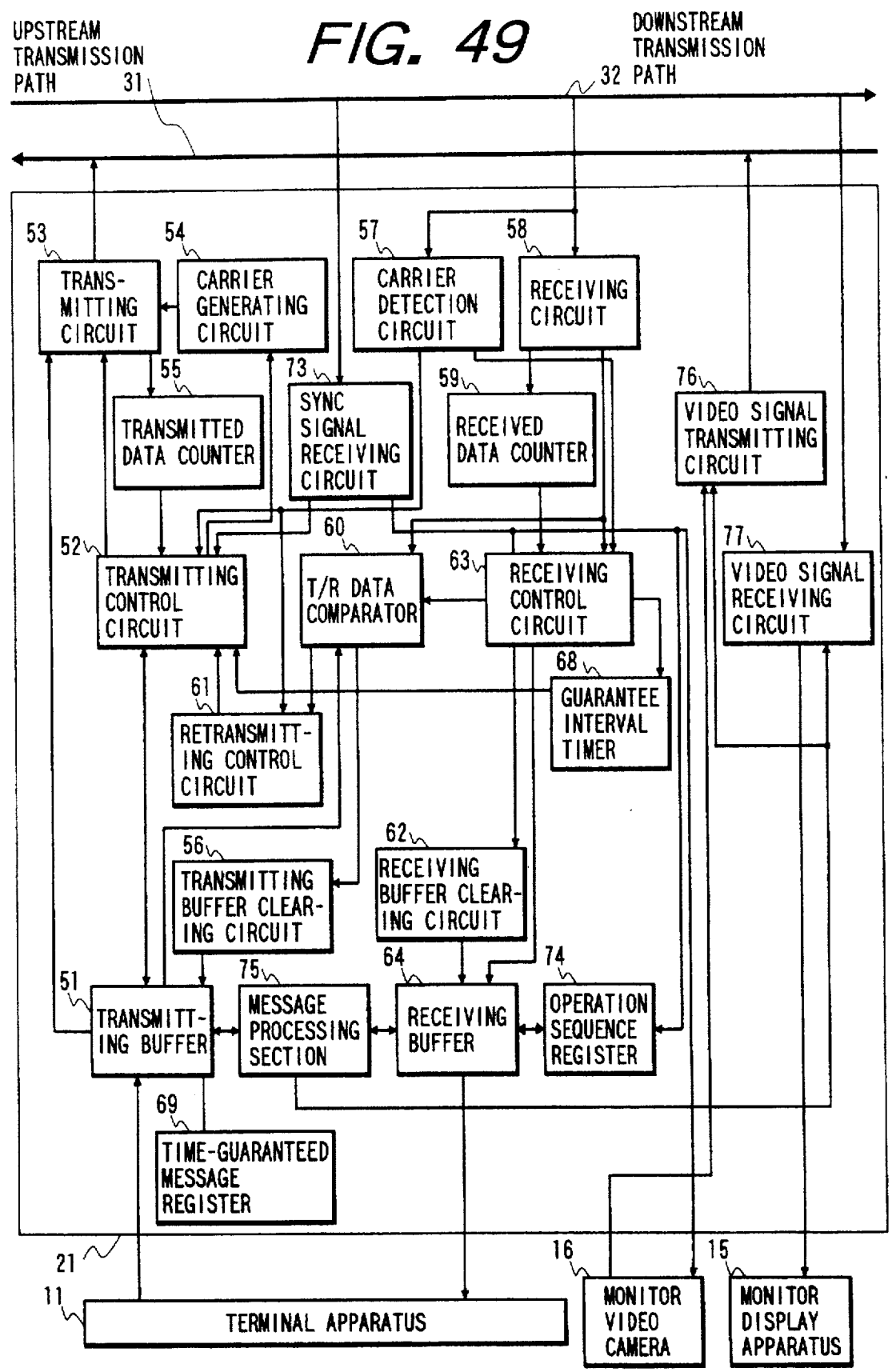
FIG. 49 is a circuit block diagram of a modem used in the tenth embodiment of a CATV-LAN according to the present invention.

As shown in FIG. 49, a modem of this CATV-LAN includes a synchronizing signal receiving circuit 73 for receiving the synchronizing signal which is superimposed on the transmission path, a message processing section 75 for executing messages which are received from the transmission path or from the terminal apparatus 11. In addition, a modem 26 which is connected to a monitor video camera 16 also includes a video data transmitting circuit 76, while a modem 24 or 25 which is connected to a monitor display apparatus 15 also includes a video receiving circuit 77. Such a modem also includes an operation sequence register 74 for storing an operation sequence which consists of operations that must be sequentially executed when receiving or transmitting video data, and for generating corresponding control signals. The contents of the operation sequence register 74 are not fixedly predetermined, as a special type of message (referred to in the following as a synchronous message) can be set therein, after having been sent from another modem. The operations of the operating sequence register 74 are synchronized with synchronizing signal pulses, which are received from the downstream transmission path 32 via the synchronizing signal receiving circuit 73. Specifically, the contents of a synchronous message which has been previously received and set into the operating sequence register 74 can be read out at an appropriate time, in synchronism with a synchronizing signal pulse from the synchronizing signal receiving 73, and transferred via the receiving buffer 64 to the message processing section 75. The message processing section 75 then generates specific control signals in accordance with the contents of that synchronous message, for example a control signal to designate the modulation frequency (i.e. transmission channel) at which the video signal is to be transmitted by the video signal transmitting circuit 76.

The operation of each monitor video camera 16 is also synchronized with the synchronizing signal pulses obtained from the transmission level, so that for example the vertical synchronizing periods of all of the monitor cameras are mutually synchronized.

The video data transmitting circuit 76 receives as input the video signal from a monitor video camera 16, and executes modulates the video signal at a specific modulation frequency (that is, the frequency of a specific channel), to achieved frequency division multiplexing of the video signal, and supplies the resultant signal to the upstream transmission path 31. The video signal receiving circuit 77 of a modulated video signal from the downstream transmission path 32, and converts that to a corresponding baseband video signal, which is supplied to a monitor display apparatus 15.

The basic functions of selectively processing normal (i.e. asynchronous) messages and synchronous messages are conceptually illustrated in the flow diagrams of FIG. 50.

In the following, a description will be given of operations whereby the control terminal apparatus 14 selects video signals from each monitor video camera 16, which is connected to a corresponding modem 26, and causes the video signal contents to be displayed by a specific monitor display apparatus 15 which is connected to the modem 24.

The control terminal apparatus 14 sends a "receive on channel A" command (in the form of a synchronous message) to the modem 24, and also generates a "transmit on channel 6" command, (also as a synchronous message) whose destination is a modem 26. The message processing section 75 of the modem 24, upon receiving the "receive on channel A" message, sends a control signal to the video data receiving circuit 77 whereby that circuit is set in a condition for receiving video data which are transmitted on channel A.

The message "transmit on channel A" is sent via the transmission path to the destination modem 26, and is set into the operating sequence register 74 of that modem. The message processing section 75 of that modem, upon subsequently receiving operating instructions from the operating sequence register 74 (these instructions being selected from predetermined instructions stored in that register, in accordance with the contents of the message that has been set into the register) sends corresponding control signals to the video data transmitting circuit 76 of the modem, whereby a video signal from the corresponding monitor video camera is transmitted as channel A modulated video data via the transmission path.

Figure 51:
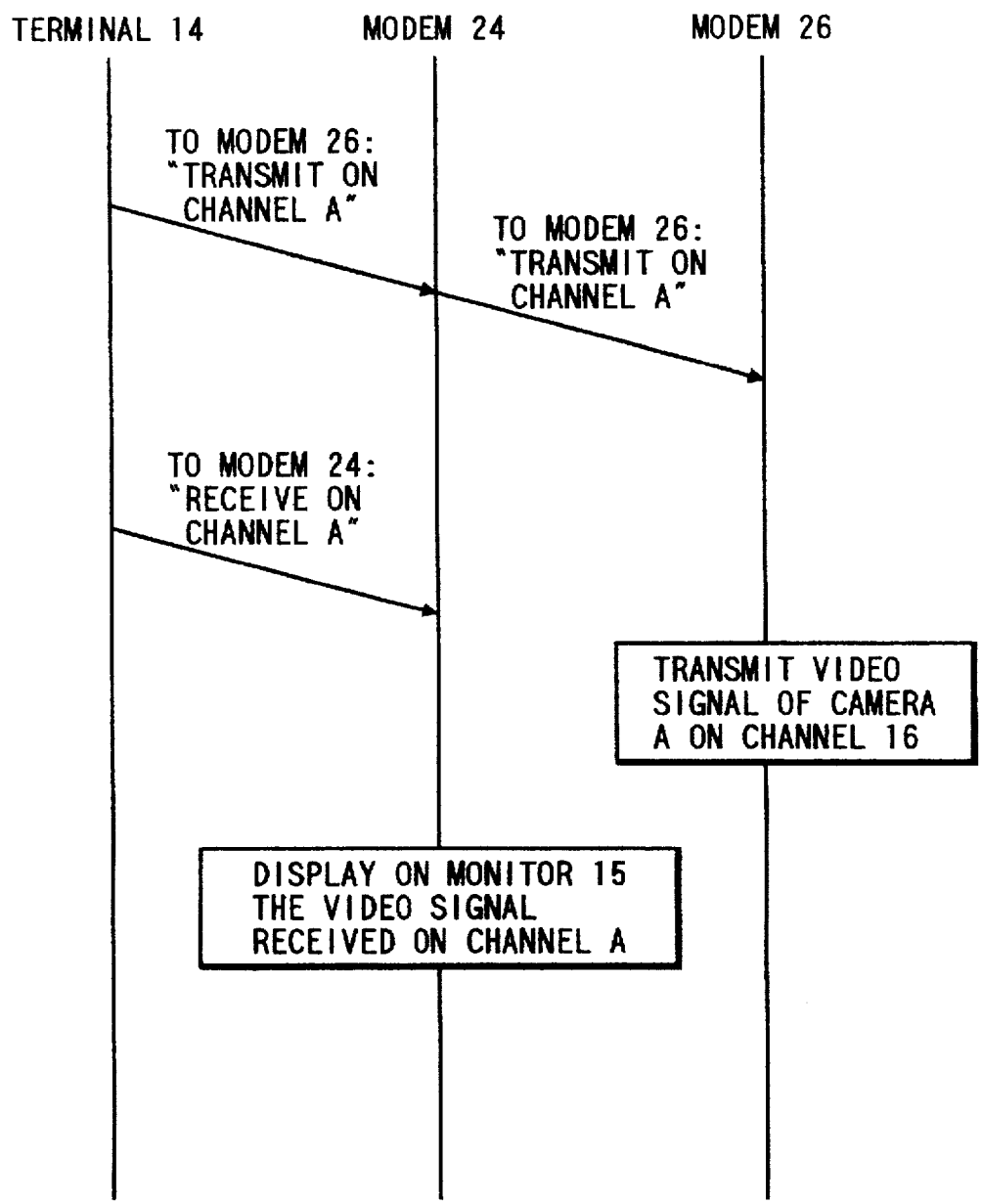

These operations are illustrated conceptually in FIG. 51.

In that way, a video signal from the corresponding camera 16 is transmitted as data which are modulated at the channel A frequency, via the transmission path, to be received by the video data receiving circuit 77 of modem 24, and so displayed by the corresponding monitor display apparatus 15.

With the system described above, the respective operations which must be executed to perform video data receiving and transmission operations are stored beforehand, as an operation sequence, in the operation sequence register 74 of each modem. In that case, it is possible to ensure that a receiving operation (i.e. to receive and transfer video data to a monitor display) is executed by each of the modems at the same time, i.e. at a time when the synchronizing signal receiving circuit 73 of each modem receives a synchronizing pulse from the downstream transmission path 32 However in implementing such synchronization of the operations of the modems by using synchronizing pulses in that way, it is important to note the following points.

Figure 52A:
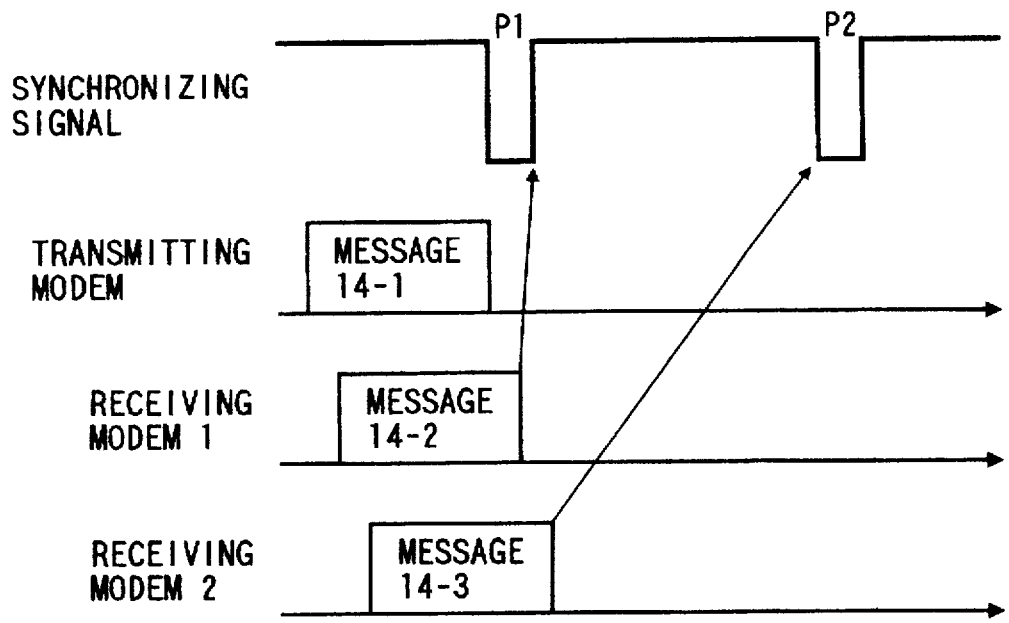
FIGS. 52A, 52B are transmission timing diagrams of synchronous messages, in the tenth embodiment.
Figure 52B:
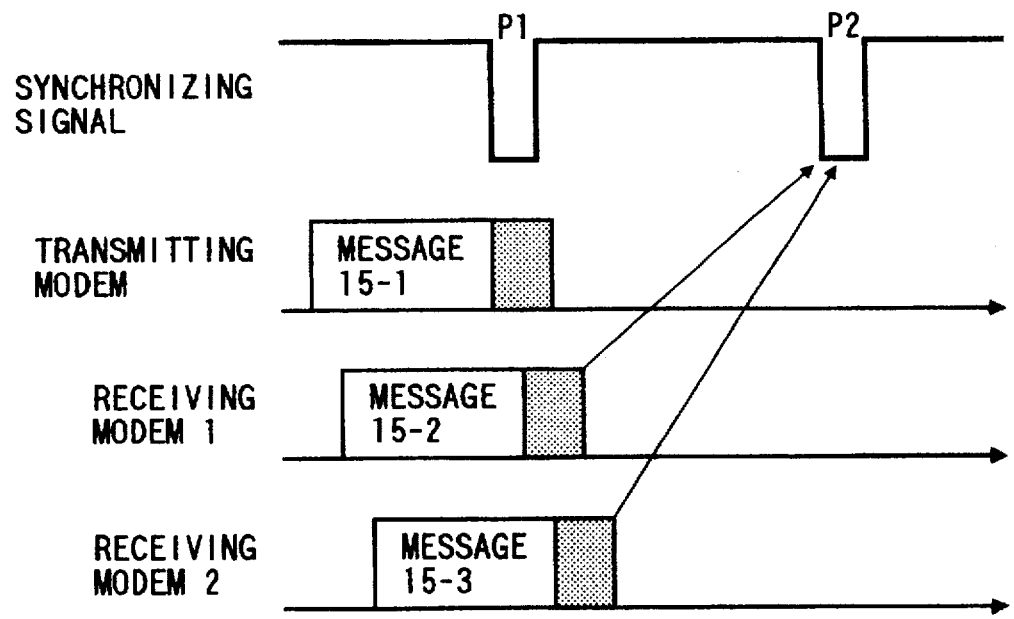

In FIG. 52A, the modem which is currently transmitting sends a message 14-1 which is synchronized with a synchronizing signal pulse, while the modems 1 and 2 which are in the receiving condition should begin to execute a receiving operation in synchronism with that same synchronizing signal pulse. However due to transmission delays, it is possible that the time at which the receiving modem 1 receives that message (i.e. as the message 14-2) and the time at which the receiving modem 2 receives the message (i.e. as the message 14-3) will be different to such an extent that the receiving modem 1 will begin its receiving operation at the time point when it receives pulse P1 of the synchronizing signal, whereas the receiving modem 2 will begin its receiving operation at the time point when it receives pulse P2 of the synchronizing signal. As a result, there will be deviation between the timings of respectively operations performed by the modems 1 and 2. In order to prevent this, as shown in FIG. 52B, it is ensured that the transmitting modem does not end transmission while the synchronizing signal is being asserted, but continues to transmit the carrier. As a result, the receiving modems 1 and 2 will each begin a receiving operation in synchronism with the same synchronizing pulse, i.e. the pulse P2.

In that way, a plurality of modems can be controlled to execute such operations as switching of video signals, in a mutually synchronized manner, by ensuring that all of the modems are synchronized by the same synchronizing pulses. Thus for example, video data switching operations can be executed in synchronism with the vertical synchronizing pulses of video signals which are produced by a plurality of monitoring cameras, with no disorder in the resultant pictures which appear on the monitor displays.

In the prior art, it has been usual for monitor video cameras and monitor display units to be connected by baseband video signals. This has caused problems with regard to the difficulties in arranging wiring between the apparatus units, when there are a number of cameras. With the above embodiment of the present invention however, a plurality of video signals can be multiplexed and sent along the same transmission path, and hence the amount of connecting cables required for the system can be reduced. Moreover, with the present invention, even if a low rate of data transmission is utilized, for example 9600 BPS, the control signals can be transferred within guaranteed time intervals, so that the the response characteristics for camera control and video signal switching can be guaranteed. Hence, the invention enables a monitoring camera system to be implemented by using low-speed, low-cost modems.

With the eleventh embodiment of the invention, when conflict occurs between messages that are transmitted at respectively different transmission levels, so that only the message transmitted at the high transmission level is correctly sent, the starting point of that correctly sent message can be clearly defined, when the data are received by a destination modem.

Figure 53:
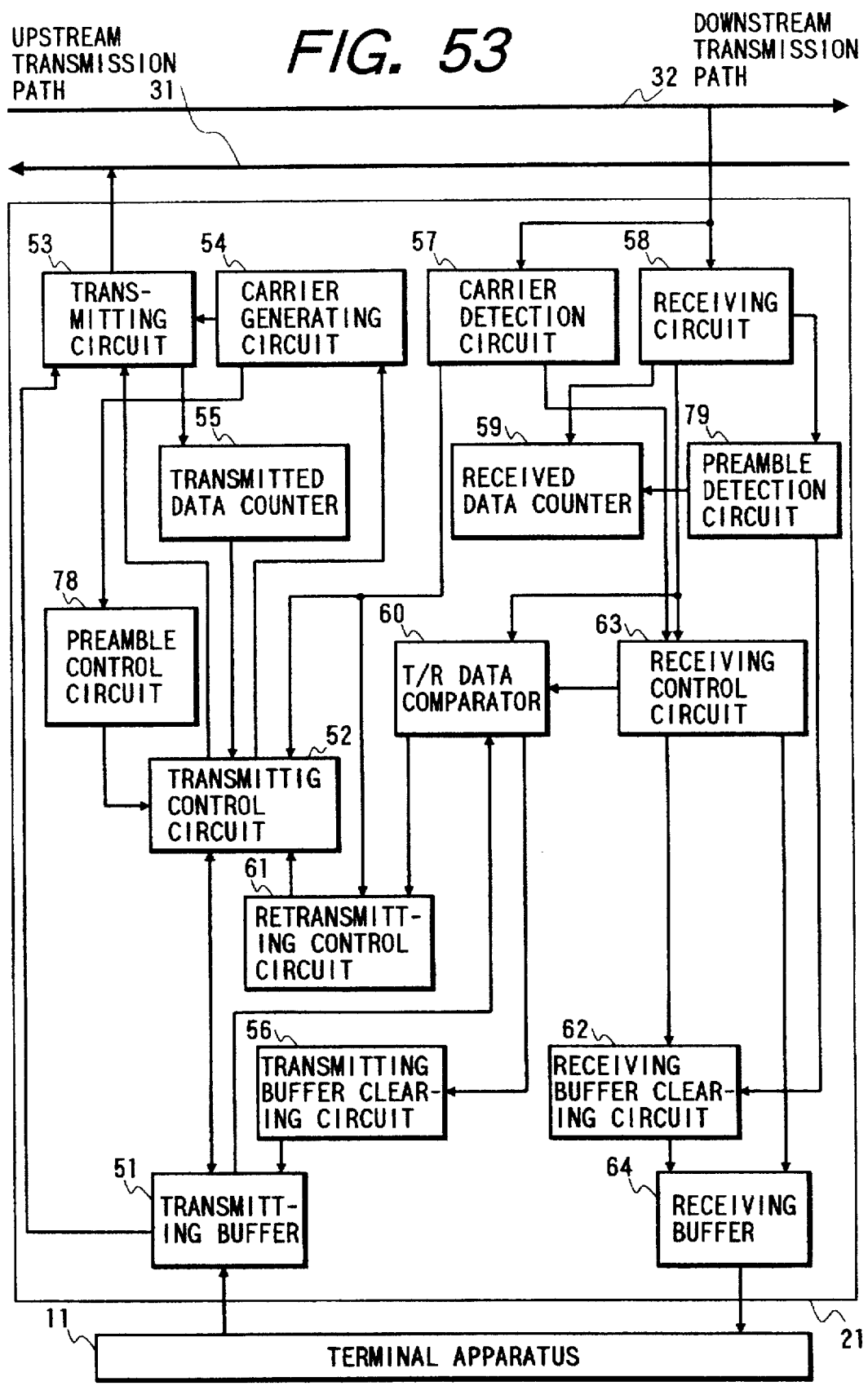
FIG. 53 is a circuit block diagram of a modem used in an eleventh embodiment of a CATV-LAN according to the present invention.

The configuration of a modem of this CATV-LAN is shown in FIG. 53. As shown, this includes a preamble transmitting circuit 78 for transmitting the carrier during a preamble time interval, immediately prior to transmitting a message, and a preamble receiving circuit 79 which clears data stored in the receiving buffer and initializes the received data counter, when the carrier alone is received (i.e. without the message) during the preamble time interval. In other respects, this embodiment is identical to the first embodiment.

Figure 54:
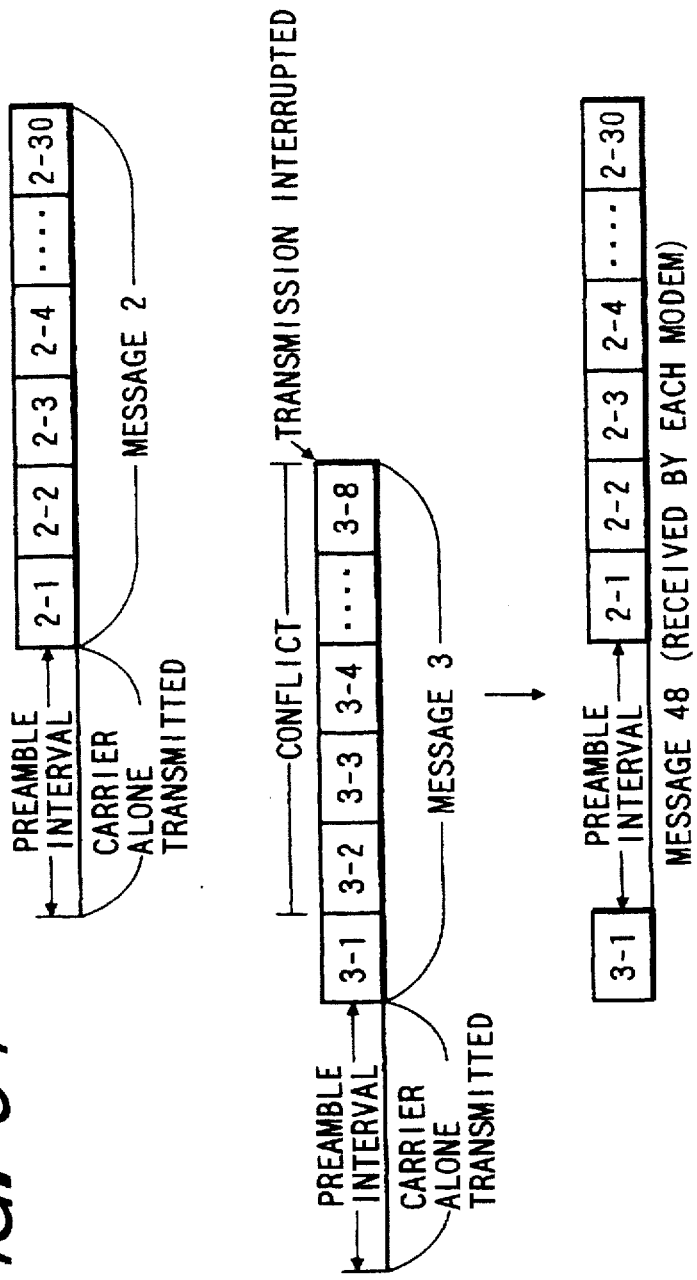
FIG. 54 illustrates a pattern of data conflict between messages, for the eleventh embodiment.

This operation of this CATV-LAN embodiment will be described referring to FIG. 54. First, it will be assumed that the message 3 is sent from the modem 22 to the modem 23 as its destination, and that while this is in progress, the modem 21 begins to transmit the message 2 which also has the modem 23 as its destination. It will further be assumed that the transmission level of the modem 21 is higher than that of the modem 22.

When transmission of the carrier by the carrier generating circuit 54 of the modem 22 begins, prior to the start of transmitting the message 3, the preamble transmitting circuit 78 of that modem designates to the transmitting control circuit 52 that the carrier is to continue to be transmitted during the preamble time interval. Thus, the carrier is first transmitted by the modem 22 during the preamble time interval, then the message 3 is transmitted.

Similarly, the preamble transmitting circuit 78 of the modem 21 causes the carrier alone to be transmitted by that modem during the preamble time interval, with the message 2 then being transmitted by that modem.

When conflict occurs between the message 3 from the modem 22 and the message 2 from the modem 21, then since the transmission level of the modem 21 is the higher of the two, the message 3 is obliterated by the carrier of the message 2 that is transmitted by the modem 21. Hence, each of the modems 21, 22, 23, after receiving a part of the data (i.e. the first datum 3-1) of the message 3, thereafter receives the carrier, then receives the data of message 2 (2-1, 2-2 . . . 2-30), with the total message thus received by each modem being designated as message 48 in FIG. 54. The modem 22 which is in the process of transmitting the message 3 thereby detects that the data which it is transmitting are different from the received data, and so halts transmission of the message 3 after having transmitted the datum 3-8.

The destination modem 23 first receives the initial datum 3-1 of the message 3, and so updates the receiving counter 59 from a count of 0 to 1, and then finds that the first datum 3-1 indicates that the modem 23 itself is the destination of that message. The modem 23 thus stores the datum 3-1 in the receiving buffer 64.

The modem 23 thereafter receives only the carrier, during the preamble time interval of message 2. The preamble receiving circuit 79 of that modem thus detects that the transmitted data are not being received, and so causes the receiving buffer clearing circuit 62 to clear the receiving buffer 64, and also initializes the count value of the received data counter circuit 59. The datum 3-1 which is stored in the receiving buffer 64 is thereby cleared, and the received data counter circuit 59 reset to a count of zero. The modem 23 has thus been returned to the condition which existed prior to receiving the message 3.

The receiving circuit 58 of that modem then receives the initial datum 2-1 of the message 2, the received data counter circuit 59 is updated to a count of 1, and it is judged that the modem 23 itself is the destination which is expressed by the datum 2-1 which has been stored in the receiving buffer 64. Thereafter, in the same way as described for the first embodiment, the data (2-2, 2-3 . . . 2-30) of message 2 are sequentially set into the receiving buffer 64, and the count value of the received data counter circuit 59 is successively updated accordingly.

In that way, even if conflict has occurred, the modem 23 correctly receives the message 2 after having received the carrier during a fixed time interval. Hence, the time point at which that modem starts to receive the message 2 is clearly defined.

If the modem 22 which transmits the message 3 were to have a higher transmission level than the modem 21 which transmits the message 2, then when conflict occurs, due to the capture effect, the message 2 and the preceding carrier portion will both be obliterated by the message 3. Hence, the modem 23 in this case too will correctly receive the message 3 from start to finish, with the time point at which the modem 23 modem starts to receive the message 3 being clearly defined.

As will be clear from the above description of the invention, a modem of a CATV-LAN according to the present invention is configured such as to compare data which it has transmitted with data that are subsequently received and which should be respectively identical to the transmitted data. The modem judges that conflict has occurred when such transmitted and received data do not coincide. Hence, it becomes unnecessary to use expensive beat detection circuits, so that the cost of the CATV-LAN can be lowered.

Moreover, even if conflict occurs between transmitted data, efficient data transmitting can still be ensured, by utilizing the capture effect.

Furthermore, when data conflict occurs, causing the data of a first message to be obliterated and the data of a second message to be successfully transmitted as a result of the capture effect, the starting point of that second message can be accurately ascertained, when the message is received.

Moreover by using the capture effect, it is made possible to avoid the phenomenon whereby a higher rate of transmission opportunities are provided to those modems which have the highest transmission levels.

Moreover, by using means such as classifying modems into groups, the capture effect can be effectively utilized, enabling the transmission efficiency to be increased.

Furthermore, detection of the idle state of the transmission path can be used to determine a condition in which the occurrence of data conflict can be effectively avoided, thereby enabling the transmitting efficiency to be further increased.

Moreover, messages can be transmitted in order of the priority of the messages.

Also, it can be ensured that a message is transmitted by a modem after a time delay that is no greater than a specific guaranteed value.

What is claimed is:

1. A cable television local area network comprising a plurality of terminal apparatuses, means for constituting a transmission path formed of an upstream transmission path and a downstream transmission path, a plurality of modems coupled to respective ones of said terminal apparatuses, for transmitting to said upstream transmission path messages which are supplied from said terminal apparatuses and for receiving messages from said downstream transmission path and supplying said messages to said terminal apparatuses, and a head end apparatus for transmitting to said downstream transmission path messages which have been transmitted over said upstream transmission path, wherein each of said messages comprises information specifying the length of said message, and each of said modems comprises transmitted/received data comparator means functioning, while said each modem is transmitting a message, to compare successively received data obtained from said downstream transmission path with successively selected data of said message which have already been transmitted to said upstream transmission path, to thereby detect any occurrence of non-coincidence between said received data and said transmitted data of the message;

retransmission means responsive to detection of said non-coincidence by said transmitted/received data comparator means for interrupting transmission of said message and for subsequently retransmitting said message after a retransmission time interval of predetermined duration has elapsed, and receiving control means functioning, when said modem does not transmit a message, and when the length of a set of data which are received from said downstream transmission path does not attain a value of message length which is specified in said received data, to discard said received data.

2. A cable television local area network according to claim 1, wherein each of said modems comprises transmitting buffer memory means for holding a message which is to be transmitted, and transmitting control means for successively reading out from said transmitting buffer memory means, in a specific sequence, data constituting said message, to be transmitted over said upstream transmission path, and for subsequently reading out said data of the message from said transmitting buffer memory means in said sequence, to be successively compared by said transmitted/received data comparator means with said data received from said downstream transmission path.

3. A cable television local area network according to claim 1, wherein each of said modems comprises carrier generating means for generating a carrier, transmitting circuit means coupled to receive said carrier and data of a message which is to be transmitted, for transmitting to said upstream transmission path said carrier and a modulated data signal expressing said data, transmitting control means functioning when said modem transmits a message, upon detection by said transmitted/received data comparator means that said received data and said transmitted data of said message do not coincide, to control said transmitting circuit means to transmit said carrier alone to said upstream transmission path during a fixed time interval after transmission of said message has been interrupted, and wherein when said modem is not transmitting a message, said receiving control means are responsive to receiving said carrier alone from said downstream transmission path during said fixed time interval for discarding any data which have been received from said downstream transmission path immediately prior to commencement of receiving said carrier.

4. A cable television local area network according to claim 1, wherein each of said modems comprises carrier generating means for generating a carrier, transmitting circuit means coupled to receive said carrier and data of a message which is to be transmitted, for transmitting to said upstream transmission path said carrier and a modulated data signal expressing said data, transmitting control means functioning when said modem transmits a message, upon detection by said transmitted/received data comparator means at a time when all data of said message have already been transmitted that said received data and said transmitted data of said message do not coincide, to control said transmitting circuit means to transmit said carrier alone to said upstream transmission path during a fixed time interval after transmission of said message has been interrupted, and wherein when said modem is not transmitting a message, said receiving control means are responsive to receiving said carrier alone from said downstream transmission path during said fixed time interval for discarding any data which have been received from said downstream transmission path immediately prior to commencement of receiving said carrier.

5. A cable television local area network according to claim 1, in which said retransmission means means of respective ones of said modems hold data specifying respectively different values of retransmission time interval, and wherein said retransmission means determines, based on said data, the value of said retransmission time interval which is utilized in a message retransmission operation.

6. A cable television local area network according to claim 5 wherein each of said modems comprises means functioning, each time a message is transmitted on said downstream transmission path by any of said modems, to exchange the retransmission time interval specified for said modem for the retransmission time interval that is specified for another one of said modems.

7. A cable television local area network according to claim 6, wherein each of said modems comprises means for storing a table expressing relationships between numbers of message transmission occurrences and respectively different values of said retransmission time interval, means for detecting occurrences of an idle condition of said downstream transmission path, and means for selecting an updated value of said retransmission time interval from said table each time that an occurrence of said idle condition is detected.

8. A cable television local area network according to claim 1, wherein said modems execute transmission of messages to said upstream transmission path by using respectively different predetermined transmission levels.

9. A cable television local area network according to claim 8, wherein each of said modems, upon completion of a message transmission, inhibits transmission of a succeeding message until said modem detects that an idle condition of the transmission path has continued for a predetermined time interval.

10. A cable television local area network according to claim 9, wherein said predetermined time interval is at least equal to a slot time interval, where said slot time interval is a maximum value of time interval that elapses between transmitting data to said upstream transmission path by one of said modems and receiving of said data from said downstream transmission path by said modem.

11. A cable television local area network according to claim 9, wherein at least some of said messages each includes information specifying a degree of priority of said message, and wherein each of said modems comprises priority detection means for detecting said degree of priority which is specified within a message that is to be transmitted by said modem, and means responsive to a detected degree of priority of said message for changing the value of said time interval for which said idle condition must be detected as continuing.

12. A cable television local area network according to claim 11, wherein said priority degree takes one of a plurality of stepwise-varying values, and wherein said time interval for which said idle condition must be detected as continuing is set as an integral number of slot time intervals, in accordance with the priority degree which is detected for the next message that is to be transmitted, where each of said slot time intervals is a maximum value of time interval that elapses between transmitting data by one of said modems to said upstream transmission path and receiving said data from said downstream transmission path by said modem.

13. A cable television local area network according to claim 11, wherein each of said modems comprises priority altering means, for altering a priority degree that has been detected by said priority detection means as being specified in a message which is to be transmitted by said modem, and wherein said priority altering means changes said priority degree in accordance with an amount of data which constitutes said message.

14. A cable television local area network according to claim 1, wherein each of said modems comprises transmitting circuit means for transmitting said data of a message to said upstream transmission path as a modulated data signal at a specific transmission level, and transmission level adjustment means for controlling said transmitting circuit means to randomly change said transmission level between respective transmissions of messages by said modem.

15. A cable television local area network according to claim 14, wherein at least some of said messages each includes information specifying a degree of priority of said message, wherein each of said modems comprises priority detection means for detecting said degree of priority which is specified within a message that is to be transmitted by said modem, and wherein said transmission level adjustment means alters, in accordance with the degree of priority that is detected by said priority detection means, the magnitude of a range of values within which said transmission level is randomly changed.

16. A cable television local area network according to claim 1 wherein each of said modems comprises time-guaranteed message holding means for receiving and temporarily storing a time-guaranteed message which is supplied from the corresponding one of said terminal apparatuses, a guarantee interval timer, and means for initiating transmission of said message to said upstream transmission path within a predetermined guarantee time interval following receipt of said message from said terminal apparatus, as measured by said guarantee interval timer, and if necessary for interrupting transmission of a message which is not the time-guaranteed message and is currently being transmitted, to enable transmission of said time-guaranteed message to commence within said guarantee time interval.

17. A cable television local area network according to claim 16, wherein said guarantee interval timer alters the value of said predetermined guarantee time interval which is measured thereby, in accordance with a guarantee request time which is specified within said time-guaranteed message.

18. A cable television local area network according to claim 1 wherein each of said modems comprises transmitting circuit means for transmitting said data of a message to said upstream transmission path as a modulated data signal at a specific transmission level, and wherein respective groups of modems are defined, each group consisting of modems which have respectively different values of transmission level, each of said modems comprising group identification registering means for registering a group number of a group to which said modem belongs, group identifier counter means for deriving a count value which represents the group number of a group whose members are currently enabled to transmit messages via said transmission path and for detecting a condition of coincidence between said count value and said group number registered in said group number identification registering means, means for detecting a group transmission completed condition in which all members of said group to which said modem belongs have completed transmission of all pending messages and for updating said count value when said group transmission completed condition is detected, and means for enabling transmission of a message by said modem only while said condition of coincidence is being detected.

19. A cable television local area network according to claim 18, wherein said means for detecting said group transmission completed condition comprise means for detecting that an idle condition of said transmission path has continued for longer than a predetermined time interval.

20. A cable television local area network according to claim 1, wherein each of said modems comprises means for calculating a path occupancy distance as a length of a portion of said transmission path which is currently occupied by data of a message which has been transmitted by said modem, path distance comparator means for comparing a value of return path distance between said modem and said head end apparatus with said path occupancy distance, for thereby detecting a condition in which said path occupancy distance is shorter than said return path distance, and means responsive to detection of said condition for enabling transmission of a succeeding message by said modem to be initiated.

21. A cable television local area network according to claim 1, wherein each of said modems comprises transmitting circuit means for transmitting said data of a message to said upstream transmission path as a modulated data signal, said head end apparatus comprises means for transmitting a synchronizing signal to said downstream transmission path, multiplexed with data signals transmitted by said modems, and wherein each of said modems comprises synchronizing receiving means for receiving said synchronizing signal, and operating sequence register means coupled to receive said synchronizing signal from said synchronizing receiving means, for registering a predetermined sequence of operations and for executing said sequence of operations in synchronism with said synchronizing signal.

22. A cable television local area network according to claim 21, wherein at least a part of said plurality of modems each comprises a video transmitting circuit coupled to receive a video signal from a video signal source, for generating a corresponding video data signal and for transmitting said video data signal to said upstream transmission path, multiplexed with said data signals transmitted by said modems, and wherein at least a part of said plurality of modems each comprises a video receiving circuit for receiving said video data signal from said downstream transmission path and for converting said video data signal to corresponding baseband video signals.

23. A cable television local area network according to claim 22, wherein specific operations of at least said video transmitting circuit of a modem are selectively controlled based on operation commands generated based on contents of said operating sequence registering means, said operation commands being generated at timings determined by said synchronizing signal.

24. A cable television local area network according to claim 22, wherein said video signal source comprises a video camera, and wherein said synchronizing signal is supplied from said synchronizing receiving circuit to said video camera, for synchronizing said video signal with said synchronizing signal.

25. A cable television local area network according to claims 1 wherein each of said modems comprises carrier generating means for generating a carrier, transmitting circuit means coupled to receive said carrier and data of a message which is to be transmitted, for transmitting to said upstream transmission path said carrier and a modulated data signal expressing said data, means for controlling said transmitting circuit means to transmit said carrier alone during a fixed preamble time interval prior to transmitting said data of a message, and preamble receiving means coupled to receive said carrier from said downstream transmission path, for setting said modem to a predetermined initial receiving status modem when said carrier is received.

* * * * *